US012619926B2

(12) United States Patent
Menon et al.

(10) Patent No.: US 12,619,926 B2
(45) Date of Patent: May 5, 2026

(54) UPDATING SUSTAINABILITY ACTION PLANS BASED ON THIRD PARTY DATA

(71) Applicant: Schlumberger Technology Corporation, Sugar Land, TX (US)

(72) Inventors: Shashi Menon, Houston, TX (US); Hemant Arora, Houston, TX (US); David Seabrook, London (GB); Gian-Marcio Gey, London (GB); Hans Eric Klumpen, Houston, TX (US); Debasish Das, Houston, TX (US); Federico Sporleder, Pune (IN); Jing Zhang, Houston, TX (US); Rajarshi Ray, London (GB); Nader Salman, Houston, TX (US); Stephanie Lee, Houston, TX (US); Colin Wier, Houston, TX (US); Neeraj Kamat, Pune (IN); Harshada Modak, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/734,289

(22) Filed: Jun. 5, 2024

(65) Prior Publication Data

US 2024/0403784 A1     Dec. 5, 2024

Related U.S. Application Data

(60) Provisional application No. 63/471,174, filed on Jun. 5, 2023.

(51) Int. Cl.
G06Q 10/063      (2023.01)
G06Q 10/0631     (2023.01)
(Continued)

(52) U.S. Cl.
CPC ..... *G06Q 10/063* (2013.01); *G06Q 10/06315* (2013.01); *G06Q 10/0633* (2013.01);
(Continued)

(58) Field of Classification Search
CPC .......... G06Q 10/063; G06Q 10/06315; G06Q 10/0633; G06Q 10/0637; G06Q 10/0639; G06Q 10/067; G06Q 50/02
See application file for complete search history.

(56) References Cited

U.S. PATENT DOCUMENTS 7,584,165 B2     9/2009  Buchan
8,321,187 B2    11/2012  Kaufman
(Continued)

FOREIGN PATENT DOCUMENTS

CN        110110904        8/2019
CN        113969774        1/2022
(Continued)

OTHER PUBLICATIONS

International Search Report and Written Opinion issued in International Patent Application No. PCT/US2024/032503 on Sep. 13, 2024; 12 pages.
(Continued)

*Primary Examiner* — Charles Guiliano
(74) *Attorney, Agent, or Firm* — Kyle R. Miiller

(57)          ABSTRACT

An enterprise system may include devices that perform respective operations of an enterprise and a sustainability platform system. The sustainability platform system may obtain a sustainability model representative of a state of operations of the enterprise and a current sustainability action plan associated with improving one or more sustainability parameters of the enterprise via one or more abatement technologies. The sustainability platform system may also determine that updated data is available for the abate-
(Continued)

ment technologies and simulate an effect of the action plan on the sustainability parameters based on the updated data. The sustainability platform system may also determine whether the simulated effect of the action plan is effective to cause the sustainability parameters to be within one or more thresholds, and in response to determining that the simulated effect is effective, send commands to the devices to maintain their respective operations according to the current sustainability action plan.

20 Claims, 16 Drawing Sheets

(51) Int. Cl.

| | |
|---|---|
| *G06Q 10/0633* | (2023.01) |
| *G06Q 10/0637* | (2023.01) |
| *G06Q 10/0639* | (2023.01) |
| *G06Q 10/067* | (2023.01) |
| *G06Q 50/02* | (2024.01) |

(52) U.S. Cl.
CPC ..... *G06Q 10/0637* (2013.01); *G06Q 10/0639* (2013.01); *G06Q 10/067* (2013.01); *G06Q 50/02* (2013.01)

(56) References Cited

U.S. PATENT DOCUMENTS

| | | | |
|---|---|---|---|
| 9,251,226 | B2 | 2/2016 | Majumdar |
| 10,339,478 | B2 | 7/2019 | Grant |
| 10,373,085 | B1 | 8/2019 | Baghdikian |
| 11,542,787 | B2 | 1/2023 | Fox |
| 12,147,920 | B2 | 11/2024 | Fox |
| 2007/0078692 | A1 | 4/2007 | Vyas |
| 2008/0077371 | A1 | 3/2008 | Yeten |
| 2008/0215607 | A1 | 9/2008 | Kaushansky |
| 2010/0274367 | A1 | 10/2010 | Kaufman |
| 2010/0274603 | A1 | 10/2010 | Walker |
| 2010/0274810 | A1 | 10/2010 | Walker |
| 2010/0275147 | A1 | 10/2010 | Kaufman |
| 2010/0318200 | A1 | 12/2010 | Foslien |
| 2011/0061295 | A1 | 3/2011 | McAlister |
| 2011/0093420 | A1 | 4/2011 | Rothenberg |
| 2011/0320054 | A1 | 12/2011 | Brzezowski |
| 2012/0271669 | A1 | 10/2012 | Taper |
| 2013/0098049 | A1 | 4/2013 | Kraemer |
| 2014/0180939 | A1 | 6/2014 | Frankland |
| 2015/0363730 | A1 | 12/2015 | Crane, Jr. |
| 2016/0203494 | A1 | 7/2016 | Galligan Davila |
| 2016/0350778 | A1 | 12/2016 | Levine et al. |
| 2017/0051681 | A1 | 2/2017 | Arias Chao |
| 2017/0058656 | A1* | 3/2017 | Benson .................... E21B 44/02 |
| 2017/0321656 | A1 | 11/2017 | Eisenberger |
| 2018/0231967 | A1 | 8/2018 | Cohen |
| 2018/0266241 | A1 | 9/2018 | Ferguson et al. |
| 2019/0335674 | A1 | 11/2019 | Basso |
| 2019/0370690 | A1 | 12/2019 | Anderson |
| 2019/0385244 | A1 | 12/2019 | Stelmar Netto |
| 2020/0372588 | A1 | 11/2020 | Shi |
| 2021/0238971 | A1 | 8/2021 | Crumpton |
| 2021/0372864 | A1 | 12/2021 | Tao et al. |
| 2021/0388717 | A1 | 12/2021 | Srinivasan |
| 2022/0027810 | A1 | 1/2022 | Murthy |
| 2022/0065834 | A1 | 3/2022 | Gadot et al. |
| 2022/0076182 | A1 | 3/2022 | Vollmert et al. |
| 2022/0137580 | A1 | 5/2022 | Burroughs |
| 2022/0230250 | A1 | 7/2022 | Kawamori |
| 2022/0243570 | A1 | 8/2022 | Xiao et al. |
| 2022/0243575 | A1 | 8/2022 | Kristensen |
| 2022/0284519 | A1 | 9/2022 | Pancholi et al. |
| 2022/0325887 | A1 | 10/2022 | Wang et al. |
| 2022/0343433 | A1 | 10/2022 | Yan |
| 2022/0404050 | A1 | 12/2022 | Chang et al. |
| 2022/0405590 | A1 | 12/2022 | Hebets |
| 2023/0020417 | A1 | 1/2023 | ElBsat |
| 2023/0071867 | A1 | 3/2023 | Ramanathan |
| 2023/0085641 | A1 | 3/2023 | Jones et al. |
| 2023/0089850 | A1 | 3/2023 | Zhu |
| 2023/0152763 | A1 | 5/2023 | Davis et al. |
| 2023/0222388 | A1 | 7/2023 | Cella |
| 2023/0236560 | A1 | 7/2023 | Lee |
| 2023/0289911 | A1 | 9/2023 | Freier |
| 2023/0350387 | A1 | 11/2023 | Davis |
| 2023/0351300 | A1* | 11/2023 | Nielsen .............. G06Q 10/0637 |
| 2023/0385299 | A1 | 11/2023 | Al Rasheed et al. |
| 2024/0003244 | A1 | 1/2024 | Debs |
| 2024/0067884 | A1 | 2/2024 | Rooney |
| 2024/0070680 | A1 | 2/2024 | Takawale et al. |
| 2024/0281826 | A1 | 8/2024 | Mallet |
| 2024/0311733 | A1 | 9/2024 | Ibanez |
| 2024/0362404 | A1 | 10/2024 | Von Raees |
| 2024/0403776 | A1 | 12/2024 | Krishna |
| 2024/0403777 | A1 | 12/2024 | Menon |
| 2024/0403778 | A1 | 12/2024 | Menon |
| 2024/0403782 | A1 | 12/2024 | Menon |
| 2024/0403785 | A1 | 12/2024 | Menon |
| 2024/0403786 | A1 | 12/2024 | Menon |
| 2024/0403787 | A1 | 12/2024 | Menon |
| 2024/0403788 | A1 | 12/2024 | Menon |
| 2024/0403789 | A1 | 12/2024 | Menon |
| 2024/0403892 | A1 | 12/2024 | Pomerantz |
| 2024/0403893 | A1 | 12/2024 | Menon |
| 2025/0086660 | A1 | 3/2025 | Pattanavekin |

FOREIGN PATENT DOCUMENTS

| | | |
|---|---|---|
| CN | 114565319 | 5/2022 |
| CN | 115563757 | 1/2023 |
| KR | 10-1993366 | 9/2019 |
| TW | 202309816 A | 3/2023 |
| WO | 2009152553 A9 | 12/2009 |
| WO | 2016196351 | 12/2016 |
| WO | 2018132840 A1 | 7/2018 |
| WO | 2020023998 A1 | 2/2020 |
| WO | 2020263693 | 12/2020 |
| WO | 2023009865 | 2/2023 |
| WO | 2023017164 | 2/2023 |
| WO | 2023033832 | 3/2023 |
| WO | 2023154091 | 8/2023 |
| WO | 2023178071 A1 | 9/2023 |

OTHER PUBLICATIONS

International Search Report and Written Opinion issued in International Patent Appl. No. PCT/US2024/032506 on Sep. 11, 2024, 10 pages.
International Search Report and Written Opinion issued in International Patent Appl. No. PCT/US2024/032490 on Sep. 27, 2024, 13 pages.
International Search Report and Written Opinion issued in International Patent Appl. No. PCT/US2024/032483 on Sep. 27, 2024, 9 pages.
Non-Final Office Action issued in U.S. Appl. No. 18/734,238 on Sep. 24, 2024; 29 pages.
International Search Report and Written Opinion issued in International Patent Appl. No. PCT/US2024/032475 on Sep. 30, 2024, 10 pages.
Office Action issued in U.S. Appl. No. 18/733,939 dated Dec. 5, 2024, 96 pages.
Office Action issued in U.S. Appl. No. 18/734,238 dated Jan. 6, 2025, 38 pages.
Notice of Allowance issued in U.S. Appl. No. 18/733,951 dated Jan. 15, 2025, 20 pages.
International Search Report and Written Opinion issued in International Patent Appl. No. PCT/US2024/032479 on Sep. 30, 2024; 10 pages.
International Search Report and Written Opinion issued in International Patent Appl. No. PCT/US2024/032480 on Sep. 24, 2024; 10 pages.

(56) References Cited

OTHER PUBLICATIONS

International Search Report and Written Opinion issued in International Patent Appl. No. PCT/US2024/032481 on Sep. 24, 2024; 11 pages.

International Search Report and Written Opinion issued in International Patent Appl. No. PCT/US2024/032485 on Oct. 2, 2024; 11 pages.

Lee Si-Hyeoung, "An uncertainty estimation method for the emission factors of Korean greenhouse gas emission inventory" [online], Feb. 2015, [retrieved on Jan. 15, 2025], Retrieved from the Internet: URL: https://www.riss.kr/linkid=T13735052 , pp. 1, 9, 14, 27, 77, with machine translation.

International Search Report and Written Opinion issued in International Patent Appl. No. PCT/US2024/032486 on Sep. 30, 2024; 10 pages.

A. Farajzadeh, R., et al., "Life-cycle production optimiation of hydrocarbon fields: thermoeconomics perspective." Sustainable Energy & Fuels 3.11 (2019): 3050-3060. (Year: 2019).

Farsan et al., "Value Change in the Value Chain: Best Practices in Scope 3 Greenhouse Gas Management", Climate-KIC, Version 3.0, Nov. 2018. (Year: 2018), 44 pages.

Non-Final Office Action issued in U.S. Appl. No. 18/733,939 on Aug. 6, 2024; 63 pages.

Non-Final Office Action issued in U.S. Appl. No. 18/733,951 on Aug. 8, 2024; 19 pages.

Non-Final Office Action issued in U.S. Appl. No. 18/734,079 on Aug. 27, 2024; 28 pages.

Sipola, J. et al., "Adopting artificial intelligence in sustainable business", Journal of Cleaner Production, 2023, 426, 8 pages.

Tetteh, E. K. et al., "Emerging carbon abatement technologies to mitigate energy-carbon footprint—a review", Cleaner Materials, 2021, 2, 15 pages.

* cited by examiner

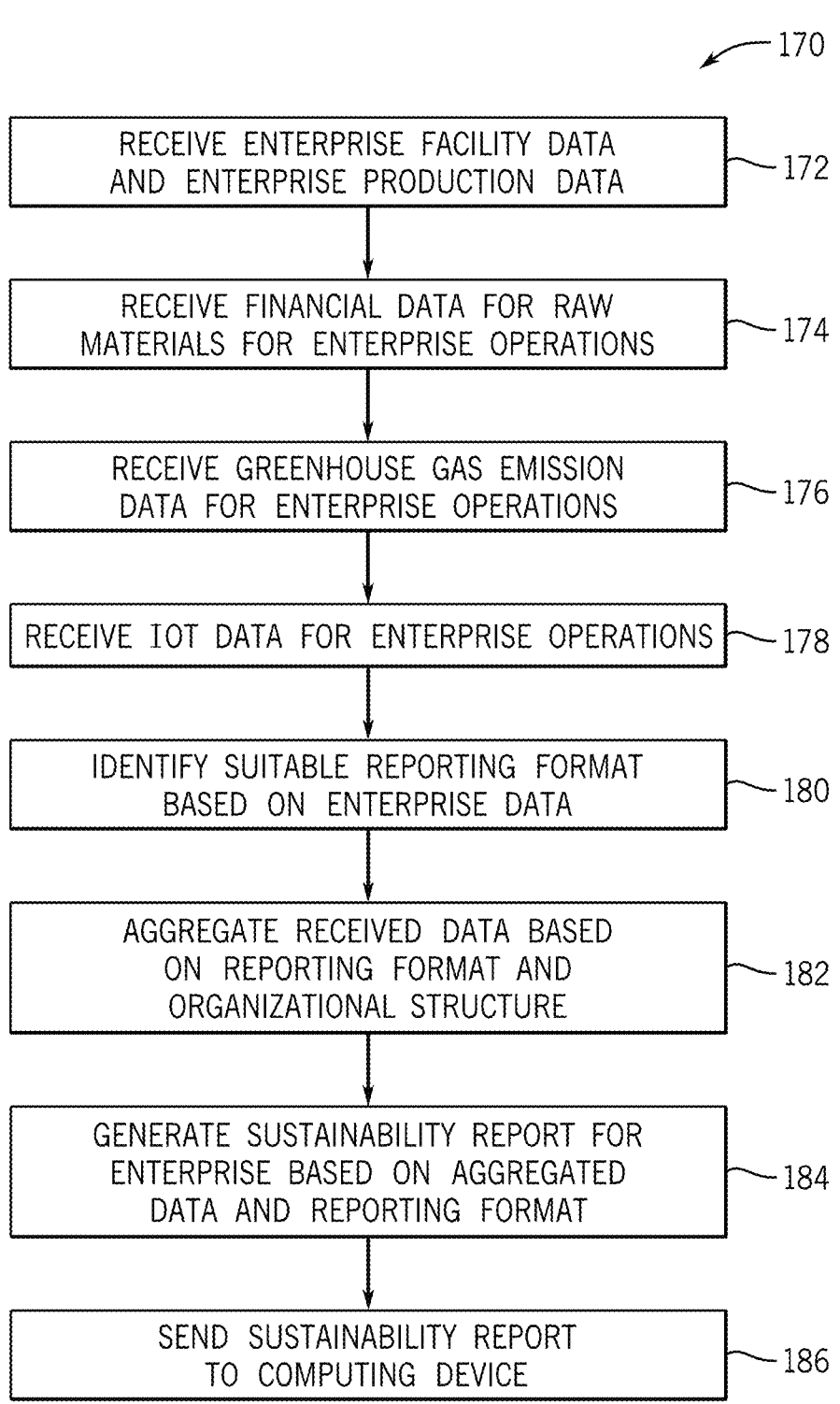

170

RECEIVE ENTERPRISE FACILITY DATA
AND ENTERPRISE PRODUCTION DATA ⎯ 172

RECEIVE FINANCIAL DATA FOR RAW
MATERIALS FOR ENTERPRISE OPERATIONS ⎯ 174

RECEIVE GREENHOUSE GAS EMISSION
DATA FOR ENTERPRISE OPERATIONS ⎯ 176

RECEIVE IOT DATA FOR ENTERPRISE OPERATIONS ⎯ 178

IDENTIFY SUITABLE REPORTING FORMAT
BASED ON ENTERPRISE DATA ⎯ 180

AGGREGATE RECEIVED DATA BASED
ON REPORTING FORMAT AND
ORGANIZATIONAL STRUCTURE ⎯ 182

GENERATE SUSTAINABILITY REPORT FOR
ENTERPRISE BASED ON AGGREGATED
DATA AND REPORTING FORMAT ⎯ 184

SEND SUSTAINABILITY REPORT
TO COMPUTING DEVICE ⎯ 186

FIG. 4

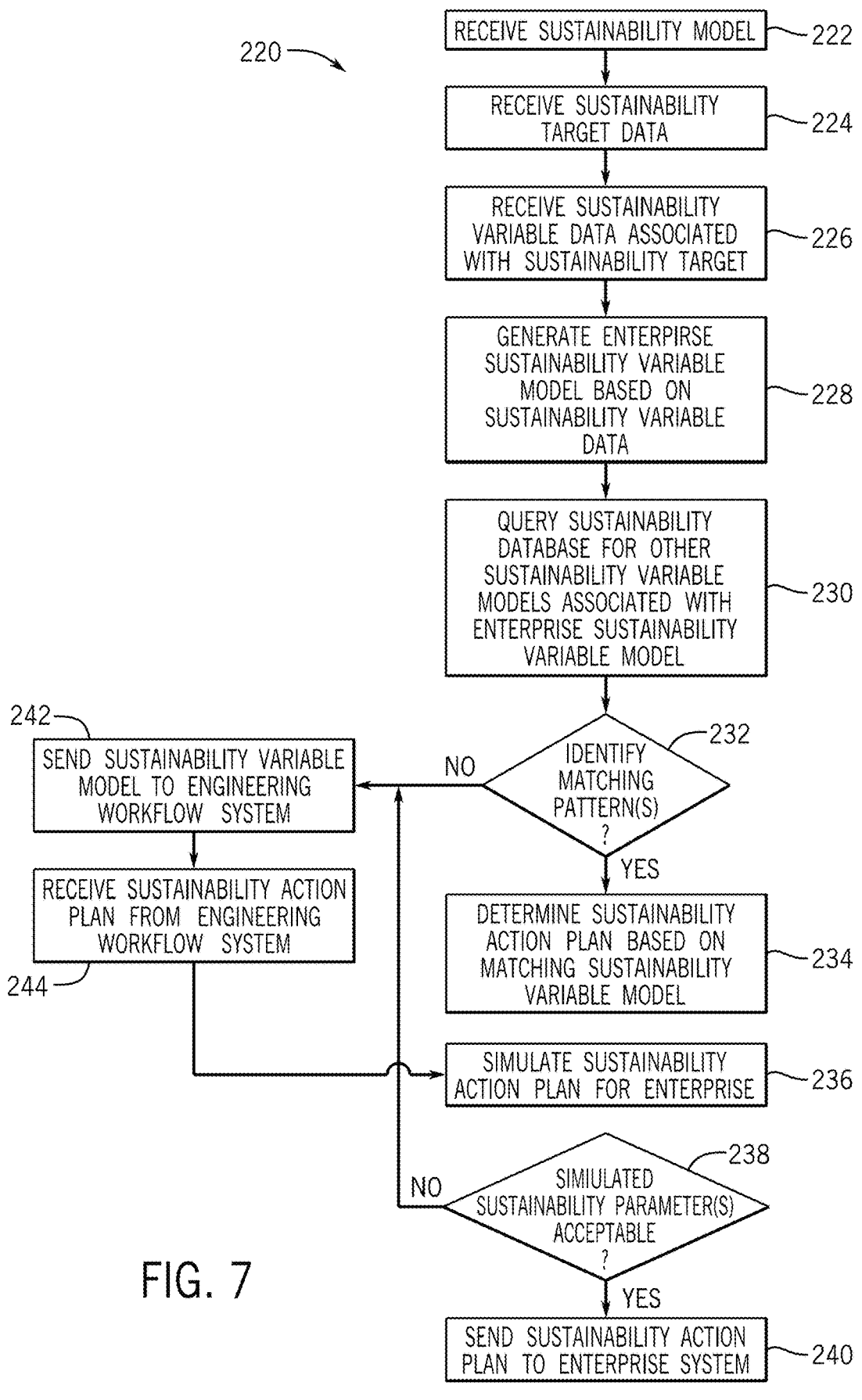

220

RECEIVE SUSTAINABILITY MODEL ──222

RECEIVE SUSTAINABILITY TARGET DATA ──224

RECEIVE SUSTAINABILITY VARIABLE DATA ASSOCIATED WITH SUSTAINABILITY TARGET ──226

GENERATE ENTERPIRSE SUSTAINABILITY VARIABLE MODEL BASED ON SUSTAINABILITY VARIABLE DATA ──228

QUERY SUSTAINABILITY DATABASE FOR OTHER SUSTAINABILITY VARIABLE MODELS ASSOCIATED WITH ENTERPRISE SUSTAINABILITY VARIABLE MODEL ──230

242

SEND SUSTAINABILITY VARIABLE MODEL TO ENGINEERING WORKFLOW SYSTEM

NO

IDENTIFY MATCHING PATTERN(S) ? ──232

YES

RECEIVE SUSTAINABILITY ACTION PLAN FROM ENGINEERING WORKFLOW SYSTEM

244

DETERMINE SUSTAINABILITY ACTION PLAN BASED ON MATCHING SUSTAINABILITY VARIABLE MODEL ──234

SIMULATE SUSTAINABILITY ACTION PLAN FOR ENTERPRISE ──236

NO

SIMIULATED SUSTAINABILITY PARAMETER(S) ACCEPTABLE ? ──238

YES

SEND SUSTAINABILITY ACTION PLAN TO ENTERPRISE SYSTEM ──240

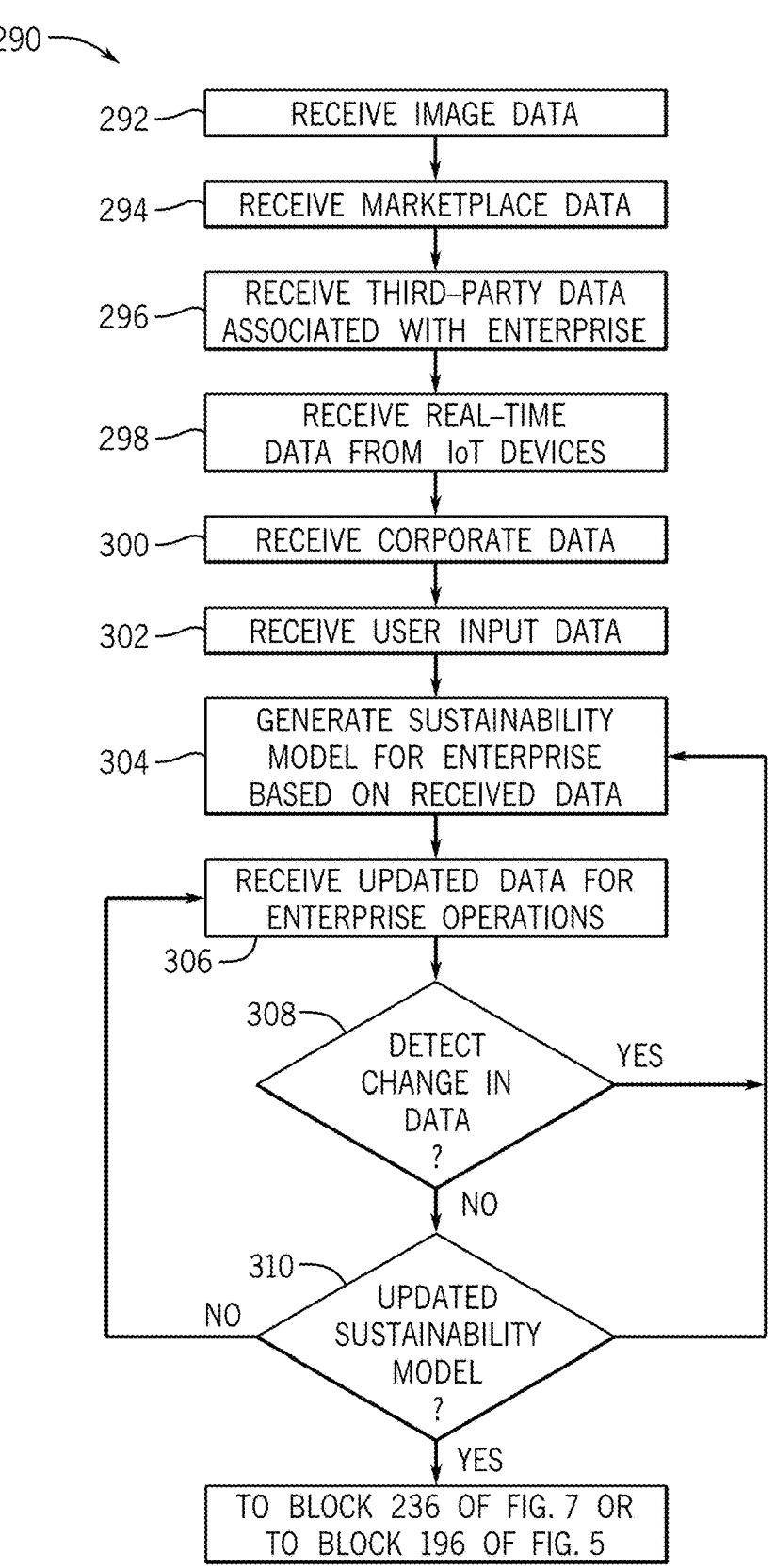

292 — RECEIVE IMAGE DATA

294 — RECEIVE MARKETPLACE DATA

296 — RECEIVE THIRD-PARTY DATA ASSOCIATED WITH ENTERPRISE

298 — RECEIVE REAL-TIME DATA FROM IoT DEVICES

300 — RECEIVE CORPORATE DATA

302 — RECEIVE USER INPUT DATA

304 — GENERATE SUSTAINABILITY MODEL FOR ENTERPRISE BASED ON RECEIVED DATA

306 — RECEIVE UPDATED DATA FOR ENTERPRISE OPERATIONS

308 — DETECT CHANGE IN DATA ? — YES

NO

310 — UPDATED SUSTAINABILITY MODEL ? — NO

YES

TO BLOCK 236 OF FIG. 7 OR TO BLOCK 196 OF FIG. 5

FIG. 10

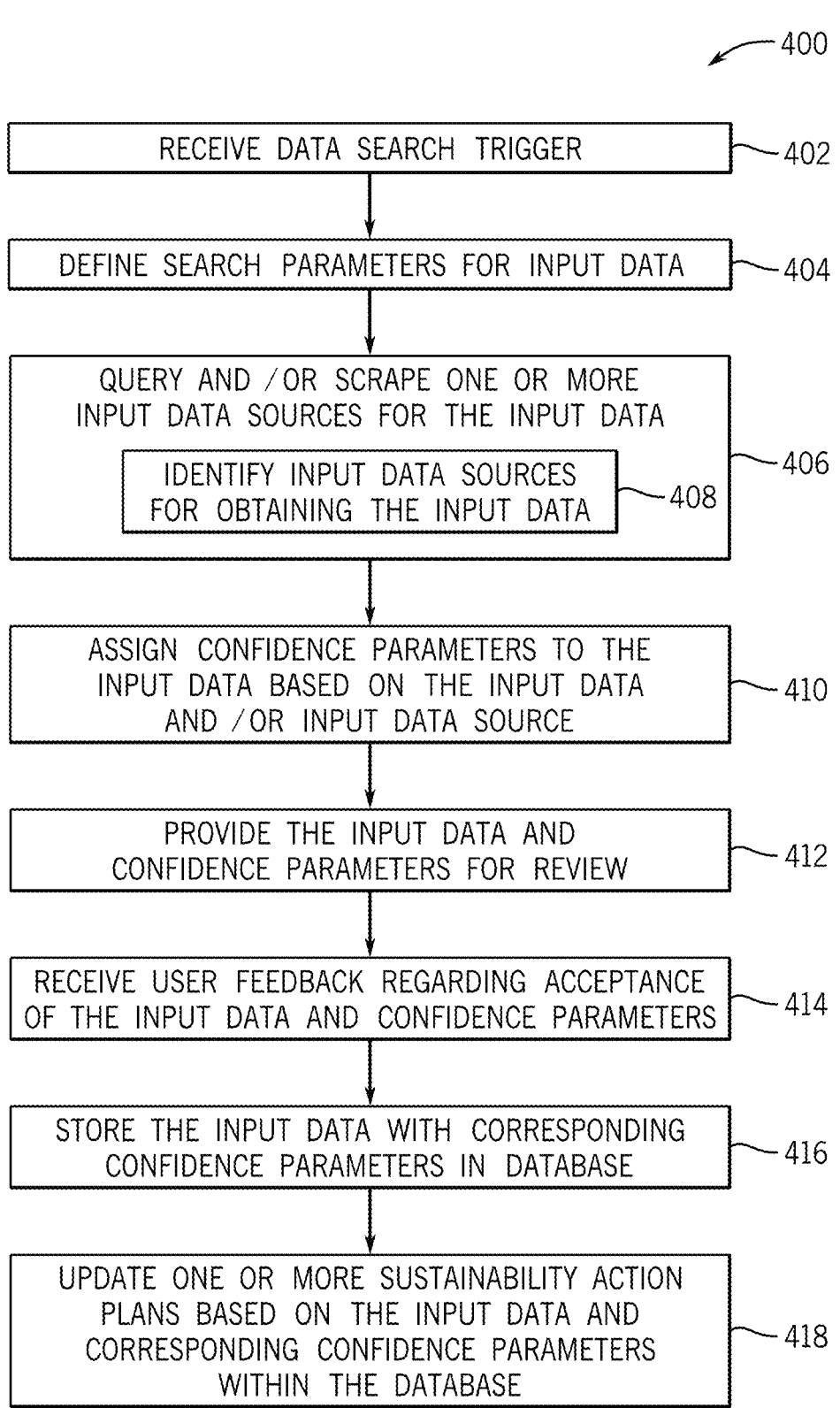

400

RECEIVE DATA SEARCH TRIGGER ~402

DEFINE SEARCH PARAMETERS FOR INPUT DATA ~404

QUERY AND / OR SCRAPE ONE OR MORE
INPUT DATA SOURCES FOR THE INPUT DATA

IDENTIFY INPUT DATA SOURCES
FOR OBTAINING THE INPUT DATA ~408

~406

ASSIGN CONFIDENCE PARAMETERS TO THE
INPUT DATA BASED ON THE INPUT DATA
AND / OR INPUT DATA SOURCE ~410

PROVIDE THE INPUT DATA AND
CONFIDENCE PARAMETERS FOR REVIEW ~412

RECEIVE USER FEEDBACK REGARDING ACCEPTANCE
OF THE INPUT DATA AND CONFIDENCE PARAMETERS ~414

STORE THE INPUT DATA WITH CORRESPONDING
CONFIDENCE PARAMETERS IN DATABASE ~416

UPDATE ONE OR MORE SUSTAINABILITY ACTION
PLANS BASED ON THE INPUT DATA AND
CORRESPONDING CONFIDENCE PARAMETERS
WITHIN THE DATABASE ~418

FIG. 14

UPDATING SUSTAINABILITY ACTION PLANS BASED ON THIRD PARTY DATA

CROSS-REFERENCE TO RELATED APPLICATIONS

This application claims priority to U.S. Provisional Application No. 63/471,174, filed Jun. 5, 2023, and entitled "SUSTAINABILITY PLATFORM FOR IMPROVING SUSTAINABILITY PARAMETERS ACROSS ENTERPRISE OPERATIONS," which is incorporated herein by reference.

Additionally, this application is related to U.S. Ser. No. 18/734,079, filed Jun. 5, 2024, entitled, "UPDATING SUSTAINABILITY ACTION PLANS FOR AN ENTERPRISE BASED ON DETECTED CHANGE IN INPUT DATA"; U.S. Ser. No. 18/734,238, filed Jun. 5, 2024, entitled, "OPTIMIZING SUSTAINABILITY PARAMETERS WITH AN ACTION PLANS FOR AN ENTERPRISE"; U.S. Ser. No. 18/733,939, filed Jun. 5, 2024, entitled, "MANAGING FACILITY AND PRODUCTION OPERA-TIONS ACROSS ENTERPRISE OPERATIONS TO ACHIEVE SUSTAINABILITY GOALS"; and U.S. Ser. No. 18/733,951, filed Jun. 5, 2024, entitled, "PREDICTING SUSTAINABILITY ACTION PLAN PERFORMANCE OVER TIME," each of which is incorporated herein by reference.

BACKGROUND

This disclosure relates generally to providing plans, workflows, and recommendations for improving sustainability parameters across enterprise operations.

As hydrocarbons are extracted from hydrocarbon reservoirs via hydrocarbon wells in oil and/or gas fields, the extracted hydrocarbons may be transported to various types of equipment, tanks, processing facilities, and the like via transport vehicles, a network of pipelines, and the like. For example, the hydrocarbons may be extracted from the reservoirs via the hydrocarbon wells and may then be transported, via the network of pipelines, from the wells to various processing stations that may perform various phases of hydrocarbon processing to make the produced hydrocarbons available for use or transport.

The transported hydrocarbons may be processed or refined into suitable hydrocarbon products and ultimately distributed to end consumers. Overall, the hydrocarbon enterprise may be characterized as encompassing upstream, midstream, and downstream stages. At each of these stages, sustainability parameters such as energy, carbon, waste, water, and the like may be consumed or used. As enterprises move towards becoming more sustainable organizations, it may be challenging to track sustainability parameters while simultaneously identifying opportunities for improving sustainability parameters associated with the enterprise.

This section is intended to introduce the reader to various aspects of art that may be related to various aspects of the present techniques, which are described and/or claimed below. This discussion is believed to be helpful in providing the reader with background information to facilitate a better understanding of the various aspects of this disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In some embodiments, an enterprise system may include devices that perform respective operations of an enterprise and a sustainability platform system. The sustainability platform system may obtain a sustainability model representative of a state of operations of the enterprise and a current sustainability action plan associated with improving one or more sustainability parameters of the enterprise via one or more abatement technologies. The sustainability platform system may also determine that updated data is available for the abatement technologies and simulate an effect of the action plan on the sustainability parameters based on the updated data. The sustainability platform system may also determine whether the simulated effect of the action plan is effective to cause the sustainability parameters to be within one or more thresholds, and in response to determining that the simulated effect is effective, send commands to the devices to maintain their respective operations according to the current sustainability action plan.

Various refinements of the features noted above may be made in relation to various aspects of this disclosure. Further features may also be incorporated in these various aspects as well. These refinements and additional features may be made individually or in any combination. For instance, various features discussed below in relation to one or more of the illustrated embodiments may be incorporated into any of the above-described aspects of this disclosure alone or in any combination. The brief summary presented above is intended only to familiarize the reader with certain aspects and contexts of embodiments of this disclosure without limitation to the claimed subject matter.

For clarity and simplicity of description, not all combinations of elements provided in the aspects of the invention recited above have been set forth expressly. Notwithstanding this, the skilled person will directly and unambiguously recognize that unless it is not technically possible, or it is explicitly stated to the contrary, the consistory clauses referring to one aspect of the embodiments described herein are intended to apply mutatis mutandis as optional features of every other aspect of the invention to which those consistory clauses could possibly relate.

BRIEF DESCRIPTION OF THE DRAWINGS

Various features, aspects, and advantages of this disclosure will become better understood when the following detailed description is read with reference to the accompanying figures in which like characters represent like parts throughout the figures, wherein:

FIG. 4 is a flow chart of a method for generating sustainability reports for enterprise operations employing the sustainability platform system of FIG. 3, according to one or more embodiments of this disclosure;

FIG. 7 is a flow chart of a method which the sustainability platform system may simulate sustainability action plans over a period of time for analysis, in accordance with embodiments herein.

FIG. 10 is a flow chart of a method for updating sustainability action plans based on changes detected in the input data provided by input the data sources, according to one or more embodiments of this disclosure;

FIG. 14 is a flow chart of a method for performing a search for input data associated with the sustainability of an enterprise and maintaining a database thereof, according to one or more embodiments of this disclosure;

DETAILED DESCRIPTION

Figure 1:
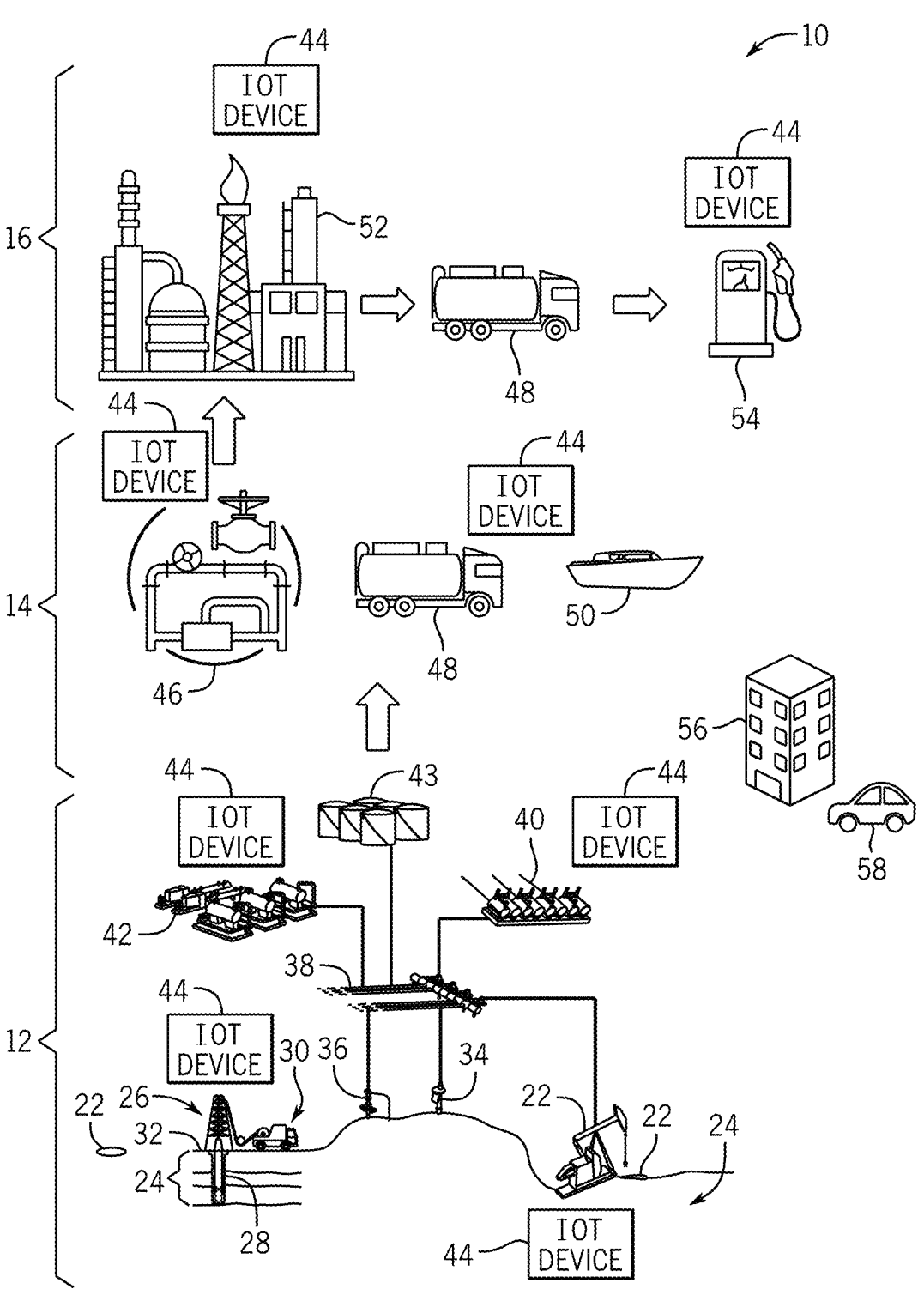
FIG. 1 illustrates a schematic diagram of example hydrocarbon production system that may include operations undertaken by an enterprise to produce, process, and distribute hydrocarbon products, according to one or more embodiments of this disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The drawing figures are not necessarily to scale. Certain features of the embodiments may be shown exaggerated in scale or in somewhat schematic form, and some details of conventional elements may not be shown in the interest of clarity and conciseness. Although one or more embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

When introducing elements of various embodiments of this disclosure, the articles "a," "an," and "the" are intended to mean that there are one or more of the elements. The terms "including" and "having" are used in an open-ended fashion, and thus should be interpreted to mean "including, but not limited to . . . ." Any use of any form of the terms "couple," or any other term describing an interaction between elements is intended to mean either an indirect or a direct interaction between the elements described.

Certain terms are used throughout the description and claims to refer to particular features or components. As one skilled in the art will appreciate, different persons may refer to the same feature or component by different names. This document does not intend to distinguish between components or features that differ in name but not function, unless specifically stated.

Hydrocarbon sites may include a number of components that facilitates the extraction, processing, and distribution of hydrocarbons (e.g., oil) from a well or well site. A hydrocarbon extraction site may include different types of facilities and equipment including extraction tools, pipelines, and the like. The operations related to the extraction of the hydrocarbons may often be referred to as upstream operations. After the hydrocarbons are extracted, the raw hydrocarbons may be transported via automobile vehicles, railways, barges, pipelines, or any suitable component to storage containers, processing centers, and the like. In some cases, the raw hydrocarbons may be treated (e.g., waste removed, compressed) prior to being transported to other facilities. These operations are often referred to as midstream operations. Finally, the hydrocarbons may be processed (e.g., refined) and distributed to end consumers, thereby covering downstream operations.

At each stage of operations, a certain amount of greenhouse gas emissions may be produced when performing various tasks associated with each stage. As industries move to providing a net zero carbon enterprise, the greenhouse gas emissions produced during these stages may be removed from the atmosphere. A number of action plans may be related to removing carbon from the atmosphere including afforestation, reforestation, soil carbon sequestration, carbon capture and storage technology, direct air capture technology, ocean fertilization, reducing emissions at the source, switching to sustainable power sources, reusing previously discarded resources, and the like. In addition to net zero carbon operations, industries are working to achieve improved sustainability parameters that reduce waste, conserve resources, and reduce the effects that their respective operations have on the environment.

In order to prepare action plans to achieve net zero operations, organizations may first determine baseline sustainability variable values (e.g., carbon, waste, water) that reflect the current operations of the entire organization or enterprise. That is, the organization may employ a sustainability platform system to collect data related to sustainability parameters from across the entire organization. By way of example, hydrocarbon enterprises may include a number of operations related to the manufacturing, processing, or production of hydrocarbon products. Indeed, hydrocarbon enterprises may involve operations related to upstream, midstream, and downstream operations. As such, to determine the baseline sustainability parameters, the sustainability platform system may collect data from sensors, forecasting models, reports, internet-of-things (IoT) devices, image data (e.g., optical gas imaging), flaring control measurements, and other suitable data sources. Using the collected data over time, the sustainability platform system may determine baseline sustainability parameters (e.g., carbon footprint, waste levels, water usage) for the entire operational flow of the enterprise over a period of time (e.g., days, weeks, months, years).

Based on the macro outlook of future sustainability goals as provided by a user, the sustainability platform system may then employ a planning module to determine action plans to determine a number of sustainability operations to employ to cause the baseline sustainability parameters to trend towards net zero operations. The planning operations employed by the sustainability platform system may involve reviewing digital models, empirical models, or insights received from previous operations at facilities other than the respective enterprise to determine operational changes to operations performed within the enterprise, additional operations (e.g., install carbon capture technology) to add to the enterprise, and/or other suitable action plans to cause the enterprise operations to improve sustainability parameters.

The action plans may thus be related to facility level operations that optimize sustainability efficiencies at a facility level that may involve modifying certain processes (e.g., order of operations and/or timing for performing tasks based on a sustainable energy source schedule). The facilities of an enterprise may be related to buildings in which engineers and office personnel visit, as well as structures that support industrial operations such as production or refining operations. By evaluating the sustainability parameters with respect to the facility level, the sustainability platform system may provide action plans to coordinate facility operations (e.g., work from home days, lighting operations, operational task schedules, tool selections, equipment operating parameters) to improve sustainability efficiencies.

In addition, enterprises may perform certain operations to produce or manufacture a product. The sustainability platform system may also evaluate these product level operations to identify different processes, equipment, or devices to use to improve sustainability parameters related to the operations that correspond to the operations involved in producing or manufacturing a product. By way of example, a product carbon footprint (PCF) may be generated based on the techniques described herein to illustrate a total of the greenhouse emissions generated by a product over the different stages of its life cycle. For instance, a cradle-grave PCF may include greenhouse emissions from operations related to extraction of raw materials to operations related to the end-of-life of the product.

With the foregoing in mind, the sustainability platform system may measure the sustainability parameters for the enterprise at various levels, provide reports related to the measured values, and verify the measurements to ensure that a developed action plan, when implemented, may improve sustainability efficiencies within the enterprise operations. It should be noted that the measured sustainability parameters may also be sourced or estimated as provided by certain data sources, such as emissions databases provided by EPA, IEA, and the like. In some embodiments, the sustainability platform system may collect the measured and verified data to provide reports for meeting certain governmental reporting regulations. Further, the sustainability platform system may model the determined action plans to predict the effects to the measured sustainability parameters over a period of time to determine whether the sustainability parameters will achieve desired values or ranges.

After generating the action plan, the enterprise operations may implement the outlined actions of the action plan by adjusting the operations of facilities, the operations of the production services, or the like. As the action plan takes effect, the sustainability platform system may continue to measure, validate, and report the sustainability parameters that were previously collected to perform feedback analysis to determine the effectiveness of the action plan. The results may be stored in a database or other suitable storage component to serve as empirical data for assisting other enterprises achieve their sustainability goals. Further, the feedback may be provided to the models used to generate the action plans to better calibrate certain machine learning parameters or coefficients, such that the models may more accurately reflect the actual measurements.

With the foregoing in mind, the present embodiments described herein provide a computationally efficient manner to monitor, track, project, and adjust sustainability parameters associated with operations throughout an enterprise. Indeed, some systems use integrated workflows that become prohibitively expensive with respect to cost and computational processing power by determining recommendations for achieving improved sustainability parameters without incorporating feedback mechanisms, real-time data sources, and updated projections, as described herein. By continuously tracking and updating the sustainability action plans generated for an enterprise based on input data changes detected in real time, the present embodiments may incrementally update portions of a sustainability model without independently regenerating the respective sustainability model for the enterprise. In this way, operation personnel of the enterprise may be notified in a timely manner to adjust operations for ensuring that certain sustainability target goals are achieved over a period of time as circumstances change.

Unlike other sustainability evaluation processes, which may be prohibitively slow with exhaustive sustainability parameters to account for, the present embodiments provide a more efficient analysis that reduces the amount of processing power employed by computing systems tasked to determine the recommended sustainability action plans by employing action plan modules or systems that focus on specific sustainability parameter improvements. In other words, other optimization schemes are limited by certain memory and computational parameters of existing computing systems to provide useful facilities recommendations for hydrocarbon site planning operations. However, by processing of different datasets modularly (e.g., set portions), the present embodiments described herein may allow for the ability to trade computer processing time/resources for precision of the optimal solution.

It should be noted that although the following description of various embodiments for improving sustainability parameters is described with respect to hydrocarbon enterprise operations, it should be understood that the embodiments described herein may be applied to any suitable industry including utilities, cementing operations, steel factories, and the like. Further, although the following description of the various methodologies may be detailed in the context of a particular industry or technology area, it should be noted that the methodologies described herein may be implemented within other suitable areas.

By way of introduction, FIG. 1 illustrates a schematic diagram of an example hydrocarbon production system 10 where hydrocarbon products, such as crude oil and natural gas, may be extracted from the ground, stored, transported, processed, distributed, and the like. The example hydrocarbon production system 10 is provided as an example enterprise that includes a number of different units that coordinate with each other to perform various tasks. For instance, the enterprise may include a collection of equipment, buildings, personnel, raw materials, office buildings, and other components that encompass at least some aspect of the business operations of the enterprise. In the example hydrocarbon production system 10 described below, the enterprise includes all of the processes, employees, operations, buildings, equipment, and other related components that enable the enterprise to produce, transport, and distribute hydrocarbon products. In the same way, the present embodiments described herein may be applied to other enterprises that provide other products and services and should not be limited the hydrocarbon production system 10 described below.

Referring now to FIG. 1, the hydrocarbon production system 10 may generally include an upstream system 12, a midstream system 14, and a downstream system 16. The upstream system 12 may include a number of components and equipment associated with the exploration and production of hydrocarbons. As such, geological surveys that employ seismic sources (e.g., vibrators, air guns), seismic sensors, and other equipment (e.g., fracking trucks) used for hydrocarbon exploration services may be included in the upstream system 12, although not illustrated in FIG. 1.

In addition, the upstream system 12 may include a number of components or facilities that correspond to wells, processing facilities, collection components, distribution networks, and the like. For example, as shown in FIG. 1, the upstream system 12 may include a number of wells 22 disposed within a geological formation 24. The wells 22 may include drilling platform 26 that may have performed a drilling operation (e.g., on land or subsea) to drill out a wellbore 28. Additionally, as used herein, wells 22 may generally refer to physical components such as the drilling platform 26 and wellbore 28 and/or the general area of the reservoir in which extraction is desired (e.g., a reservoir well section). The drilling operations may include drilling the wellbore 28, injecting drilling fluids into the wellbore 28, performing casing operations within the wellbore 28, exploratory operations measuring the viability of the wellbore 28, extraction operations, and the like. In addition to including the drilling platform 26, the upstream system 12 may include surface equipment 30 that may carry out certain operations, such as cement installation operation, well logging operations to detect conditions of the wellbore 28, and the like. As such, the surface equipment 30 may include equipment that store cement slurries, drilling fluids, displacement fluids, spacer fluids, chemical wash fluids, and the like. The surface equipment 30 may include piping and other materials used to transport the various fluids described above into the wellbore 28. The surface equipment 30 may also include pumps, electric or gas-powered motors, and other equipment (e.g., batch mixers, centrifugal pumps, liquid additive metering systems, tanks, etc.) that may be used with or a part of the interior of a casing string with the fluids discussed above.

In addition to the equipment used for drilling operations, the upstream system 12 may include a number of well devices that may control the flow of hydrocarbons being extracted from the wells 22. For instance, the well devices in the upstream system 12 may include pumpjacks 32, submersible pumps 34, well trees 36, and the like. The pumpjacks 32 may mechanically lift hydrocarbons (e.g., oil) out of the well 22 when a bottom hole pressure of the well 22 is not sufficient to extract the hydrocarbons to the surface. The submersible pump 34 may be an assembly that may be submerged in a hydrocarbon liquid that may be pumped. As such, the submersible pump 34 may include a hermetically sealed motor, such that liquids may not penetrate the seal into the motor. Further, the hermetically sealed motor may push hydrocarbons from underground areas or the reservoir to the surface. The well trees 36 may be an assembly of valves, spools, and fittings used for natural flowing wells. As such, the well trees 36 may be used for an oil well, gas well, water injection well, water disposal well, gas injection well, condensate well, and the like. By way of reference, the wells 22 may be part of a first hierarchical level and the well devices that extract hydrocarbons from the wells 22 may be part of a second hierarchical level above the first hierarchical level.

After the hydrocarbons are extracted from the surface via the well devices, the extracted hydrocarbons may be distributed to other devices via a network of pipelines 38. That is, the well devices of the upstream system 12 may be connected together via a network of pipelines 38. In addition to the well devices described above, the network of pipelines 38 may be connected to other collecting or gathering components, such as wellhead distribution manifolds 40, separators 42, storage tanks 43, and the like.

In some embodiments, the pumpjacks 32, the submersible pumps 34, well trees 36, wellhead distribution manifolds 40, separators 42, and storage tanks 43 may be connected together via the network of pipelines 38. The wellhead distribution manifolds 40 may collect the hydrocarbons that may have been extracted by the pumpjacks 32, the submersible pumps 34, and the well trees 36, such that the collected hydrocarbons may be routed to various hydrocarbon processing or storage areas in the upstream system 12, the midstream system 14, or the downstream system 16. The separator 42 may include a pressure vessel that may separate well fluids produced from oil and gas wells into separate gas and liquid components. For example, the separator 42 may separate hydrocarbons extracted by the pumpjacks 32, the submersible pumps 34, or the well trees 36 into oil components, gas components, and water components. After the hydrocarbons have been separated, each separated component may be stored in a particular storage tank 43. The hydrocarbons stored in the storage tanks 43 may be transported via the pipelines 38 to transport vehicles, refineries, and the like.

In addition to the components described above, internet-of-things (IoT) devices 44 may be distributed throughout the upstream system 12, the midstream system 14, and the downstream system 16 and may collect information, perform analysis on data, send data related to a respective component or parameters (e.g., temperature, flow) of a component to a computing system or the like. By way of example, the IoT device 44 may include sensors, actuators, machines, or other equipment that may include a processor that execute computer instructions and performs certain tasks including collecting data, processing data, and communicating data over a network.

Although the hydrocarbon production system 10 is described above with certain components, it should be understood that the hydrocarbon production system 10 may include additional, fewer, or different components. For example, although discussed above in relation to the hydrocarbon production system 10 on land, present embodiments may also apply to off-shore hydrocarbon sites.

After extracting, transporting, and storing the hydrocarbons in the upstream system 12, the hydrocarbons may be transported and stored in the midstream system 14. The midstream system 14 may thus include pipeline infrastructure 46 that may move the extracted hydrocarbons across certain terrains and geographic locations to facilities to process, refine, or store the hydrocarbons. The pipeline infrastructure 46 may include similar devices as described in the upstream system 12 such as the separators 42 and storage tanks 43, as well as other components that may assist in moving the hydrocarbons long distances, such as pumping stations, tank trucks 48, rail tank cars, barges 50, and the like. The IoT devices 44 may thus track the flow of the hydrocarbons, the valves for directing the hydrocarbons within the pipelines, the locations of the vehicles used to transport the hydrocarbons, and the like. In some embodiments, the IoT devices 44 may include autonomous control systems to control the operations of the vehicles transporting the hydrocarbons.

The downstream system 16 may include components that may convert the transported hydrocarbons into final petroleum or gas products. The operations performed by the downstream system 16 may include refining the hydrocarbons into different products such as gasoline, diesel, oils, lubricants, petrochemicals, and the like. As such, the downstream system 16 may include a refinery system 52 for processing the hydrocarbons. By way of example, the refinery system 52 may include distillation towers to separate the hydrocarbons, heat exchangers to transfer heat between different fluids, pumps used to move fluids, reactors to perform chemical reactions for processing the hydrocarbons, separators 42, compressors, storage tanks, and the like. After the hydrocarbons are converted into hydrocarbon products, they may be transported to other locations for distribution via tank trucks 48 or other suitable distribution mechanisms. For instance, the hydrocarbon products (e.g., gasoline) may be distributed to a fuel station to distribute fuel to consumers via a gas pump 54.

In addition to the upstream system 12, the midstream system 14, and the downstream system 16, the enterprise may include buildings 56, vehicles 58, and other objects that are owned, leased, or operated by an organization. These tangential or supplemental objects may be involved in the planning, marketing, accounting, and supplementary business aspects for commercializing the hydrocarbon production system 10. Although only the buildings 56 and vehicles 58 are depicted as supplementary objects associated with the enterprise in FIG. 1, it should be understood that other supplementary objects may also be considered part of the enterprise.

Each of the components and subsystems of enterprise described above (e.g., the upstream system 12, the midstream system 14, the downstream system 16, office building 56) involves the consumption of resources such as energy and water. Further, these systems also produce a certain amount of waste greenhouse gas (GHG) emissions while performing their respective operations. The resource, waste, and emission amounts vary for different portions of each respective system, but the aggregated resource, waste, and emission amounts may include a planning phase (e.g., within building 56), a construction phase, an operation phase, a decommissioning phase, and the like. In addition, each of these phases at each system level (e.g., upstream, midstream, downstream, office) produces greenhouse gas (GHG) emissions such as carbon dioxide, methane, and the like. The resources, waste, GHG emissions, and other byproducts consumed and produced during these operations may be referred to as sustainability parameters. Enterprises may generally move to improve sustainability parameters by focusing on one or more of increasing energy efficiencies, reducing water usage, curbing GHG emissions, decreasing waste amounts, and the like. The sustainability parameters may be interdependent with each other and the enterprise may reduce the environmental impacts of their operations by coordinating their operations to improve the aggregate sustainability parameters across the enterprise. As shown in FIG. 1, any type of enterprise may involve a diverse group of equipment, processes, structures, and the like. In accordance with the embodiments described herein, a sustainability platform system may track and monitor sustainability parameters across the variety of levels, operations, and aspects of the enterprise to provide sustainability action plans to revise enterprise operations and structures to improve sustainability parameters. Indeed, as more industries move to achieve net zero compliance in which the enterprise achieves a balance between the amount of GHG emissions produced by the enterprise operations and removed from the atmosphere, efficient generation of efficient action plans for reduced GHG emissions and other sustainability operations may be increasingly important.

Keeping this in mind, the present embodiments described herein may include systems and methods for improving sustainability operations across enterprise operations. For example, a data flow diagram 70 of operations performed by a sustainability platform system 72 is presented in FIG. 2. The data flow diagram 70 may use inputs from data sources to generate sustainability action plans to adjust operations and/or procedures within an enterprise to improve sustainability parameters. Although the data flow diagram 70 illustrates a set of input data sources 74, a methodology 76, and a set of engineering workflow systems 78, it should be noted that the elements illustrated in FIG. 2 do not constitute an exhaustive list of elements that may be part of the data flow diagram 70 and used to perform the methods described herein. Instead, the depicted elements are merely provided as examples to provide context and to supplement the explanation of the embodiments described herein.

Figure 2:
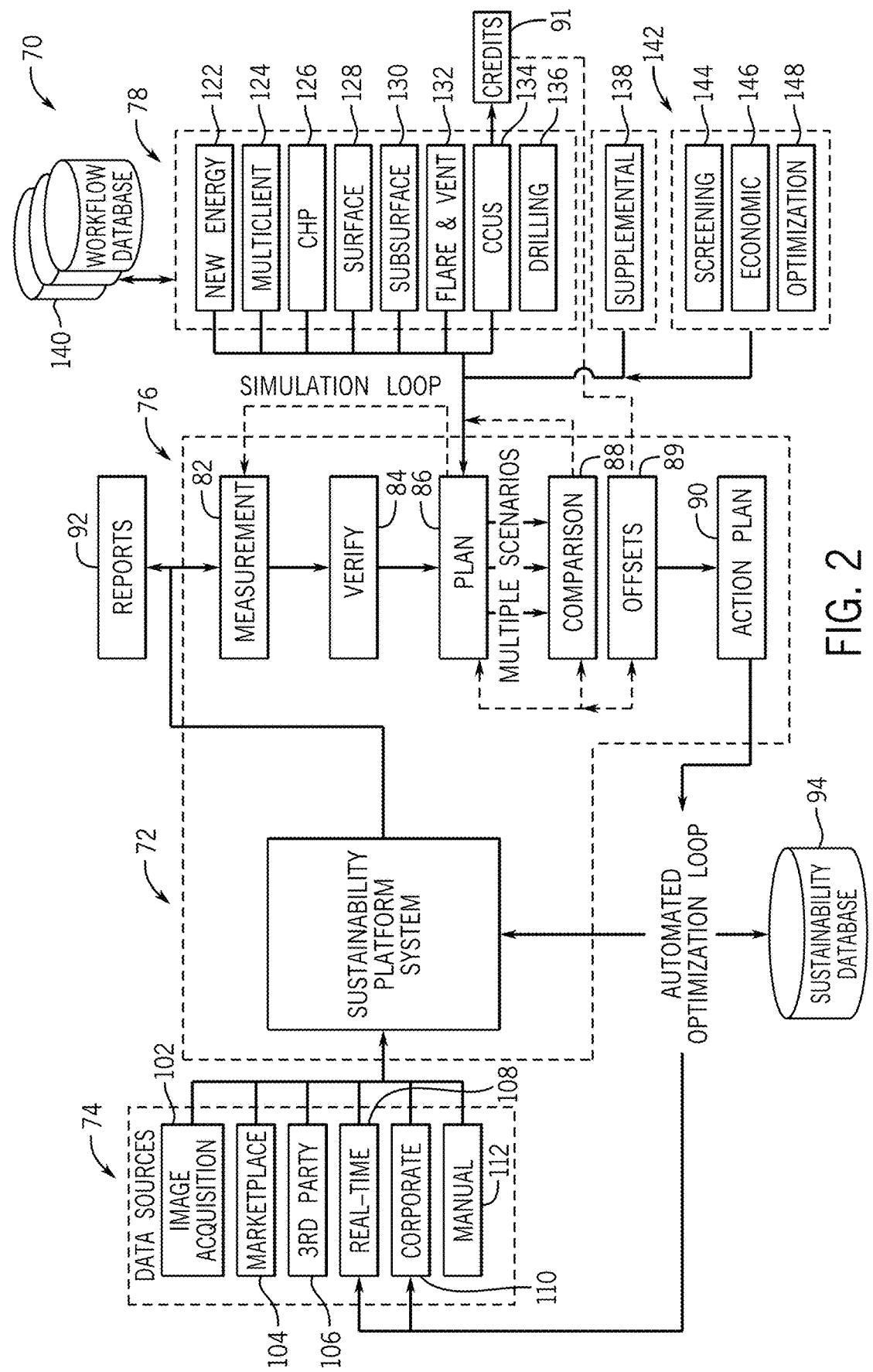
FIG. 2 is a data flow diagram in which inputs from data sources are used to generate workflow plans to adjust operations and/or procedures within an enterprise to improve sustainability parameters, according to one or more embodiments of this disclosure.

Referring now to FIG. 2, the sustainability platform system 72 may include any suitable computing device, cloud-computing device, or the like and may include various components to perform various analysis operations. By way of operation, the sustainability platform system 72 may receive input data regarding measured sustainability parameters, policies for sustainability programs, and other information from a set of input data sources 74. Based on the input data, the sustainability platform system 72 may perform certain calculations, analyses, or operations to track sustainability parameters across enterprise operations, report the sustainability parameters with respect to legislative policies or regulations, identify relationships between operational parameters for facilities, devices, and other components that are part of the enterprise and the measured sustainability parameters, and the like.

In some embodiments, the sustainability platform system 72 may implement the methodology 76 that may include a measurement block 82, a verification block 84, a planning block 86, and a comparison block 88. After receiving input data, analyzing the input data with respect to the engineering workflow systems 78, the sustainability platform system 72 may generate one or more action plans 90 that may detail operational changes for facilities, machinery, and the like. After the action plans 90 are put in place within the enterprise operations, the sustainability platform system 72 may again receive the input data to determine the effectiveness of the action plans 90, provide improved action plans 90, and continuously improve the sustainability parameters across the enterprise operations for the life of the enterprise.

Generally, the measurement block 82 may receive the input data and store the related measurements, values, and other measurable parameters in a storage component, data store, or the like. In some embodiments, the measurement block 82 may prepare or organize the measurement data in accordance with specific protocols or formats, as defined by reports 92. The reports 92 may include previous reports prepared for different authorities or organizations. As such, the reports 92 may also include metadata related to the format, structure, and type of information presented in the reports 92. In some embodiments, the reports 92, the metadata regarding the reports 92, instructions regarding the preparation or formatting of the reports 92 may also be stored in a database or data storage for access by the sustainability platform system 72.

The measurement data recorded by the measurement block 82 may be validated by the verification block 84. That is, the verification block 84 may analyze or query other input data to verify that the recorded measurement data is accurate. For example, the measurement block 82 may receive a measurement from the IoT device 44 regarding some sustainability parameter, such as energy consumption. The verification block 84 may retrieve corporate energy invoices to determine whether the energy consumption measured by the IoT device 44 corresponds to the energy consumed according to the utility providing the energy.

The planning block 86 may use the verified measurement data to query the engineering workflow systems 78 to generate one or more potential action plans or scenarios for improving the sustainability parameters. The engineering workflow systems 78 may include a number of distinct modules or systems that provide recommendations (e.g., equipment recommendation, operational change recommendation) for various portions of the enterprise to improve distinct aspects of sustainability or gain insight to better determine a plan for improving sustainability parameters across the enterprise. For instance, the engineering workflow systems 78 may include a new energy system that tracks new energy sources that may be used to meet the energy requests of various portions of the enterprise. The new energy sources may include renewable energy sources to improve the sustainability parameters for the enterprise operations. As such, the new energy system may determine whether alternative energy sources can be used to replace energy sources that may be less sustainable.

After generating a number of potential plans or scenarios, the comparison block 88 may analyze the collection of potential plans to determine whether plans could be combined, provide comparison data for different sustainability parameters associated with the generated plans, and the like. Additionally, in some embodiments, an offset block 89 may augment the potential plans to form an action plan 90. For example, carbon credits 91 (e.g., purchased or created via carbon capture) may be factored into the comparison and evaluation of potential plans to achieve goals of an action plan 90. The comparison data may be presented to a user via an electronic display or any suitable display technology. As should be appreciated, in some embodiments, the comparison block 88 and/or the offset block 89 may be considered part of the plan block 86. In some embodiments, the plans or comparison data may be sent to user devices (e.g., mobile phone) and may cause the user devices to automatically open or execute an application associated with the sustainability platform system 72, such that the user device presents visualization related to the determined plans, the comparison data, or the like. In some embodiments, the visualizations may be selectable input fields in which the user may touch or select via an input device (e.g., keyboard, mouse). After receiving a selection or acceptance of an action plan 90, the sustainability platform system 72 may send the action plan 90 to other user devices, a sustainability database 94, or other suitable recipient, such that the enterprise may make changes to its operations to implement the recommendations outlined in the action plan 90. In some embodiments, the sustainability platform system 72 may send commands to equipment (e.g., lights, pumps, wellheads, artificial lifts), such as via IoT devices 44, to adjust operations based on the recommended action plan 90 to improve the sustainability parameters associated with the enterprise.

Referring now to the input data sources 74, in some embodiments, the sustainability platform system 72 may receive data from image acquisition sources 102, marketplace sources 104, third-party data sources 106, real-time data sources 108, corporate data sources 110, manual data sources 112, and the like. The image acquisition sources 102 may include devices that may acquire image data (e.g., pictures, video, infrared image) using any suitable image sensor. As such, the devices may include satellites, drones, infrared sensors, cameras, and the like. The image data provided by the image acquisition sources 102 may correspond to heat dissipating from a device, gas leaking from a device, emissions (e.g., fumes, height of fumes) produced by a device, or any other suitable image data that may provide information related to any suitable sustainability parameter. In some embodiments, the sustainability platform system 72 may determine an approximate amount of emissions based on the image data. Although the determined amount may not be precise, the measurement block 82 may use the initial estimate as a data point and use other data points to verify via the verification block 84 using other data.

The marketplace sources 104 may include data provided by analysis software, crowdsourcing systems, and other data sources that may be facilitated by a marketplace such as the Ocean Store provided by Schlumberger and other like sources. That is, the marketplace sources 104 may include data provider sources or services that capture, generate, or simulate certain datasets (e.g., emissions, waste, water usage, energy consumption) for use by the sustainability platform system 72 as ready-made data. For instance, emissions data may be provided by certain marketplace data sources 104 that may be able to broadcast or present their available data services for integration with the sustainability platform system 72 via an integration tool, a network location, the sustainability platform system 72 itself, or the like. The supplied data (e.g., emissions data) may be incorporated for calculation purposes, analysis purposes, simulation purposes, or the like. Indeed, the data provided via the marketplace sources 104 may include emission factors from various sources such as IPCC, IEA, EIA, and the like, as well as publicly available frameworks such as TCFD, GHG protocol, and the like. In some cases, the marketplace sources 104 may provide data services for a fee (e.g., subscription) and may coordinate data exchange via the sustainability platform system 72 to enhance the data analysis operations while employing solutions provided by the engineering workflow systems 78 and the like.

As such, different insights with regard to the received data may be determined or gleaned by the sustainability platform system 72 based on the software modules or solutions provided via the marketplace sources 104. In addition to the examples provided above, the marketplace sources 104 may provide virtual metering data to provide an estimated flow amount for a pump. That is, an application or tool may be provided by the marketplace sources 104 that uses an efficiency of the pump to determine a virtual amount of flow of fluids via the pump based on the amount of time that the pump was operating. Although the present disclosure describes certain exemplary services that may be received via the marketplace sources 104, it should be understood that the marketplace sources 104 may be provided by any suitable application, data system, or other component that may interact and exchange information with the sustainability platform system 72.

The third-party data sources 106 may include supplier information provided by a manufacturer or other entity regarding a device, system, facility, or the like. Using the pump example mentioned above, the third-party data sources 106 may provide a datasheet or operational data that details the efficiency, energy consumption rate, and other information related to the operation of the pump. In addition, third-party data sources 106 may correspond to data sources that may be utilized by the sustainability platform system 72 to perform various operations via the planning block 86, in coordination with the engineering workflow systems 78, and the like. By way of example, the third-party data sources 106 may include data service providers that perform independent research and business intelligence analysis such as Rystad, Gartner, Statista, and the like. In addition, data projections for different organizations may be provided via the marketplace sources 104 as these organizations acquire these data projections (e.g., OpEx/CapEx) such as historical emission figures, geographies of areas for operation, number of present facilities, number of fields, and the like. Although the present disclosure describes certain exemplary services that may be received via the third-party data sources 106, it should be understood that the third-party data sources 106 may be provided by any suitable application, data system, or other component that may interact and exchange information with the sustainability platform system 72.

The real-time data sources 108 may include data provided by sensors, devices, and other data sources via a network connection. As such, the real-time data sources 108 may include the IoT devices 44, as well as any smart component that may be part of the enterprise. In addition, the real-time data sources 108 may include routers and other data collection point devices that may receive data (e.g., sensor data) from other systems, computing devices, instruments, and the like.

The corporate data sources 110 may include data provided by corporate entities associated with the enterprise or other organization. For instance, many enterprises may use enterprise resource planning (ERP) software systems to assist in coordinating and tracking business operations such as finance, human resources, field operations, manufacturing, production, supply chain, procurement, customer service, and any other suitable business operation. The corporate sources may also include memorandums, company earning reports, sustainability reports, and other publications provided by the enterprise that may describe various operations, goals, and finances associated with the enterprise. In some embodiments, the corporate data sources 110 may provide a ERP report that details employees that work in a facility, the addresses associated with the employees, the schedules of the employees, the salary information for the employees, the utility invoices for the buildings accessed by the employees, and the like. This information may enable the sustainability platform system 72 to measure emissions related to the enterprise operations to generate insights regarding priorities to address. Further, the information may be used to provide action plans 90 at a facility level, such as recommending changes to work schedules that may encourage work from home days to offset sustainability liabilities in different parts of the enterprise.

The manual data sources 112 may include any data manually provide to the sustainability platform system 72 via user input or the like. For instance, the sustainability platform system 72 may provide a user interface that solicits inputs from a user regarding various parts of the enterprise operations. The user input may be provided to the sustainability platform system 72 and used for generating the action plans 90 via the methodology 76.

Referring now to the engineering workflow systems 78, the sustainability platform system 72 may employ one or more of the engineering workflow systems 78, independently or in combination with one or more other systems, to determine recommendations for changing enterprise operations. As used herein, enterprise operations may include any building, operation, task, or activity related to the products and services produced by the enterprise. As such, for example, the enterprise may include any of the activities related to those described above with respect to the hydrocarbon production system 10 from the upstream system to operations related to the function of the building 56. In this way, the sustainability platform system 72 may holistically evaluate an overall sustainability for the enterprise operations and determine effective and creative solutions to achieve net zero goals.

Each of the engineering workflow systems 78 may perform specific analysis operations to determine solutions for the respective technology areas. That is, the engineering workflow systems 78 may assist with the designing and monitoring of abatement solutions (e.g., emission abatement, waste abatement, etc.). As such, each engineering workflow system 78 may include a separate computing device, cloud system, or the like that independently analyzes data and produces outputs. Each engineering workflow system 78 may thus send queries for information or data to the sustainability platform system 72, which may serve as data intermediary to assist each engineering workflow system 78 in retrieving relevant information to allow the respective engineering workflow system 78 to perform its analysis. In the same manner, the sustainability platform system 72 may query one or more engineering workflow systems 78 to retrieve solutions, analysis, recommendations, or the like to determine action plans to improve sustainability parameters. Although the following discussion of the types of the engineering workflow systems 78 include a certain number of systems, it should be noted that additional systems may also be part of the engineering workflow systems 78.

As shown in FIG. 2, the engineering workflow systems 78 may include a new energy system 122, a multiclient system 124, a CHP system 126, a surface system 128, a subsurface system 130, a flare and vent system 132, a CCUS system 134, a drilling system 136, and a supplemental system 138. As mentioned above, each of the engineering workflow systems 78 may coordinate operations with the sustainability platform system 72 to perform the methodology 76 and generate action plans 90. However, by using different modules or systems to analyze different aspects of engineering, the present embodiments described herein enable the sustainability platform system 72 to preserve computing resources for coordination and integration operations (e.g., collection and transmission of data, organizing plans, coordinating feasibility of different plans for enterprise) between the input data sources 74 and the engineering workflow systems 78 without analyzing different engineering solutions for sustainability improvements. It should be noted that each of the engineering workflow systems 78 may be complex systems that operate on their own respective platforms (e.g., processing systems, storage components, network connections) to perform various types of data analysis, operations, simulations, and the like. In addition, the output data provided by these engineering workflow systems 78 or used by the same may be stored for use by various entities in workflow databases 140 or other suitable storage component.

By way of example, the new energy system 122 may track, monitor, simulate, and design solutions for various industries to achieve more sustainable energy goals. The new energy system 122 may receive invoice data for energy costs associated with the enterprise (e.g., corporate data source 110), real-time energy usage from IoT devices (e.g., real-time data sources 108), and other relevant data regarding the energy consumption data for various aspects of the enterprise. The energy consumption data may include utility provider information that indicates the source of the energy (e.g., coal, renewable), a rate schedule for the provided utilities, and the like. The new energy system 122 may also include databases or storage components that include models that represent other enterprise or facility operations, simulated models generated by artificial intelligence (e.g., neural networks, pattern analysis), machine learning algorithms, or the like. The models or lookup tables may provide information related to the amount of energy provided to different enterprises, the type of energy provided to these enterprises, the costs associated with commissioning these energy sources, and the like. For instance, the new energy system 122 may model the ability of wind farms and solar panel fields to provide energy for one or more facets of a particular enterprise. Alternative sources may also include renewable energy options such as solar power, wind power, hydroelectric power, hydrogen, geothermal energy, biomass, and other suitable alternative energy sources. The model may also include cost projections for commissioning these energy sources, as well as projections over the life of the enterprise. These models may be employed by the sustainability platform system 72 to determine action plans to apply to its respective input data related to the respective enterprise and identify action plans 90 that may assist in improving energy sustainability parameters for the enterprise. In addition to providing alternative energy sources, the new energy system 122 may also provided recommendations with regard to storing energy in batteries, storing hydrogen for later use, storing geothermal energy for use, and the like.

The combined heat and power (CHP) system 126 may perform analysis to determine methods for reusing emissions such as carbon dioxide to increase efficiency. For instance, heat can be recaptured during a portion of a process and the heat can be applied to a heat exchanger to produce energy or perform some other function using the heat recaptured from performing another process within the enterprise. As such, the CHP system 126 may request image data and infrastructure or design data for facilities of the enterprise from the sustainability platform system 72 to identify process components that may produce heat or power that may be recaptured and recycled for other functions within the enterprise. In any case, the CHP system 126 may help the sustainability platform system 72 determine action plans 90 that improve energy efficiency and reduce facility carbon emissions.

The multiclient system 124 may include data analysis systems from other sources. Indeed, these sources may provide information related to the operations of the enterprise that may be gleaned from the input data received by the sustainability platform system 72 but may not be determined by the sustainability platform system 72.

The surface system 128 may include computing systems and databases of information that details operational data regarding various types of equipment that may be installed on the surface of the hydrocarbon production system 10. As such, the surface system 128 may continuously update its data sources to track updated versions of components, identify replacement parts and products for components, track efficiency improvements of components, monitor recalls or issues with installed components, and the like. The surface system 128, for example, may receive real-time data via the sustainability platform system 72 and determine that certain pieces of equipment are operating inefficiently, are reaching an end of life, has a more energy efficient counterpart available, or the like. The sustainability platform system 72 may coordinate with the surface system 128 to identify replacements, new components to add to the enterprise, and the like to improve the sustainability parameters of the enterprise operations.

In the same manner, the subsurface system 130 may include computing systems and databases of information regarding equipment that may be part of subsurface operations in the hydrocarbon production system 10. As such, the subsurface system 130 may provide recommendations with regard to improved data acquisition processes, techniques, equipment, and the like that may enable the enterprise to improve sustainability parameters. By way of example, the subsurface system 130 may determine improved seismic data acquisition techniques that consume less energy as compared to previous techniques using existing equipment in the enterprise.

The flare and vent system 132 may provide recommendations with regard to flaring and venting excess emissions. In some embodiments, the excess emissions may be captured using carbon capture technology. As such, the flare and vent system 132 may coordinate with the carbon capture (CCUS) system 134 to determine carbon capture technology for storing captured carbon. The CCUS system 134 may provide data regarding costs, installation profile, and operations for carbon technology and recommendations with regard to injecting the captured carbon into appropriate locations. In some embodiments, captured carbon may not be useful for a particular enterprise but may be useful for other enterprises. As such, the CCUS system 134 may identify the industries or organizations that may use the captured carbon in an efficient manner.

The drilling system 136 may provide recommendations with regard to drilling operations for creating boreholes, wells, and the like. The drilling operations may include equipment information, slurry makeup, drilling fluids, water conservation operations, and the like. Further, the supplemental system 138 may include recommendations for other industries, suppliers, distributors, or consumers associated with the enterprise. For instance, the supplemental system 138 may include gasoline distribution facilities with gas pumps 54 that provide gasoline to consumers. The supplemental system 138 may provide information with regard to improving sustainability parameters for operations that occur between the enterprise associated with the sustainability platform system 72 and the organization operating the gasoline distribution facilities.

In addition to the engineering workflow systems 78, strategy level planning systems 142 may interact with the sustainability platform system 72 to perform strategic planning operations for determining sustainability action plans 90, performing screening analysis, determining economic aspects of the action plans 90, determining optimization functions for the action plans 90, and the like. That is, the strategy level planning systems 142 may evaluate an organization's sustainability operations at various hierarchical levels to perform some strategic planning for certain operations, such as performing decarbonization operations. By way of example, the strategy level planning systems 142 may include screening systems 144, economic systems 146, optimization systems 148, and other systems that may analyze the feasibility and viability of implementing certain sustainability action plans 90.

With this in mind, the strategy level planning systems 142 may perform materiality assessment to provide the enterprise with an opportunity to analyze risks and opportunities associated with implementing the action plans 90, and to make any adjustments necessary to improve its business strategy. The assessment helps the organization understand where it is creating or reducing value for society and represents a comprehensive business case to senior executives about why and how to report ESG (environmental, social, governance) data and manage ESG performance. The information obtained and tracked on the platform may essentially help companies in this decision-making process towards their decarbonization strategy. With clear visibility across all 3 scopes (e.g., environmental, social, governance), materiality assessment would be facilitated. In this way, the strategy level planning system 142 may enable the sustainability platform system 72 to review action plans 90 with respect to government variable, risk management variable, target metrics, and the like.

In some embodiments, the strategy level planning systems 142 may perform evaluation operations based on organizational boundaries and operational boundaries. Organizational boundaries may determine operations that are operated and owned or controlled by the enterprise and thus are included in inventory analysis. The organizational boundaries may account for emissions according to an equity share in the enterprise associated with the respective operations (e.g., equity share approach) or with respect to the aspects of the enterprise that the enterprise may control (e.g., control approach). By way of example, the control approach may include financial control or operational control.

Operational boundaries determine which operations and sources generate emissions, associate sources for inventory, and explanations with regard to how the sources are classified. In some cases, the operational boundaries may attribute emissions as direct emissions and indirect emissions. With this in mind, certain organizations evaluate sustainability by tracking their emissions effectively as direct emission and indirect emissions. This tracking may help the sustainability platform system 72 understand hotspots for the enterprise and subsequently develop carbon footprint reduction plans and subsequent business strategy/future investment. In this way, the sustainability platform system 72 may help companies across a wide range of solutions in the hard-to-abate industries starting from measuring emissions to verifying and reporting. Subsequently, the sustainability platform system 72 may help them in their decarbonization pathway through the engineering capabilities accessible via the platform as described herein.

In some embodiments, the screening system 144 may perform some technical analysis with respect to overall or high-level system perspectives to determine a relative effectiveness of implementing or conducting sustainability improvement operations on the enterprise. The screening system 144 may then use the high-level analysis to coordinate with other engineering workflow systems 78 to determine suitable action plans 90 that may be beneficial for the enterprise.

In the same manner, the economic system 146 may provide economic or financial data related to the operational costs of the enterprise, economic considerations for improving sustainability parameters for the enterprise, and the like. In this way, the economic system 146 may provide some insight into economic cost benefits for implementing certain action plans 90. In addition, the economic system 146 may coordinate with engineering workflow systems 78 to assess costs for performing certain tasks and/or for determining the economic feasibility of certain action plans 90.

The optimization system 148 may determine or analyze optimization parameters for performing certain action plans 90. For instance, the optimization system 148 may determine optimization parameters for reducing cost per carbon in decarbonization plans. In any case, the strategy level planning systems 142 may assist the sustainability platform system 72 to perform economic analysis to perform operations such as selecting action plans 90, engaging engineering workflow systems 78, selecting input data sources 74, and the like when determining or implementing action plans 90 or performing other suitable operations.

By coordinating the various components described in FIG. 2 and throughout the application, the sustainability platform system 72 may provide a seamless integration and understanding with ESG scoring and reporting tools, which are designed to assess and measure the sustainability and societal impact of companies and investments. As such, the sustainability platform system 72 may help organizations evaluate their performance in key ESG areas and provide transparent reporting to stakeholders.

Further, it should be noted that although the embodiments described herein are detailed with respect to existing enterprise operations, in some embodiments, the sustainability platform system 72 may be used in earlier phases of business development such as field development planning. That is, field development planning may include facility and infrastructure planning operations for building new facilities in various industries. The sustainability platform system 72 and the methods described herein may be incorporated into the field planning operations to account for sustainability parameters in the field development plans.

It should be noted that the sustainability platform system 72 illustrated and described above with respect to FIG. 2 corresponds to one embodiment in which the sustainability platform system 72 may be implemented. However, the sustainability platform system 72 may also be implemented in accordance with other structures. For instance, the engineering workflow systems 78 may be part of the sustainability platform system 72 as a layer for performing analysis operations. The sustainability platform system 72 may also include other layers of operations such as digital foundation services, data infrastructure, and the like. Moreover, while certain aspects of FIG. 2 are shown as individual elements for data flow purposes, there may or may not be a physical, logical, and/or computational distinction therebetween. For example, in some embodiments, the sustainability platform system 72 may be considered as distinct from or to include the at least a portion of the engineering workflow systems 78, at least a portion of the sustainability database 94, at least a portion of the workflow database 140, and/or at least a portion of the input data sources 74.

Figure 3:
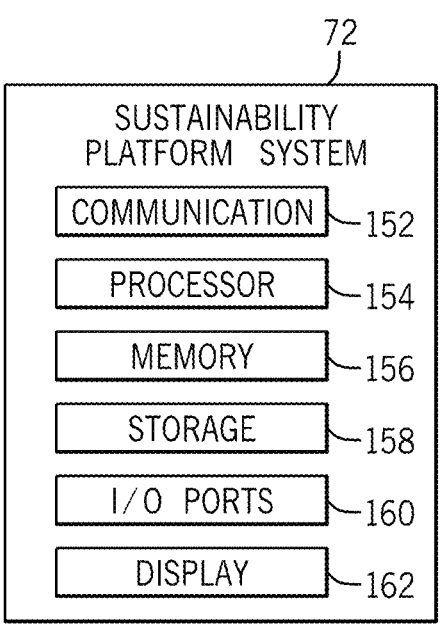
FIG. 3 is a block diagram of components that may be part of the sustainability platform system, according to one or more embodiments of this disclosure.

To perform the operations described herein, the sustainability platform system 72 may include a number of components to assist in processing, analyzing, collecting, and communicating data in accordance with the presently disclosed embodiments. With this in mind, FIG. 3 illustrates example components of the sustainability platform system 72. As shown in FIG. 3, the sustainability platform system 72 may include a communication component 152, a processor 154, a memory 156, a storage component 158, input/output (I/O) ports 160, a display 162, and the like. The communication component 152 may be a wireless or wired communication component that may facilitate communication between different monitoring systems, gateway communication devices, various control systems, and the like. The processor 154 may be any type of computer processor or microprocessor capable of executing computer-executable code. The memory 156 and the storage component 158 may be any suitable articles of manufacture that can serve as media to store processor-executable code, data, or the like. These articles of manufacture may represent non-transitory computer-readable media (i.e., any suitable form of memory or storage) that may store the processor-executable code used by the processor 154 to perform the presently disclosed techniques. The memory 156 and the storage component 158 may also be used to store data received via the I/O ports 160, data analyzed by the processor 154, or the like.

The I/O ports 160 may be interfaces that couple to various types of I/O modules such as sensors, programmable logic controllers (PLC), and other types of equipment. For example, the I/O ports 160 may serve as an interface to pressure sensors, flow sensors, temperature sensors, and the like. As such, the sustainability platform system 72 may receive data associated with a well via the I/O ports 160. The I/O ports 160 may also serve as an interface to enable the sustainability platform system 72 to connect and communicate with surface instrumentation, servers, and the like.

The display 162 may include any type of electronic display such as a liquid crystal display, a light-emitting-diode display, and the like. As such, data acquired via the I/O ports and/or data analyzed by the processor 154 may be presented on the display 162, such that the sustainability platform system 72 may present designs for hydrocarbon sites (e.g., of a hydrocarbon production system 10) for view. In certain embodiments, the display 162 may be a touch screen display or any other type of display capable of receiving inputs from an operator. Although the sustainability platform system 72 is described as including the components presented in FIG. 3, the sustainability platform system 72 should not be limited to including the components listed in FIG. 3. Indeed, the sustainability platform system 72 may include additional or fewer components than described above.

With the foregoing in mind, FIG. 4 illustrates a method 170 for generating a sustainability report for enterprise operations in accordance with embodiments presented herein. Although the following description of the method 170 is described as being performed by the sustainability platform system 72 and in a particular order, it should be understood that any suitable computing system with access to the appropriate data sources and engineering workflow systems may perform the method 170 in any suitable order.

Referring now to FIG. 4, at block 172, the sustainability platform system 72 may receive enterprise facility data and enterprise production data. The enterprise facility data may include information regarding the structures owned, leased, or used by the enterprise. As such, the facility data may include information related to the building 56, such as the type of light bulbs employed it the building, the type of heating and air conditioning systems employed at the building 56, the business hours of the building 56, and the like. In some embodiments, the facility data may be provided via the corporate data sources 110.

The enterprise facility data may also include invoice or financial information related to the costs or resource consumption of the buildings 56. For instance, the facility data may include energy costs, type of energy used, water consumption data, waste costs, and the like as gleaned from invoices provided to the enterprise. In addition, the enterprise facility data may include real time data from IoT devices 44 that may monitor resource consumption data such as watt-hours, water flow, waste weight, and the like.

In some embodiments, the enterprise facility data may include operational schedules for employees such as days that the employee works in the office, days that the employees work from home, addresses of employees, types of transportation utilized by employees, and the like. In this way, the employee travel to the buildings may be accounted for in the sustainability parameters.

The enterprise production data may include information regarding processes and systems employed for manufacturing, processing, and producing products for the enterprise. In the hydrocarbon production system 10 example above, the enterprise production data may include information related to the equipment in each facility used to extract, transport, store, process, and distribute hydrocarbons. As such, the information may also include operational information with regard to the manner in which the equipment is operated or used, the arrangement of the equipment, the emissions of the equipment, and the like.

In some embodiments, the equipment may provide data in real time using IoT devices 44 or directly communicating with the sustainability platform system 72. The real time data may include temperature data, energy consumption data, water consumption data, waste production data, run time, operational schedules (e.g., times equipment is operating), and the like. In addition, the enterprise production data may include cost or invoice data for raw materials, energy, waste disposal, and the like.

It should be noted that the description of the enterprise facility data and the enterprise production data may include other data types not listed above. However, in general, the enterprise production data may provide data related to the sustainability parameters associated with performing core manufacturing or production processes. On the other hand, the enterprise facility data may correspond to data related to support services for performing business and engineering tasks associated with planning, preparing, and distributing products produced by the production operations of the enterprise.

At block 174, the sustainability platform system 72 may receive financial data for raw materials used for enterprise operations. The enterprise operations may include maintaining business and production operations related to the enterprise facility data and the enterprise production data. The raw materials may include energy consumption, water usage, waste services, and other sustainability parameters. The financial data may provide information regarding invoices, rates for energy consumption, and the like. In some embodiments, the financial data may also include costs related to sustainability equipment, such as carbon capture technology, used to improve sustainability parameters.

At block 176, the sustainability platform system 72 may receive greenhouse gas (GHG) emission data for the enterprise operations. The GHG emission data may be provided by or determined based on real time data acquired by real-time data sources 108, the image acquisition sources 102, corporate data sources 110, manual data sources 112, and the like. In some embodiments, the marketplace sources 104 and the third-party data sources 106 may provide information related to the GHG emission data. That is, these sources may model or generate expected GHG emission data for the enterprise operations based on simulations, monitored data, or the like.

At block 178, the sustainability platform system 72 may receive IoT data for the enterprise operations from any suitable IoT device 44. As such, the IoT data may represent real time data regarding current operational and consumption parameters for devices within a structure of the enterprise, equipment used within the enterprise, and the like. The IoT data may provide insight into equipment and facility devices that may be adjusted to improve sustainability parameters for the enterprise. Moreover, the IoT data may provide feedback data with regard to how implemented action plans 90 are affecting the sustainability parameters for the enterprise.

At block 180, the sustainability platform system 72 may identify a suitable reporting format to generate a sustainability report associated with the enterprise operations. The sustainability reporting format may be associated with a geographical location of the equipment, facilities, and operations of the enterprise. As such, the enterprise data may provide indications with regard to the regions or countries in which various aspects of the enterprise operations are undertaken. Based on these locations, the sustainability platform system 72 may query the sustainability database 94 or other suitable storage component to determine the reporting format used for the respective regions. That is, some regions or governmental agencies request reports regarding the sustainability parameters of the enterprise over the course of time. The reporting formats may include types of sustainability parameters to report, units in which the sustainability parameters are to be reported, a time period in which the sustainability parameters are to be reported, hierarchical levels in which to organize the sustainability parameters, an organizational structure to organize aggregated data, and the like. In addition, the sustainability platform system 72 may retrieve previously provided or produced reports 92 to determine the suitable reporting format. That is, the previously produced reports 92 may be scanned and scraped to determine the sustainability parameters that are to be reported, along with other details with regard to the manner in which to report the sustainability parameters.

At block 182, the sustainability platform system 72 may aggregate or organize the data received at blocks 172, 174, 176, and 178 into appropriate data values in accordance with the reporting format determined at block 180. In some embodiments, the sustainability platform system 72 may also organize data with respect to different hierarchical levels of operations such as a facility level, a region level, a city level, a country level, and other geographically based levels. In addition, the sustainability platform system 72 may aggregate the data based on operations for facility operations and production operations. Further, the sustainability platform system 72 may aggregate or group the collected data into a variety of types of subsets of data, such that each subset of data may be packaged and sent to any of the engineering workflow systems 78 for analysis. Indeed, the engineering workflow systems 78 may request a particular type of data in a particular format or grouping, and the sustainability platform system 72 may subsequently package the relevant data accordingly and transmit it to the requesting engineering workflow system 78 for analysis. Moreover, the user input received via the manual data source 112 may provide reporting format request in which the sustainability platform system 72 may organize the collected data. In some embodiments, the sustainability platform system 72 may organize the aggregated data according to an organizational structure that may distribute datasets in particular organizational levels or hierarchies to allow the enterprise to evaluate the respective aggregated datasets in various manners.

As such, the sustainability platform system 72 may aggregate or organize the collected data, such as the enterprise facility data and the enterprise production data, into various hierarchical levels to perform appropriate analysis within the respective hierarchies. The hierarchical levels may relate to physical levels, logical levels, or a hybrid of both depending on an associated organizational structure specified for the enterprise. That is, the collected data may be organized at a work unit level within a facility, a facility level to cover the operations within the facility, a city level to cover the operations performed by facilities in a city, and so on.

Based on the aggregated data, at block 184, the sustainability platform system 72 generated the sustainability report for the enterprise data based on the aggregated data and the suitable reporting format. In some embodiments, the sustainability report may be a dynamic, interactive report that may include visualizations that may be selected by user input and may cause the respective computing device to provide additional information related to the selection. In this way, the sustainability report may provide layers of information related to the sustainability parameters of the enterprise that correspond to different modular views of the enterprise.

At block 186, the sustainability platform system 72 may send the sustainability report (e.g., report 92) to a suitable computing device. That is, the sustainability platform system 72 may send the sustainability report to a user's device associated with a user that requested the sustainability report. Additionally, the sustainability platform system 72 may send the sustainability report to a computing device, website, or database associated with an agency or organization that provided information regarding the reporting format.

After receiving sustainability report, the respective computing device may cause an application to open or be executed regardless as to whether the computing device is in a sleep or low power mode. That is, the reception of the sustainability report may cause the computing device to perform some other action to cause a notification related to the sustainability report being received to be generated. The notification may include a visual notification, an audible notification, a haptic notification, or the like.

By enabling the sustainability platform system 72 to aggregate and group the collected data into various formats and structures, the sustainability platform system 72 may be able to use more modular processes to determine methods for improving different types of sustainability parameters at various hierarchical levels. Indeed, the aggregated data may be provided in parallel to different engineering workflow systems 78 in parallel, such that different systems may analyze the respective datasets to determine action plans 90 more efficiently. Further, the sustainability platform system 72 may compare distinct solutions and recommendations provided by different engineering workflow systems 78 with respect to the respective sustainability parameter being addressed.

It should also be noted that by starting with the broad scope of information in the method 170, the sustainability platform system 72 may enable a user or machine learning algorithm gain insight into broad or larger scale sustainability parameters differences to help determine where improvements may be found. That is, if a certain region of the enterprise operations produces more desirable sustainability parameters as compared to another, the sustainability platform system 72 may then provide drilled down information related to the equipment or facility data to identify the operational differences that account for the improved sustainability parameters.

Figure 5:
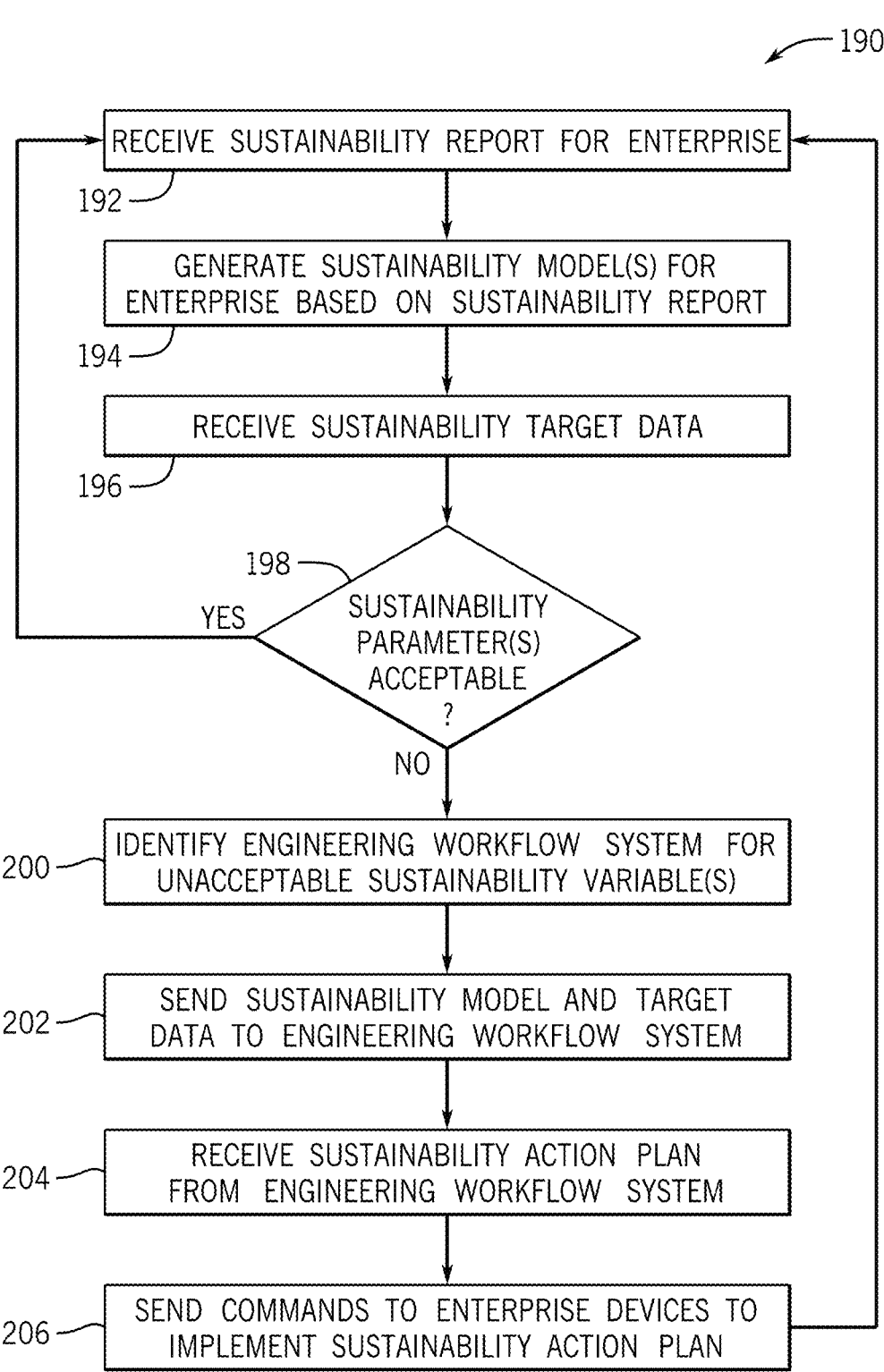
FIG. 5 is a flow chart of a method for generating sustainability action plans for enterprise operations employing the sustainability platform system of FIG. 3, according to one or more embodiments of this disclosure.

After generating the sustainability report, the sustainability platform system 72 may determine action plans 90 for improving one or more types of sustainability parameters. FIG. 5 illustrates a method 190 for generating a sustainability action plans for enterprise operations in accordance with embodiments presented herein. Although the following description of the method 190 is described as being performed by the sustainability platform system 72 and in a particular order, it should be understood that any suitable computing system with access to the appropriate data sources and engineering workflow systems may perform the method 190 in any suitable order.

Referring now to FIG. 5, at block 192, the sustainability platform system 72 may receive the sustainability report for the enterprise. The sustainability report may be generated as described above with respect to FIG. 4 or may be provided as a data file with the relevant information organized in ERP reports, spreadsheets, publications, or the like. It should be noted that the data included in the sustainability report may include economic data that may be provided by the strategy level planning systems 142 as described above. As such, the sustainability report may include economic information related to cost functions for various sustainability variables and other parameters related to implementing action plans 90, evaluating input data sources 74 or engineering workflow systems 78, or the like. As such, an economic analysis may be initiated before the action plans 90 are determined to consider forecasted business activities, technology costs, and other prioritized areas.

At block 194, the sustainability platform system 72 may generate one or more sustainability models for the enterprise based on the received sustainability report. In some embodiments, the sustainability model may be formulated by or contained within a machine learning model that detects patterns, trends, correlations, and other similarities between different datasets. As such, the sustainability model may provide sustainability parameter changes over time for different types of sustainability parameters with respect to different variables. For instance, an aspect of the sustainability model may include tracking operational parameters of facility operations and production operations with respect to GHG emissions. The sustainability platform system 72 may generate a sustainability model for the enterprise with respect to each different type of sustainability parameter or a combined sustainability model including multiple sustainability parameters. In some embodiments, the sustainability platform system 72 may generate a particular sustainability model based on a request from one or more of the engineering workflow systems 78, based on user input, or the like.

The sustainability model may be a data model that defines structures, relationships, and constraints of the sustainability parameters with respect to the facilities, hierarchies, goals, operations, or other components of the enterprise. For example, the sustainability model may be based on intentions or attributes set by a user such as an industry sector, a location of operation, emission scopes involved, and/or types of emissions sources desired to become more sustainable (e.g., flaring, fuel combustion, etc.). Moreover, the initial sustainability model may include one or more currently implemented action plans (e.g., methods of operation of the enterprise). By way of example, the data model may be a conceptual data model, a logical data model, a physical data model, or the like. As should be appreciated, an organizational unit of an enterprise (e.g., delineated by region, business line, corporate entity, organizational or operational boundaries, facility, etc.) may be characterized by a single sustainability model. However, multiple action plans may be implemented, at one or more levels within a single organizational unit. Moreover, the organizational unit may be reevaluated to include different portions of the enterprise with corresponding action plans for the components thereof maintained at the desired component level. As more data is collected over time, the data model may be updated to include time references and may be used to generate a machine learning model for the sustainability parameters. Although in some embodiments the sustainability platform system 72 may not generate the sustainability model to perform the method 190, the generated sustainability model may enable the sustainability platform system 72 to perform various analysis and processing operations in a more computationally efficient manner as compared to using the sustainability report.

At block 196, the sustainability platform system 72 may receive sustainability target data. The sustainability target data may include GHG emission limits, water usage limits, waste production limits, and other measurable sustainability parameter limits or ranges. In some embodiments, the sustainability target data may be determined by querying governmental regulations provided by the corporate data sources 110, accessible online, or the like. In addition, a user may define the sustainability target data via manual input. Further, the sustainability target data may include generic provisions to continually identify improvements in sustainability parameters. Moreover, the sustainability platform system 72 may determine sustainability target data based on achievements or goals detected in other enterprises similar to the respective enterprise.

At block 198, the sustainability platform system 72 may determine whether the sustainability parameters for the enterprise as indicated in the sustainability report or generated sustainability model are acceptable in view of the sustainability target data. If the sustainability parameters are acceptable, the sustainability platform system 72 may return to block 192 and continue monitoring for updated sustainability reports.

If, however, the sustainability parameters are not acceptable, the sustainability platform system 72 may proceed to block 200 and identify an engineering workflow system 78 to address the unacceptable sustainability parameters. That is, as mentioned above, each of the engineering workflow systems 78 may provide action plans or recommendations to address particular sustainability parameters, particular aspects or operations of the enterprise, or the like. As such, the sustainability platform system 72 may determine whether one of the engineering workflow systems 78 is suited to address the unacceptable sustainability parameters. In some embodiments, each of the engineering workflow systems 78 may identify sustainability parameters that are associated with its respective analysis. The sustainability platform system 72 may then identify the one or more engineering workflow systems 78 that may be suitable to improve respective sustainability parameters. In some embodiments, the sustainability platform system 72 may broadcast the request for improved sustainability parameters to each of the engineering workflow systems 78, which may then determine whether the respective analysis performed by the respective system may provide any support to achieve the sustainability target data. It should be noted that the broadcast may also be provided to the strategy level planning systems 142 to assess economic analysis context for action plans 90, solutions provided by the engineering workflow systems 78, or other related tasks that may be implemented for improving sustainability parameters.

After identifying suitable engineering workflow systems, the sustainability platform system 72 may, at block 202, send the sustainability model and the sustainability target data to the identified engineering workflow system(s) 78. In some embodiments, the sustainability platform system 72 may send portions of the sustainability model, as opposed to the entire sustainability model, to accommodate the analysis operations performed by the respective engineering workflow system 78. In this way, the sustainability platform system 72 may reduce the amount of data that is transmitted across a network to improve network latency. Further, the engineering workflow system 78 that receives the modified sustainability model may efficiently process the received data without analyzing or reviewing data that may be irrelevant to its operations. Further, it should be noted that the sustainability platform system 72 may send multiple sustainability models or portions thereof to multiple engineering workflow systems 78 in parallel. As such, the various engineering workflow system 78 may perform their respective analysis operations in parallel, thereby improving the efficiency in which the sustainability platform system 72 may receive recommendations.

After receiving the sustainability model (or equivalent datasets), the respective engineering workflow system 78 may compare the data present in the sustainability model to other datasets that it tracked, stored, or modeled. The respective engineering workflow system 78 may then identify solutions or action plans that other enterprises have implemented or determine unique solutions for the enterprise based on its core functions. For example, the engineering workflow system 78 may receive information related to the operational schedule of the facility operations and production operations, model modifications to these operations over time, and determine suitable operational modifications that may assist the enterprise in achieving respective sustainability target data.

By way of example, the action plans provided by the engineering workflow systems 78 may provide operational recommendations to reduce GHG emissions for the facility operations, the production operations, or both. That is, the action plan may include recommendations with regard to operating field devices in the production operations differently to reduce carbon emissions. Further, a recommendation may include providing a carbon capture device at a facility to reduce carbon emissions and provide a location or entity to receive the captured carbon for reinjection operations. In addition, the recommendations may include reducing the amount of emissions flared when it is determined that some emissions can be directed to the capture technology to achieve the sustainability goals.

In some embodiments, the action plans may include recommendations that may provide an initial improvement in sustainability parameters, such as recommendations to change lights in facilities to light emitting diode technology, which consumes less energy compared to other light sources. However, after making this change, the effect on sustainability parameters to achieve net zero goals are limited because the gain is achieved immediately. As such, the action plans may project different operations and technologies to use over time to continue to enable the enterprise to achieve improved sustainability parameters.

At block 204, the sustainability platform system 72 may receive the recommendations or generated action plans from the respective engineering workflow systems 78. In some embodiments, the recommendations or action plans may include operational changes (e.g., equipment operation schedule change to operate at certain times when renewable sources of energy are available) for devices in the facility operations, the production operations, or both. In addition, the recommendations or action plans may include equipment changes that may involve replacing equipment with more efficient equipment, adding equipment that may not be previously present (e.g., carbon capture), identifying business partners to purchase carbon credits or exchange services, and the like.

At block 206, the sustainability platform system 72 may send commands to devices within the enterprise to implement the action plan 90. As such, IoT devices 44 may adjust respective operations of other devices to implement the recommended actions provided in the action plan 90. In some embodiments, the action plans provided by the various engineering workflow systems 78 may be evaluated by the sustainability platform system 72 to determine whether each of them can be implemented with one another. Further, the action plans may be evaluated with respect to budgetary constraints and other constraints. The sustainability platform system 72 may select a combination of the provided action plans to use to generate commands based on the combination that suits the interests and constraints of the enterprise. These decisions may be made based on an optimization algorithm perform by the sustainability platform system 72, user input received by the sustainability platform system 72, or the like.

In some embodiments, the action plans 90 may be stored in the sustainability database 94 for analysis or retrieval at another time. In this way, the sustainability platform system 72 may evaluate action plans 90 prior to sending the sustainability model to engineering workflow systems 78 to identify recommendations more efficiently if the respective action plans 90 are applicable.

Figure 6:
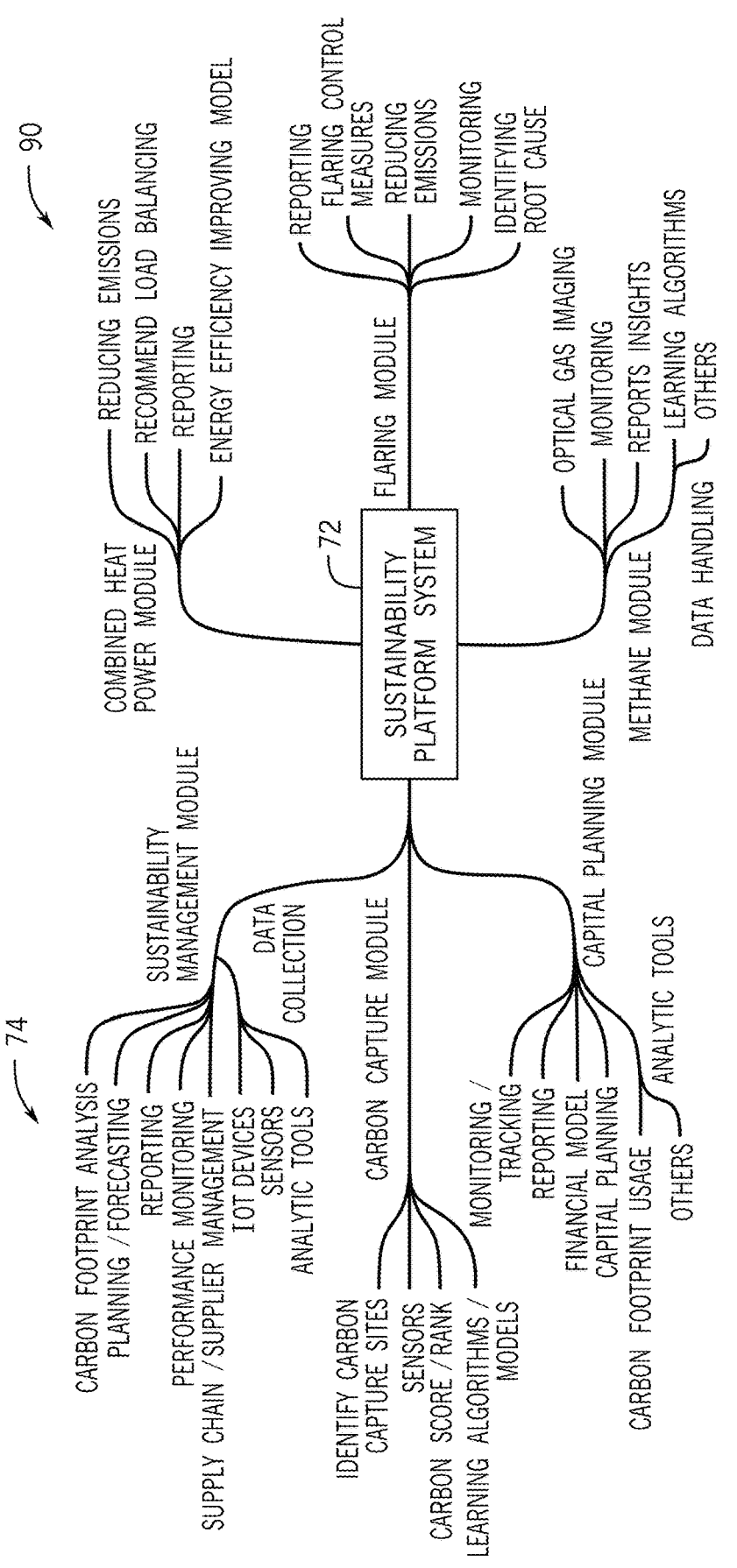
FIG. 6 illustrates a data diagram of various types of data that may be analyzed for determining plans and workflows to improve sustainability parameters for the enterprise operations, according to one or more embodiments of this disclosure.

To help further illustrate, FIG. 6 is an example flow diagram of a sustainability platform system 72 receiving information, such as via one or more input data sources 74 or modules to determine output controls and/or instructions of one or more action plans 90 to optimize for different sustainability variables. In some embodiments, the input data sources 74 may be grouped by data type or source. For example, a sustainability management module may provide information regarding baseline sustainability parameters (e.g., carbon footprint, waste levels, water usage), a carbon capture module may provide information regarding current mitigation of sustainability parameters, and a capital planning module may provide input on the financial constraints and viability of certain actions and/or compliance parameters. Additionally, the sustainability platform system 72 may identify suitable engineering workflow systems 78 based on the expected outputs provided by those respective systems to generate the action plan(s) 90. For example, the sustainability platform system 72 may utilize different engineering workflow systems 78 to provide instructions or control signals for heat and power operations (e.g., via a combined heat power module), for flaring control (e.g., via a flaring module), for methane control (e.g., via a methane module), and/or for other operations of the enterprise. Although FIG. 6 focuses on carbon-oriented workflows and variables, it should be understood that in other embodiments the sustainability platform system 72 may coordinate activities with modules that focus on water, waste, energy, and other suitable sustainability parameters.

Furthermore, the sustainability platform system 72 may receive sustainability parameter data such as water data and emission data in different scopes or hierarchical levels. For example, scope 1, scope 2, and scope 3 emission data (e.g., as defined by the EPA) may be obtained and considered when evaluating the enterprise sustainability model. In some embodiments, the sustainability platform system 72 may coordinate with the engineering workflow systems 78 such as a methane management system, a flaring management system, a combined heat and power optimization system, a carbon capture system (CCS), and/or an agriculture system. Based on the result provided by the engineering workflow systems 78, the sustainability platform system 72 may evaluate the provided action plans 90 with different planning modules or systems to perform different respective analysis operations, such as via the planning block 86 (e.g., planning module). For instance, the sustainability platform system 72 may determine decarbonization pathways, decarbonization financial planning, and product carbon footprints based on the received action plans, measurement data, or both. The decarbonization pathways may indicate one or more operational or business changes (e.g., work from home policies) to improve carbon emissions across the enterprise. The decarbonization financial planning (e.g., via the strategy level planning systems 142) may account for the costs associated with implementing the various action plans. The product carbon footprint may provide an indication of the expected carbon footprint associated with producing the product. As mentioned above, the product carbon footprint may capture a total amount of carbon emissions associated with the production of various products to the end of the lifecycle of the product. In this way, the decarbonization pathways that may be part of the action plans 90 may provide multiple scenarios of carbon emission reduction plans to meet emission goals for the enterprise while continuing to support business activities.

Keeping the foregoing in mind, FIG. 7 illustrates a method 220 which the sustainability platform system 72 may simulate sustainability action plans 90 over a period of time for analysis, in accordance with embodiments herein. Although the following description of the method 220 is described as being performed by the sustainability platform system 72 and in a particular order, it should be understood that any suitable computing system with access to the appropriate data sources and engineering workflow systems may perform the method 220 in any suitable order. As such, it should be noted that the embodiments described below may be performed via the planning block 86 or via a respective engineering workflow system 78.

Referring now to FIG. 7, at blocks 222 and 224, the sustainability platform system 72 may receive the sustainability model and the sustainability target data as described above with reference to FIG. 5. At block 226, the sustainability platform system 72 may receive sustainability variable data associated with the sustainability target data. That is, the sustainability variable data may refer to one or more sustainability parameters that make up part of the sustainability target data or a variable in which the sustainability platform system 72 is requested to optimize. In some embodiments, the sustainability target data may include energy, emissions, water, and waste objectives and may be considered as a whole, over time, or be associated with a target time (e.g., target year). As an example, a user may select to optimize for the emissions portion of the sustainability target data, and the emissions may be the sustainability variable data received at block 226.

In some embodiments, the sustainability platform system 72 may receive multiple sustainability variable datasets for optimization and may identify multiple engineering workflow systems 78 to coordinate with to determine action plans 90. By evaluating each sustainability variable data in isolation, the sustainability platform system 72 may identify solutions in parallel and present action plans 90 that optimize for different sustainability variables to provide a user more context to make a selection of the generated action plans 90.

At block 228, the sustainability platform system 72 may generate an enterprise sustainability variable model based on the sustainability variable data and the sustainability model received at block 222. That is, the sustainability platform system 72 may isolate a portion of the sustainability model that captures correlations and patterns related to the sustainability variable. In this way, the enterprise sustainability variable model may include a subset of data to allow the respective analysis component to efficiently process the respective subset of data, as opposed to filtering through datasets that may not be relevant for its analysis.

At block 230, the sustainability platform system 72 may query the sustainability database 94 to determine whether other sustainability variable models stored in the sustainability database 94 have matching patterns. That is, the sustainability platform system 72 may compare the sustainability variable datasets across multiple sustainability variable models and identify any matching sustainability variable datasets. The matching datasets may correspond to a period of time or correspond to an improvement in the sustainability variable datasets, such as from previously determined sustainability models and action plans 90. The sustainability platform system 72 may identify similarities in the emission sources, the scale of emission reductions desired, the location and environment of the enterprise or portion thereof between the present sustainability variable data and that of other sustainability variable models. As such, if the sustainability platform system 72 identifies matching datasets, the matching sustainability variable model may provide insights into action plans 90 that may be implemented by the respective enterprise to improve the sustainability variable parameters. Such insights may further increase the efficiency of the sustainability platform system 72, reducing computational complexity and/or reducing computation time. Additionally, in some embodiments, the sustainability database 94 may be structured (e.g., tabulated, tagged, or otherwise delineated) according to potential similarities for more efficient queries. For example, the sustainability models (e.g., sustainability variable models) of the sustainability database 94 may include metadata associated with emission sources, emission scale, organizational scale, geographical location, and/or environment.

Returning to block 230, querying a database of existing sustainability models may be performed based on one or more parameters within the sustainability database 94. For example, querying may be based on similarities in emission sources to address one or more specific issues with of the current sustainability model. Moreover, in some embodiments, queries may include minimum success criterion that were achieved by the matching sustainability model (e.g., matching sustainability variable model). For example, emission reduction for a particular sustainability model must have met or exceeded an emission reduction target in order for the sustainability model to be matched with the current sustainability model.

Additionally or alternatively, the query may also examine the scale of the emission reduction in addition to matching emission sources. For example, sustainability models at different granularities within an enterprise (e.g., operations within a region versus operations at a particular facility) may be selected and optimized according to the emission sources they address and the scale of the emission reduction they provide. Indeed, an action plan 90 for a set of multiple facilities in a region producing a relatively large amount of emissions may have a higher correlation to another set of multiple facilities having the same order of magnitude of emissions than a single facility or set of multiple facilities having a relatively small amount of emissions (e.g., by one or more orders of magnitude). However, if no match at the same organizational unit size is found, in some embodiments, the query may return one or more action plans for smaller organizational unit sustainability models that match other query parameters. Such action plans may be aggregated to form an action plan for the generated sustainability variable model.

Additionally or alternatively, regional location and environmental (e.g., offshore versus onshore) parameters can also be incorporated into the query. For example, sustainability models within the sustainability database 94 may be correlated to a location where technology availability, costs, and regulations have impacted the simulation (e.g., optimization) of an action plan 90 and sustainability model. Correlating such parameters during querying may enable the suitability of sustainability models within the sustainability database 94 to be based on real world constraints, in addition to the anticipated emissions impact of the actions within the sustainability model.

With this in mind, at block 232, the sustainability platform system 72 may determine whether matching patterns or datasets have been identified. The matching datasets may correspond to certain measurement values within some threshold (e.g., +/−5%, +/−10%, +/−20%, +/−50%), desired trends in the sustainability variable data (e.g., decrease in GHG emissions over time), or any other characteristic that may provide insight into improving a respective sustainability variable parameter.

If the sustainability platform system 72 identifies a matching pattern or desired effect, the sustainability platform system 72 may proceed to block 234 and determine a suitable sustainability action plan 90 based on the matching sustainability variable model. The matching sustainability variable model may be associated with an enterprise of the same industry type, a different industry type, a same regional location, a different location, or the like. The sustainability platform system 72 may retrieve the matching sustainability variable model and determine the action plans 90 implemented by the respective enterprise to achieve the results illustrated in the matching variable model. In some embodiments, the matching sustainability variable model may include a list of operational commands, operational schedules, types of equipment used, and other information that may be associated with the sustainability variable parameter.

Based on the sustainability action plans associated with the matching sustainability variable model, the sustainability platform system 72 may, at block 236, simulate implementing the sustainability action plan over a period of time (e.g., months, years, decades) for the enterprise of the generated enterprise sustainability variable model. That is, the sustainability platform system 72 may simulate (e.g., via machine learning algorithms) the effects of the determined action plan(s) 90 in the context of the sustainability variable data to predict the effects of implementing the sustainability action plans 90 over a course of time for the enterprise. The simulation may perform an optimization of the sustainability variable data in the context of the input data (e.g., from the input data sources 74) to generate a simulated sustainability variable model or full sustainability model for the enterprise. For example, cost data accurate for the location and scale of deployment in the original sustainability variable model (as opposed to that of the matched sustainability variable model) may be utilized in the simulation to determine emission reduction estimates for the newly simulated sustainability model. Indeed, the simulations may include capital expenditure data related to the costs for implementing the action plan 90 over time, the sustainability variable parameter effects over time, and the like. In this way, users may realize the benefits of implementing the action plan 90 over the life of the facility operations, the production operations, or both.

At block 238, the sustainability platform system 72 may determine whether the simulated sustainability variable data achieves the sustainability target goals indicated in the sustainability target data. If the sustainability target goals are achieved, the sustainability platform system 72 may proceed to block 240 and send the sustainability action plan 90 to the computing device associated with the enterprise for implementation or evaluation in accordance with embodiments described above. However, if the simulated sustainability variables do not achieve the sustainability target goals, or if there were no matching sustainability variable models, the sustainability platform system 72 may proceed to block 242. As should be appreciated, the sustainability platform system 72 may verify that the respective action plan 90 indeed causes the enterprise to achieve sustainability goals defined by the sustainability target data. For example, a specific action plan 90 may provide acceptable sustainability parameters at a particular facility, but still fail to be acceptable for the enterprise as a whole, when extrapolated and aggregated with the rest of the enterprise data. As such determining whether the simulated sustainability variables are acceptable may also include evaluating the simulated action plan 90 along with enterprise data representative of the enterprise as a whole to determine whether the corresponding sustainability parameters are acceptable or achieve the goals set by the sustainability target data.

At block 242 and block 244, the sustainability platform system 72 may send the sustainability variable model or the simulated sustainability variable model to an appropriate engineering workflow system 78 or to multiple engineering workflow system 78 and receive a sustainability action plan 90 from the engineering workflow system(s) 78. That is, one or more of the engineering workflow systems 78 may affect the same sustainability variable parameter. As such, the engineering workflow systems 78 may analyze the received sustainability variable model and perform similar operations described in blocks 202 and 204 of the method 190 to determine operational changes or equipment changes to improve the respective sustainability variable data.

The engineering workflow system(s) 78 may provide a finer grain analysis of potential changes (e.g., optimization) to the sustainability variable parameter than the query that matches patterns at the organizational unit level. For example, an engineering workflow system 78 may utilize a facility level planner to optimize physical placement of, sizing of, number of, and/or operational characteristics of wells 22, separators 42, storage tanks 43, pipelines 38, flares, engines, motors, energy sources (e.g., solar panels, wind turbines, etc.) and/or other components of a facility. Moreover, an engineering workflow system 78 may utilize a facility level planner to optimize individual components of a single facility or multiple facilities (e.g., in parallel) of the sustainability variable model. Once the sustainability platform system 72 may receive the generated action plans 90 from the engineering workflow systems 78 and proceed to block 236 to simulate the effects of implementing the sustainability action plans 90 over the course of time for the enterprise and continue the method 220.

If the simulated action plan 90 of block 236 is determined to have acceptable sustainability variables (e.g., at block 238), the action plan 90 may be sent to the enterprise system, as in block 240. As should be appreciated, when implemented, the new action plan 90 changes the sustainability model to an updated sustainability model. In some embodiments, the old sustainability model may be noted in the sustainability database 94 as being superseded, such as to reduce weightings therefore or insight therefrom for potential matching when querying for future matches, such as in block 230. For example, future querying may ignore sustainability models designated as superseded. Moreover, the updated sustainability model may be added to the sustainability database 94 for such future queries.

As discussed above, in some embodiments, the engineering workflow systems 78 may assist with the designing and monitoring of abatement solutions to generate an action plan 90 based on the sustainability model or report 92 associated therewith. In other words, the engineering workflow systems 78 may determine particular actions and/or solutions (e.g., equipment) for abating or reducing the negative sustainability parameters to improve the overall sustainability of the enterprise operations. In some embodiments, the engineering workflow system 78 may be related to a number of abatement technologies associated with reducing GHG emissions, water usage, waste accumulation, and the like. However, while the engineering workflow systems 78 may have multiple defined avenues for abatement stored in the workflow database 140, over time, additional technologies may be added to the workflow database 140. Moreover, as the workflow database 140 grows, it may take more and more computing resources to filter the abatement technologies for determining which abatement technologies and actions to implement for a particular enterprise.

By way of example, the engineering workflow systems 78 may include access to a database (e.g., workflow database 140 and/or sustainability database 94) or catalog of abatement technologies, which may be scraped from a network (e.g., Internet), internal databases, manually input, or the like. For instance, technologies related to energy industries may be found in various web-provided catalogues. In some embodiments, machine learning models, such as a large language model, may search such the internet based on sustainability and abatement prompts to identify abatement technologies that may be available. The abatement technologies may be focused on performing certain operations, such as avoiding routing flaring, performing flare maintenance, avoiding use of light oils to dilute extra heavy oils to transport them to deep conversion refineries, replacing leaky equipment, employing best operating practices, conducting routine leak detection and repair (LDAR), employing renewable energy to generate heat, steam, and electricity, capturing and sequestering carbon when producing and refining high carbon assets, using green hydrogen in hydro-conversion refinery, employing high-efficiency pumps than run on renewable energy, monitoring and repairing for corrosion in legacy assets, and the like. For example, a flaring and venting engineering workflow system 78 may incorporate a reduction in routine flaring or increased flaring maintenance for increased flaring efficiency (e.g., increased burn effectiveness) into an action plan. In some embodiments, each engineering workflow system 78 may be associated with one or more abatement technologies. It should be noted that the engineering workflow systems 78 may correlate technology parameters with each of these abatement technologies for increased indexing efficiency. In other words, potential actions or abatement technologies available for incorporation into an action plan 90 by the engineering workflow systems 78 may be associated with its own set of technology parameters, such as emissions reduction maximal capacity, construction/decommissioning time, lifetime cost, capital expenditure (CapEx)/operating expenses (OpEx), geographical applicability, and the like. Additionally, in some embodiments, the technology parameters may also include a sustainability scope (e.g., scope 1, scope 2, or scope 3 type emission) and/or one or more sustainability parameters identifying which sustainability parameters may be affected by the abatement technology.

Figure 8:
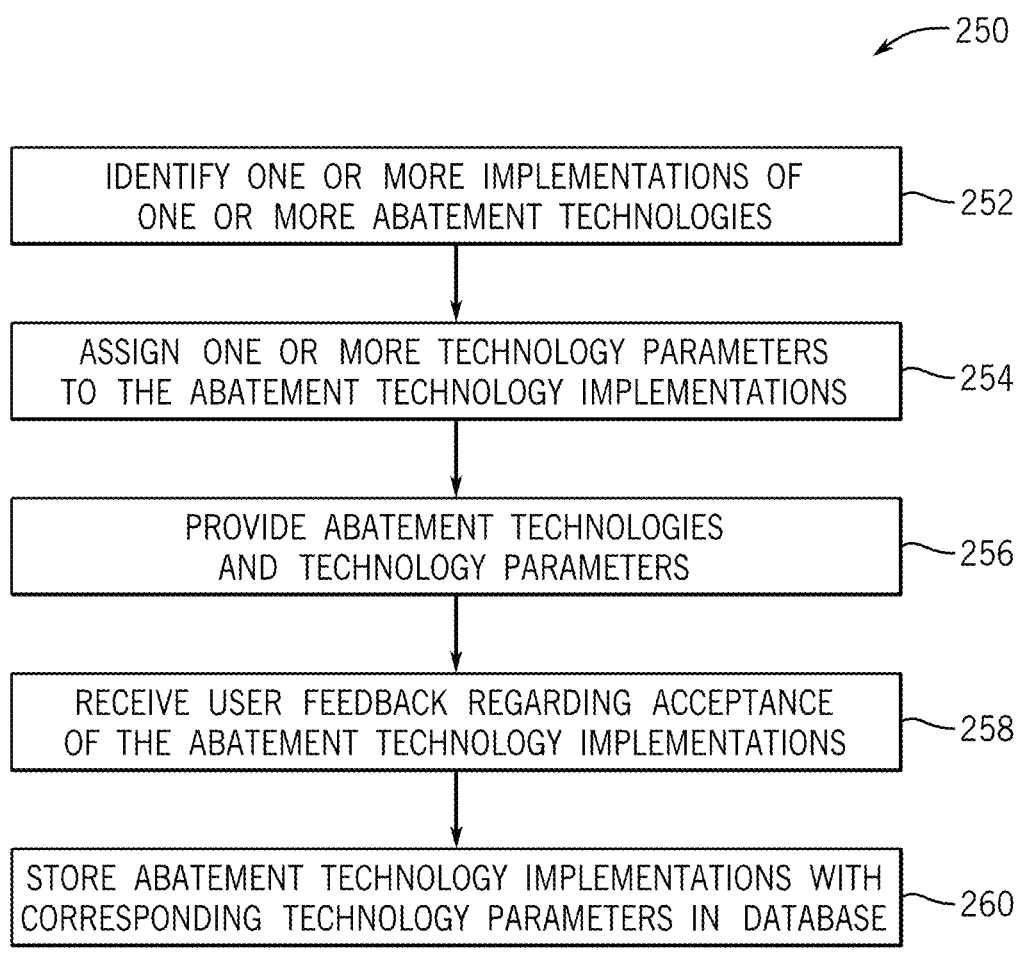
FIG. 8 is a flow chart of a method for adding abatement technologies with corresponding technology parameters to a database, according to one or more embodiments of this disclosure.

With the foregoing in mind, FIG. 8 illustrates a flow chart of a method 250 for adding abatement technologies with corresponding technology parameters to a database, according to one or more embodiments of this disclosure. Although the following description of the method 250 is described as being performed by the sustainability platform system 72 and in a particular order, it should be understood that any suitable computing system with access to the appropriate data sources may perform the method 250 in any suitable order.

At block 252, one or more implementations of one or more abatement technologies may be identified, such as via scraping from catalogs, other databases, a network (e.g., Internet), or via manual entry. For example, a large language model machine learning algorithm (e.g., a retrieval augmented generation (RAG) model) of the sustainability platform system 72 or a third-party meta engine communicating therewith may search real-time data sources such as news articles, regulatory websites, supplier catalogs, etc. to extract workflows and abatement technologies (e.g., products, services, equipment, etc.). In some embodiments, the machine learning algorithm may be pre-programmed with relevant sustainability data sources from which to extract such abatement technologies, or targeted prompts may be generated to broaden the search, for example, to a portion or the entirety of the world wide web. Furthermore, the sustainability platform system 72 may perform the search periodically (e.g., daily, weekly, etc.), in response to a user request, or in response to a request to generate a new action plan 90. As should be appreciated, while different abatement technologies may be identified, particular implementations may also be separately or categorically maintained within the database of the sustainability platform system 72, such as based on scale or equipment type.

Additionally, at block 254, the sustainability platform system 72 may assign one or more technology parameters to the abatement technologies and/or implementations thereof. For example, in some embodiments, a large language model algorithm or other machine learning or artificial intelligence system may develop associations between the abatement technologies and the technology parameters. Additionally, the sustainability parameters that are affected by an abatement technology, as well as to what extent and its abatement capacity may be associated with the abatement technology. Furthermore, how long the abatement technology would take to implement, how long it would last, its associated costs, and/or geographical applicability may define indexes within the database (e.g., workflow database 140 and/or sustainability database 94) for computationaly efficient selection of abatement technologies to implement for an action plan 90. Moreover, the sustainability platform system 72 may correlate the abatement technologies with engineering workflow systems 78 based on descriptions of the engineering workflow systems 78 in conjunction with the sustainability model of the enterprise. As such, abatement technologies may be assigned technology parameters for efficient indexing and association with target data and aspects the sustainability model.

In some embodiments, at block 256, the extractions of the abatement technologies and the technology parameters associated therewith may be provided, such as to a user (e.g., user computing system), for review of the identified abatement technologies. As should be appreciated, while deterministic and/or machine learning models may provide expedited information gathering, a user may provide oversight to verify viability, legality, and/or potential effectiveness of the identified abatement technologies. At block 258, the sustainability platform system 72 may receive user feedback regarding the acceptability of the identified abatement technology implementations and/or the assigned technology parameters associated therewith. At block 260, the abatement technology implementations with the corresponding technology parameters may be stored in the database (e.g., workflow database 140 and/or sustainability database 94).

As discussed above, each abatement technology may be associated with one or more sustainability parameters. That is, the technology parameters for an abatement technology, or implementation thereof, may include which sustainability parameters may be affected by the abatement technology. The sustainability platform system 72 may identify engineering workflow systems 78 to query or access based on the association between the desired sustainability parameters (e.g., target sustainability data) and the respective abatement technologies. For example, if the sustainability parameters are not acceptable at block 198 or block 276, the sustainability platform system 72 may query a lookup table or database for engineering workflow systems 78 and abatement technologies associated with the respective sustainability parameters. Furthermore, in some embodiments, after identifying the relevant abatement technologies, the engineering workflow systems 78 may identify potential implementations of the relevant abatement technologies for inclusion in an action plan 90.

Figure 9:
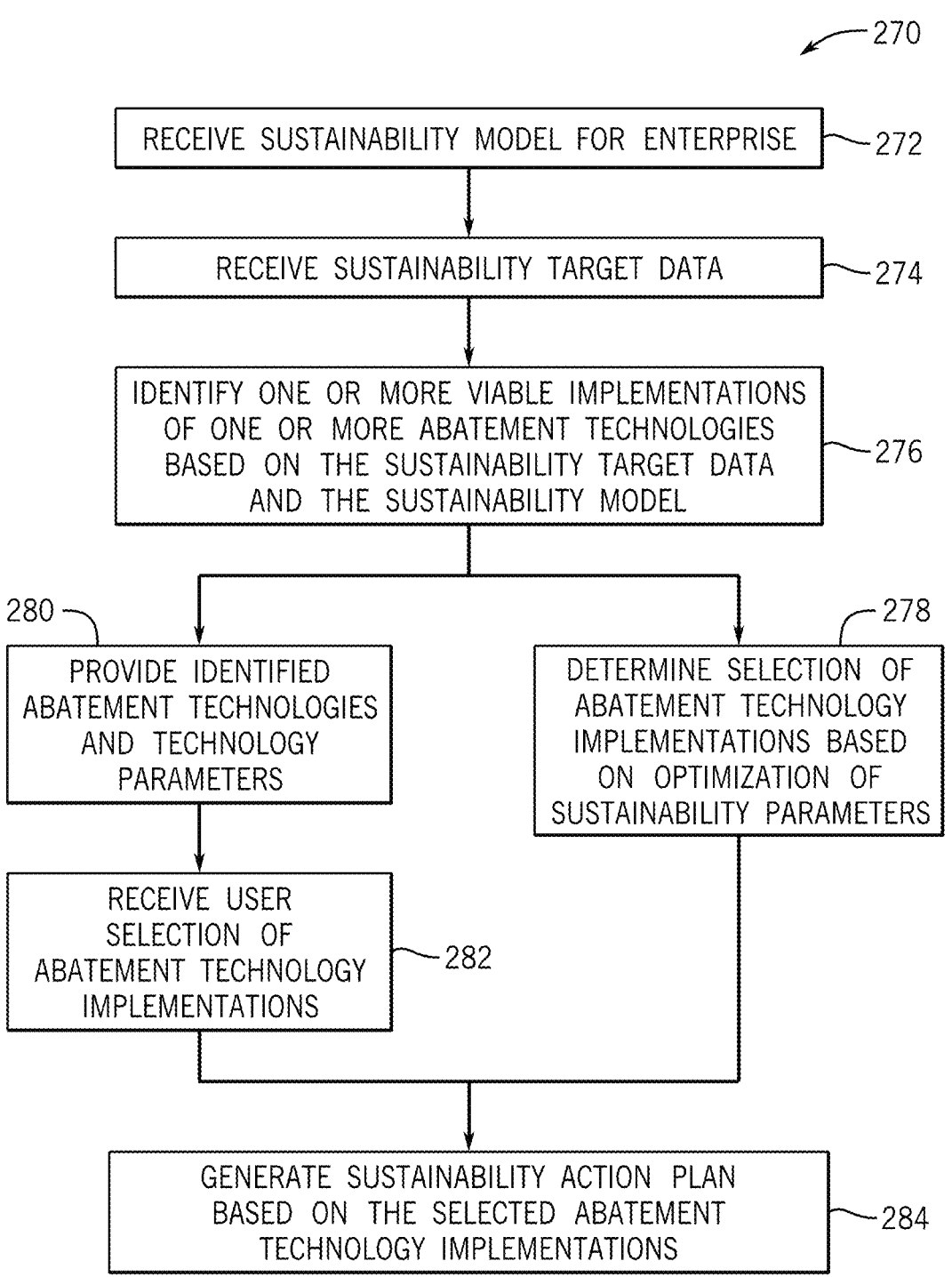
FIG. 9 is a flow chart of a method for selecting abatement technology implementations for use in a sustainability action plan, according to one or more embodiments of this disclosure.

With the foregoing in mind, FIG. 9 illustrates a flow chart of a method for selecting abatement technology implementations for use in a sustainability action plan, according to one or more embodiments of this disclosure. Although the following description of the method 270 is described as being performed by the sustainability platform system 72 and in a particular order, it should be understood that any suitable computing system with access to the appropriate data sources may perform the method 270 in any suitable order.

At block 272, the sustainability platform system 72 may receive a sustainability model for the enterprise, such as via generation at block 194 or as in block 222, and at block 274 the sustainability platform system 72 may receive sustainability target data, such as in block 196 or block 224. The sustainability model may define the current state of operations, such as including processes, equipment, operational parameters, etc. of the enterprise, and the sustainability target data may include desired values of the sustainability parameters. As should be appreciated, the sustainability target data may also include cost data or other constraints so as to maintain practicality. At block 276, the sustainability platform system 72 may identify one or more viable implementations of one or more abatement technologies based on the sustainability target data and the sustainability model. For example, the sustainability platform system 72 may identify technology parameters compatible with (e.g., coinciding with the goals, products, equipment, location, or other aspects of the enterprise) the sustainability model, and the database of abatement technologies may be filtered based on the identified technology parameters.

After identifying implementations of abatement technologies that could be utilized within the enterprise and that are within the constraints of the sustainability target data, at block 278 the sustainability platform system 72 may determine a selection of the abatement technology implementations based on an optimization of the sustainability parameters. For example, the sustainability platform system 72 may analyze individual abatement technologies and/or different combinations of abatement technologies to determine which set of abatement technology implementations optimize the sustainability parameters. Additionally or alternatively, the identified abatement technologies and/or technology parameters may be provided, at block 280, such as to a user (e.g., user computing system). For example, the user may be provided with a listing of abatement technologies that are compatible with the sustainability model and meet the constraints of the sustainability target data. Additionally, in some embodiments, the sustainability platform system 72 may provide the user with one or more recommended abatement technologies, such as based on the optimization of block 278. Furthermore, at block 282, the sustainability platform system 72 may receive the user selection of abatement technology implementation(s). As such, at block 284, the sustainability platform system 72 may generate a sustainability action plan 90 based on the selected (e.g., via the user at block 282 and/or the optimization at block 278) abatement technology implementation(s).

As discussed above, action plans 90 may be defined to improve sustainability parameters for an enterprise. Furthermore, in some embodiments, the sustainability platform system 72 may implement an optimization loop to continuously (e.g., automatically), periodically (e.g., at set time intervals), or conditionally (e.g., based on a manual trigger, a sustainability parameter threshold trigger, or other trigger) identify action plans 90 that enable the enterprise to achieve improved sustainability parameters over time. Indeed, in some embodiments, the sustainability platform system 72 may continuously monitor the input data sources 74 to determine whether the enterprise is achieving the sustainability target data. After receiving the input data, the sustainability platform system 72 may generate the sustainability model as described above and receive updated input data. If the input data has changed more than some threshold amount (e.g., +/−5%, +/−10%, +/−20%, and so on), the sustainability platform system 72 may regenerate the sustainability model using the updated data and identify other sustainability action plans 90 that may be better suited to enable the enterprise to achieve the sustainability target data. As should be appreciated, although multiple embodiments described herein refer to determining whether a threshold is exceeded with respect to the sustainability target data, embodiments may also be performed in response to detected values falling below a threshold, falling outside of a threshold range, or any other suitable threshold comparison or other conditioned operations.

FIG. 10 illustrates a flow chart of a method 290 for updating sustainability action plans 90 based on changes detected in the input data provided by the input data sources 74. Although the following description of the method 290 is described as being performed by the sustainability platform system 72 and in a particular order, it should be understood that any suitable computing system with access to the appropriate data sources may perform the method 290 in any suitable order.

Referring now to FIG. 10, at blocks 292, 294, 296, 298, 300, 302, and 304, the sustainability platform system 72 may receive data from the input data sources 74 and generate a sustainability model for the enterprise based on the received data, such as described above with reference to FIGS. 4 and 5. That is, for example, at block 292, the sustainability platform system 72 may receive image data (e.g., camera feed(s), satellite image data, drone footage, etc.) via the image acquisition source 102. At block 294, the sustainability platform system 72 may receive marketplace data via the marketplace source 104. At block 296, the sustainability platform system 72 may receive third-party data associated with the enterprise operations via the third-party data source 106. At block 298, the sustainability platform system 72 may receive real-time data such as from IoT devices 44 or other devices via the real-time data source 108. At block 300, the sustainability platform system 72 may receive corporate data via the corporate data source 110. At block 302, the sustainability platform system 72 may receive user input data via the manual data source 112. At block 304, the sustainability platform system 72 may generate the sustainability model for the enterprise operations. As should be appreciated, the descriptions provided above are merely examples of input data that the sustainability platform system 72 may use to perform the method 290. Further, the sustainability platform system 72 may also consider other data sources that may not be listed above.

After generating the sustainability model, the sustainability platform system 72 may receive updated data for any of the datasets received at blocks 292, 294, 296, 298, 300, and 302. That is, the sustainability platform system 72 may receive updated data from one or more of the input data sources 74 described above. In some embodiments, when new or updated data is available, the respective data source 74 may send a notification or broadcast a notification to the sustainability platform system 72. The sustainability platform system 72 may continuously check the data sources 74 and determine whether the collected updated datasets changed with respect to some threshold compared to the previously acquired datasets.

As such, at block 308, the sustainability platform system 72 may determine whether a change has been detected in the updated dataset and the previously acquired dataset. In some embodiments, the amount of detected change may be based on a threshold percentage difference (e.g., defined by a user input) from the previous dataset. Additionally, the sustainability platform system 72 may perform trend analysis to determine whether a detectable trend (e.g., increasing, decreasing) based on a statistical analysis. If a change in the dataset is detected, the sustainability platform system 72 may proceed to block 304 and generate an updated sustainability model based on the updated data. In this way, the sustainability platform system 72 may continuously update the sustainability model for the enterprise as the input data sources 74 are updated. In addition to generating the sustainability model, the sustainability platform system 72 may perform any of the methods described above to provide updated results.

Referring back to block 308, if a change is not detected in the updated data, the sustainability platform system 72 may proceed to block 310 and determine whether an updated sustainability model has been created, such as based on a previous iteration of the loop with previously updated data. If an updated sustainability model has not been created, the sustainability platform system 72 may return to block 306 and continue to receive updated data for the enterprise operations. If, however, the sustainability platform system 72 determines that an updated sustainability model has been created, the sustainability platform system 72 may proceed to block 236 of FIG. 7 or, more generally, block 196 of the method 190. For example, the sustainability platform system 72 may simulate the current sustainability action plan 90 given the updated data and updated sustainability model and determine if the sustainability parameters are acceptable (e.g., at block 238 of the method 220 or at block 198 of the method 190) compared to the sustainability target data. That is, the sustainability platform system 72 may determine whether the currently implemented action plan 90 of the updated sustainability model will meet and/or improve the sustainability goals of the enterprise. Moreover, if the currently implemented action plan 90 of the updated sustainability model does not provide acceptable sustainability parameters and/or if the sustainability parameters are poorer than before, an updated action plan 90 may be generated. As such, the sustainability platform system 72 may continuously manage the operations of the enterprise to ensure that the sustainability parameters are continuously improved as conditions change within the enterprise.

As discussed above, updated input data may be available via the marketplace data sources 104 or other third-party data sources 106, engineering workflow systems 78, or the like. Moreover, the sustainability platform system 72 may receive updates from the respective sources or may query the sources to determine whether updates are present or available. For example, the sustainability platform system 72 may receive updates from third-party data sources 106 (e.g., market place data sources 104) on new abatement technologies, such as described above with regard to the method 250 and the method 270. Indeed, devices, equipment, or assets that perform enterprise operations may contribute to the values of the sustainability parameters for the enterprise, and new information regarding such devices, equipment, or assets may alter the corresponding sustainability parameters thereof. Furthermore, the sustainability platform system 72 may receive updates on aspects of known abatement technologies such as the technology parameters thereof. For example, the availability, resource cost, deployment duration, and/or emission reduction potential of different abatement technologies may change over time, and such changes may alter the viability of such abatement technologies. If available, the sustainability platform system 72 may receive the updated third-party data, update the sustainability model, and simulate the currently implemented sustainability action plans 90 using the updated third-party data to determine whether the updated third-party data causes the expected sustainability parameters for the enterprise to change. In this way, the sustainability platform system 72 may dynamically update the sustainability action plans 90 being implemented by the enterprise based on newly available datasets from third-party sources.

Figure 11:
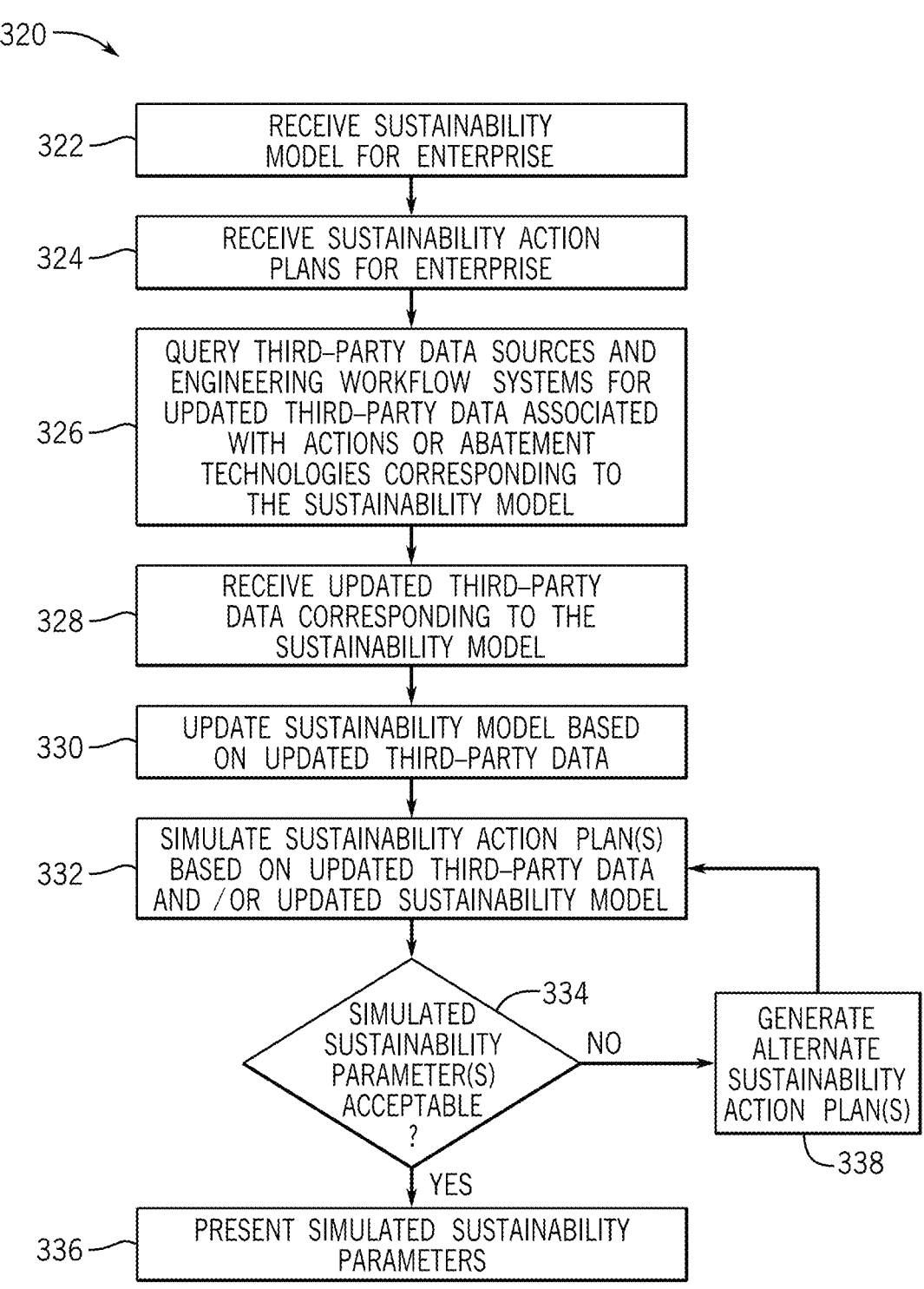
FIG. 11 is a flow chart of a method for updating sustainability action plans based on updated data provided via marketplace or third-party sources, according to one or more embodiments of this disclosure.

With this in mind, FIG. 11 illustrates a flow chart of a method 320 for determining updates to sustainability action plans 90 based on updated third-party data provided via a marketplace or third-party sources, according to one or more embodiments of this disclosure. Although the following description of the method 320 is described as being performed by the sustainability platform system 72 and in a particular order, it should be understood that any suitable computing system with access to the appropriate data sources may perform the method 320 in any suitable order.

Referring now to FIG. 11, at block 322, the sustainability platform system 72 may receive the sustainability model for the enterprise. As discussed above, the sustainability model may define the state of operations the enterprise. Moreover, the sustainability model may be based on intentions or attributes set by a user such as an industry sector, a location of operation, emission scopes involved, and/or types of emissions sources desired to become more sustainable (e.g., flaring, fuel combustion, etc.). As should be appreciated, the sustainability model may also be based on and/or associated with technology parameters such as for matching with one or more abatement technologies when generating an action plan 90.

In the same manner, at block 324, the sustainability platform system 72 may receive sustainability action plans 90 that may be currently implemented by the enterprise. As should be appreciated, the currently implemented action plan(s) 90 may have been user approved or selected from a set of potential action plans 90. At block, 326, the sustainability platform system 72 may query the third-party data sources 106 (e.g., marketplace data sources 104), the engineering workflow systems 78, or the like for updated third-party data related to actions or abatement technologies corresponding to the sustainability model. For example, abatement technologies having technology parameters (e.g., industry sector, a location of operation, emission scopes involved, and/or types of emissions sources desired to become more sustainable, construction/decommissioning time, lifetime cost, sustainability/emission scope, etc.) that match the attributes of the sustainability model may be inquired about to determine if updates exist and/or to obtain such updates. In other words, the sustainability platform system 72 may filter which actions and/or abatement technologies are queried based on matches between the attributes of the sustainability model that match the technology parameters of the actions and/or abatement technologies. As such, the sustainability platform system 72 may have increased efficiency compared to querying for updated third-party data on all known and/or newly identified abatement technologies. Furthermore, abatement technologies of the current action plan and/or non-elected abatement technologies, such as from non-selected action plans 90, that have previously been offered and associated with the sustainability model or similar sustainability models, such as in the sustainability database 94, may be given priority queries or queried first without querying other abatement technologies unless the previously offered abatement technologies are deemed unsuitable (e.g., via a comparison of the sustainability parameters to the sustainability target data). The updated third-party data may include updated technology parameters for various components, equipment, processes, and other relevant parts of the enterprise operations. For instance, updated third-party data may include technology parameters for an abatement technology that has been updated to more accurately represent the expected cost, deployment duration, emission reduction potential, and/or lifetime of a device or equipment operating in the upstream system 12.

In some embodiments, the querying of the third-party data sources 106 may be performed by a machine learning algorithm, information scraping from one or more catalogs, databases, networks (e.g., Internet), etc., and/or manual entry. For example, information gathering on updated third-party data may be performed in a similar manner to the identification of new abatement technologies, such as discussed above with respect to the method 250. Furthermore, the queries may be performed in response to the method 320 being triggered, which may occur periodically, in response to a user request, or other trigger. Moreover, in some embodiments, queries may be performed periodically or in response to a user request, and a determination of changes in the third-party data, such as in block 308 of the method 290 may trigger the method 320 (e.g., sans block 326). For example, it may be determined that updated third-party data is available regarding one or more components (e.g., devices, actions, implementations, etc.) of an abatement technology of an action plan 90 is available, and the method 320 may resume at block 330.

In some embodiments, the sustainability platform system 72 may monitor third-party data sources 106, such as marketplace data sources 104, for changes in the abatement technology data (e.g., technology parameters). Moreover, currently implemented and/or previously offered abatement technologies may be given priority when monitoring. For example, currently implemented and/or previously offered abatement technologies may be actively monitored for changes and other abatement technologies may not be queried or queried at a lesser rate for increased efficiency.

Additionally, in some embodiments, reasons for not implementing a certain action plan 90 or abatement technology may be received (e.g., as preferences) by the sustainability platform system 72, such as when a user selected the currently implemented action plan 90. The sustainability platform system 72 may focus monitoring or increase the periodicity of querying for technology parameters associated with reasonings for not selecting an action plan 90. In other words, if a particular action plan 90 was not selected because an associated abatement technology's implementation time was excessive (e.g., not available to be ordered, build-out time was excessive, etc.) or the amount of emission reduction relative to another parameter (e.g., waste, cost, etc.) was too low, the sustainability platform system 72 may monitor the implementation time or emission reductions relative to the other parameter for changes more closely than other technology parameters or other abatement technologies. In other words, resources (e.g., computing resources, time, etc.) for querying and updating data may be efficiently utilized to increase the likelihood of optimal updates to the current action plan 90. Furthermore, in some embodiments, the sustainability platform system 72 may learn, such as via a machine learning algorithm, user preferences based on feedback and selections of action plans 90 to present more favorable action plans 90.

Whether obtained via the query at block 326 or filtered from previously received updated third-party data, at block 328, the sustainability platform system 72 may receive the updated third-party data corresponding to the sustainability model. As used herein, the updated third-party data may include current and/or forecasted third-party data. Moreover, as discussed further below, the third-party data may be associated with confidence levels, such as based on an estimated trustworthiness of the input data source 74 or the method of gathering the third-party data from the input data source 74, a likelihood that the current third-party data may change in the future, and/or an uncertainty in forecasted third-party data. After receiving updated third-party data, at block 330 the sustainability platform system 72 may update the sustainability model based on the updated third-party data, such as at block 304 of the method 290. Additionally, the sustainability platform system 72 may simulate, at block 332, the currently implemented sustainability action plan(s) over time based on the updated third-party data and/or updated sustainability model, such as at block 236 of the method 220, to determine whether the desired sustainability parameters (e.g., according to sustainability target data) are being achieved. That is, the sustainability platform system 72 may apply the updated third-party data to the sustainability action plan(s) 90 to determine simulated or expected sustainability parameters associated with the continued implementation of the current sustainability action plan(s) 90. As should be appreciated, although discussed herein as simulating the effects of the current sustainability action plan(s) 90 based on the updated third-party data, additional action plans 90 may also be simulated for comparison with the currently implemented action plan(s) 90. For example, the additional action plans 90 (e.g., alternate sustainability action plan(s) 90) may be simulated in parallel, in series, or as part of a feedback loop, as described below. At block 334, the sustainability platform system 72 may determine if the simulated sustainability parameters are acceptable. If the simulated sustainability parameters are acceptable, the sustainability platform system 72 may present, at block 336 the simulated sustainability parameters (e.g., to a user) such as via a notification, display, or other suitable method described above, and maintain implementation of the action plan. If the simulated sustainability parameters are not acceptable (e.g., compared to the sustainability target data) or do not meet the desired values for a user, the sustainability platform system 72 may generate, at block 338, one or more alternative sustainability action plans 90, such as in the method 190, to enable the enterprise operations to meet the desired sustainability parameters, and implement the alternate sustainability action plan(s) 90. Additionally or alternatively, in some embodiments, the sustainability platform system 72 may generate alternate sustainability action plans 90 and simulate the alternate sustainability action plans 90 based on the updated third-party data and/or updated sustainability model for comparison to the simulated sustainability parameters of the currently implemented action plan 90 or as part of a loop of the method 320, returning to block 332. The alternate sustainability action plans 90 may then be ranked (e.g., based on the simulated sustainability parameters) alongside the currently implemented action plan 90, and the simulated sustainability parameters of each action plan 90 may be presented to a user, such as for selection thereof.

Figure 12:
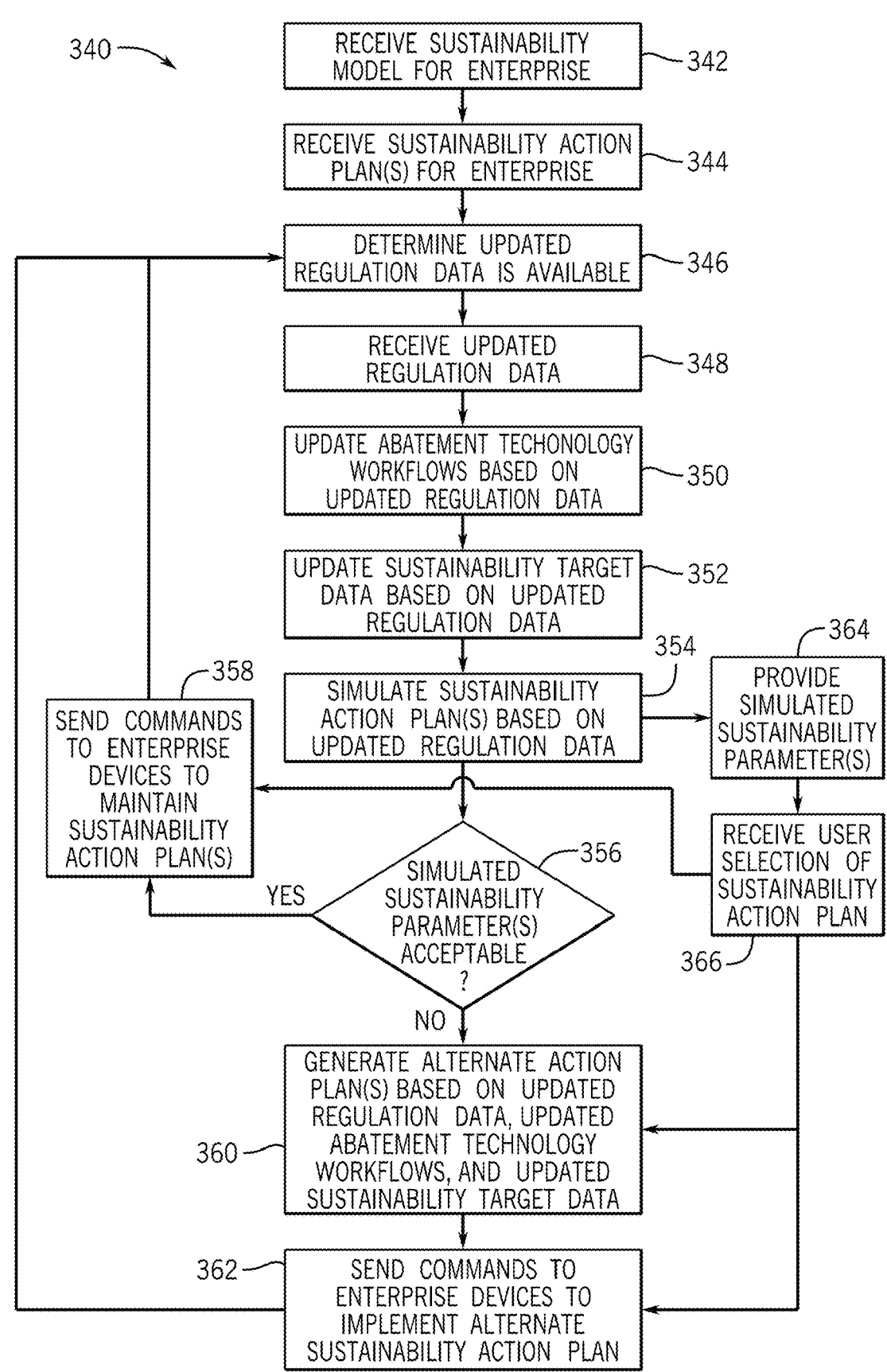
FIG. 12 is a flow chart of a method for updating sustainability action plans based on updated regulations associated with an enterprise, according to one or more embodiments of this disclosure.

In addition to changes input data from third-party data sources 106 or other input data sources 74, aspects of an enterprise may be affected by changes to governmental regulations. Indeed, as government and regulatory agencies provide updated guidelines and regulations, the implemented action plans 90 may no longer achieve the sustainability target data. For example, regulations may affect workflows of action plans 90 by allowing, mandating, and/or disallowing certain operations. As such, updated regulations may change the viability of certain abatement technologies and action plans 90 based thereon. Moreover, updated regulations may affect (e.g., change) the sustainability target data, for example, by mandating stricter tolerances on the sustainability parameters of the enterprise. As such, FIG. 12 illustrates a flow chart of a method 340 for updating sustainability action plans based on updated regulations associated with an enterprise, according to one or more embodiments of this disclosure. Although the following description of the method 340 is described as being performed by the sustainability platform system 72 and in a particular order, it should be understood that any suitable computing system with access to the appropriate data sources may perform the method 340 in any suitable order.

Referring now to FIG. 12, at block 342, the sustainability platform system 72 may receive the sustainability model for the enterprise. Moreover, at block 344, the sustainability platform system 72 may receive sustainability action plans 90 that may be currently implemented by the enterprise. As should be appreciated, the sustainability model and currently implemented action plan(s) 90 may be obtained as described above. At block 346, the sustainability platform system 72 may determine that updated regulation data is available, and at block 348, the sustainability platform system 72 may receive the updated regulation data. For example, the sustainability platform system 72 may query the input data sources 74, the engineering workflow systems 78, or the like for updated regulation data. As discussed further below, acquisition of actual, estimated, and/or forecast regulation data may be performed by queries of one or more databases and/or by scraping online websites for information. For example, in some embodiments, the sustainability platform system 72 may query government databases for rules and regulations regarding sustainability. Moreover, the queries may be targeted, for increased efficiency, such as based on geographical location, country, state, county, governmental body, emission type (e.g., GHG emission), etc. For example, an enterprise in the United States may query databases of the Environmental Protection Agency (EPA) to obtain regulation data. Additionally, as used herein, the regulation data may include current and/or forecasted regulation data. Moreover, as discussed further below, the regulation data may be associated with confidence levels, such as based on an estimated trustworthiness of the input data source 74 or the method of gathering the regulation data from the input data source 74, a likelihood that the current regulation data may change in the future, and/or an uncertainty in forecasted regulation data.

Additionally, the sustainability platform system 72 may determine whether a change has occurred in the regulation data. For example, regulation data may be compared to previous regulation data for differences in language, numerical parameter changes, etc. that are greater than a threshold amount or percentage. In some embodiments, a sentiment analysis of the regulation data may be performed to see if the sentiment of the language has changed, which may trigger a new action plan 90 to be generated. The updated regulation data may be used to update or include updated sustainability target data for the enterprise operations, updated operational limitations (e.g., restrictions on certain actions), and/or updated limitations on equipment (e.g., banned equipment or consumables). For instance, the updated regulation data may include target values for sustainability parameters (e.g., carbon emissions, GHG emissions, waste management thresholds, etc.) over a period of time and/or a limitation on when (e.g., time of day) certain operations such as venting or flaring are allowed. Using the updated regulation data, at block 350, the sustainability platform system 72 may determine updated abatement technology workflows (e.g., operations associated with the abatement technologies) and/or updated sustainability target data, at block 352.

At block 354, the sustainability platform system 72 may simulate the current sustainability action plan(s) 90 based on the updated regulation data (e.g., updated abatement technology workflows and updated sustainability target data), such as described with regard to block 236 of the method 220, to determine the simulated sustainability parameters for the enterprise operations. As should be appreciated, the regulation data and affects thereof may also cause changes to the sustainability model, and the sustainability model may be updated based on the regulation data as well. For example, the updated regulation data may alter one or more implementations of an abatement technology (e.g., change a workflow of the abatement technology) by requiring particular operations (e.g., device or equipment restrictions, emission limits, etc.) associated therewith. Such alterations may change the values of the simulated sustainability parameters. As should be appreciated, although discussed herein as simulating the effects of the current sustainability action plan(s) 90 based on the updated regulation data, additional action plans 90 may also be simulated for comparison with the currently implemented action plan(s) 90. For example, the additional action plans 90 (e.g., alternate sustainability action plan(s) 90) may be simulated in parallel, in series, or as part of a loop within the method 340, such as returning from block 360 to block 354. At block 356, the sustainability platform system 72 may determine whether the simulated sustainability parameters are acceptable, such as by comparison to the updated sustainability target data. If the sustainability parameters are acceptable, the sustainability platform system 72 may, at block 358, send commands to one or more enterprise devices to maintain operations of the currently implemented sustainability action plan 90 and return to block 346 to await a determination that newly updated regulation data is available.

If the sustainability parameters are not acceptable, the sustainability platform system 72 may proceed to block 360 and generate an alternate action plan based on the updated regulation data. For example, the alternate action plan may be based on updated abatement technology workflows and updated sustainability target data generated in the manner of blocks 200, 202, and 204 described above with reference to FIG. 5. That is, the sustainability platform system 72 may determine a suitable alternate action plan 90 to cause the enterprise operations to achieve or move towards achieving the sustainability parameters associated with the updated sustainability target data (e.g., based on the updated regulation data). Additionally or alternatively, in some embodiments, the sustainability platform system 72 may generate alternate sustainability action plans 90 and return to block 354 to simulate the alternate sustainability action plans 90 based on the updated regulation data and/or updated sustainability model, such as for comparison to the simulated sustainability parameters of the currently implemented action plan 90. At block 362, the sustainability platform system 72 may send commands to the enterprise devices to implement the alternate sustainability action plan 90. Furthermore, in some embodiments, at block 364, the simulated sustainability parameters may be provided, such as to a user device, and the sustainability platform system 72 may, at block 366, receive a user selection to proceed with (e.g., maintain) the currently implemented sustainability action plan(s) 90, at block 358, or to generate one or more alternate action plans 90, at block 360. As discussed above, in some embodiments, the alternate action plan(s) 90 may be simulated already, such as with the currently implemented action plan(s) 90, and be available and the user selection may provide instructions to proceed to block 362 and send commands to the enterprise devices to implement the alternate sustainability action plan 90.

In addition to regulation data, the sustainability platform system 72 may utilize carbon credit data, which may be associated with the regulation data, and/or carbon credit forecast data to update action plans 90 and the sustainability parameters associated therewith. For example, the sustainability platform system 72 may query marketplace data source 104, corporate data source 110, third-party data source 106, or other suitable system (e.g., engineering workflow system 78) for carbon production, carbon credit regulations, industry trends regarding carbon credits, and the like across the world. Furthermore, in some embodiments, the sustainability platform system 72 may execute prediction models that monitor one or more input data sources 74 to estimate carbon credit forecast data corresponding to what the state of carbon credits will be at a future time (e.g., one or more months, one or more years, over a lifetime of an action plan 90, etc.).

Based on certain economic and/or political conditions associated with the sustainability parameters in a particular region, city, country, or part of the world, the price for carbon credits may fluctuate. This fluctuation may cause the economic costs for implementing certain sustainability action plans 90 to also fluctuate and/or mark certain sustainability action plans 90 feasible or not. Indeed, such price changes may make it less desirable or feasible for the enterprise to continue its enterprise operations without modifying the sustainability action plans 90 and/or abatement technologies thereof.

Figure 13:
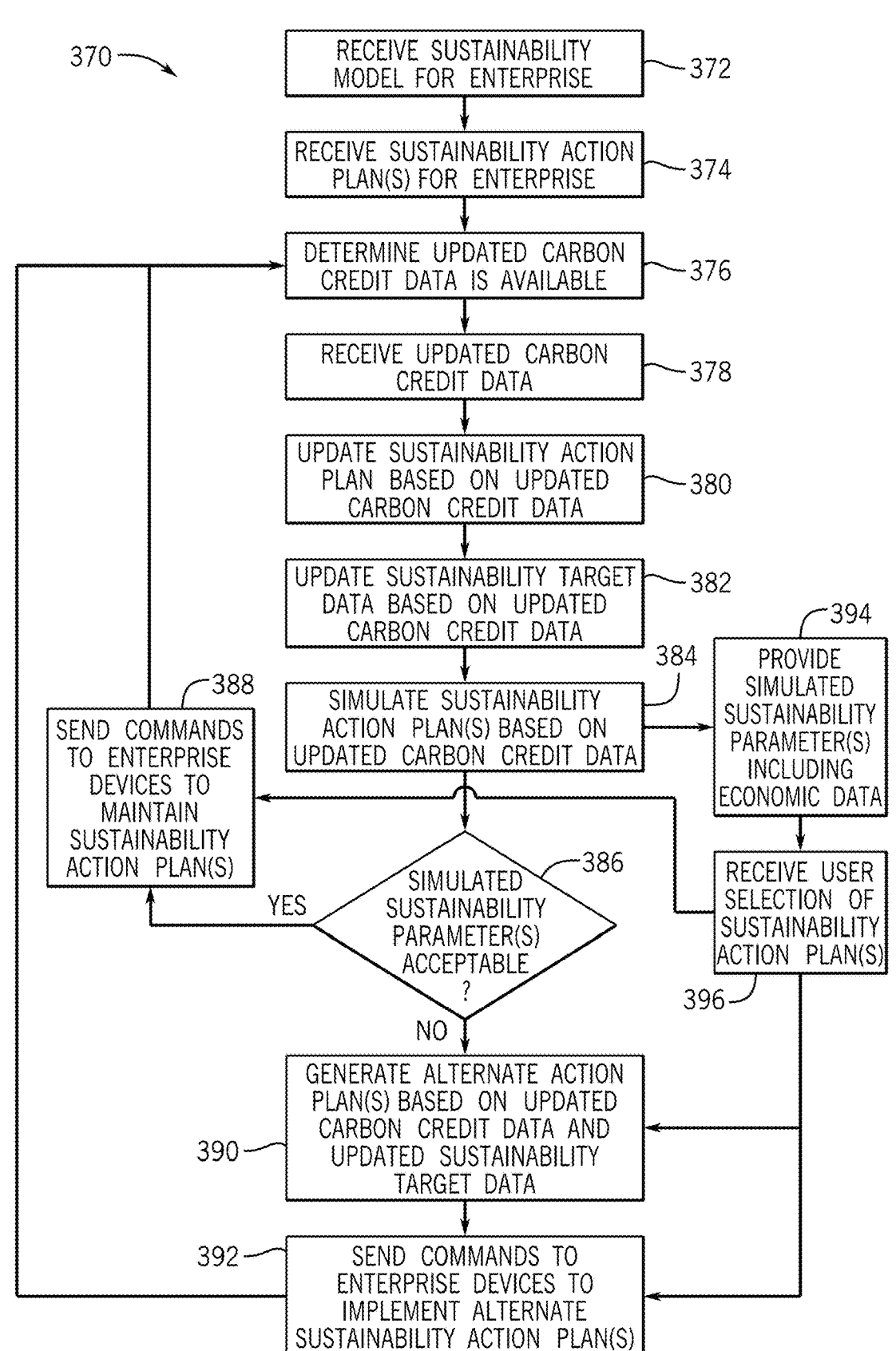
FIG. 13 is a flow chart of a method for updating sustainability action plans based on carbon credit data, according to one or more embodiments of this disclosure.

As such, FIG. 13 illustrates a flow chart of a method 370 for updating sustainability action plan(s) 90 in view of carbon credit data, according to one or more embodiments of this disclosure. Although the following description of the method 370 is described as being performed by the sustainability platform system 72 and in a particular order, it should be understood that any suitable computing system with access to the appropriate data sources may perform the method 370 in any suitable order.

At block 372, the sustainability platform system 72 may receive the sustainability model for the enterprise, and at block 374, the sustainability platform system 72 may receive one or more sustainability action plans 90 that may be currently implemented by the enterprise, as described above. At block 376, the sustainability platform system 72 may determine that updated carbon credit data is available, and at block 378, the sustainability platform system 72 may receive the updated carbon credit data. For example, the sustainability platform system 72 may query the input data sources 74, the engineering workflow systems 78, or the like for updated carbon credit data. As discussed further below, acquisition of actual, estimated, and/or forecast carbon credit data may be performed by queries of one or more databases and/or by scraping online websites for information. For example, in some embodiments, the sustainability platform system 72 may query government databases for rules and regulations regarding carbon credits and/or query trading platforms for carbon credit economic data. Moreover, the queries may be targeted, for increased efficiency, such as based on geographical location, country, state, county, governmental body, carbon credit type, etc. As used herein, carbon credit data may include current and/or forecasted carbon credit data. Moreover, as described below, the carbon credit data may be associated with confidence levels, such as based on an estimated trustworthiness of the input data source 74 or the method of gathering the carbon credit data from the input data source 74, a likelihood that the current carbon credit data may change in the future, and/or an uncertainty in forecasted carbon credit data.

Additionally, the sustainability platform system 72 may determine whether a change has occurred in the carbon credit data. For example, carbon credit data may be compared to previous carbon credit data such as for changes in price, changes in global or local carbon emissions, changes in global or local carbon credit production that are greater than a threshold amount or percentage. In some embodiments, a sentiment analysis of the carbon credit data may be performed to see if the sentiment of the language associated with carbon credits has changed, which may trigger the analysis of the method 370. As should be appreciated, certain aspects of the carbon credit data, such as current pricing, may be constantly or periodically monitored. Moreover, the carbon credit data may be determined based on the expected supply and demand for carbon credits across various regions. For example, as different industries become more carbon conscious and/or as more regulations are enacted in different industries to achieve net zero emissions, the demand for carbon credits may increase.

The sustainability platform system 72 may utilize, at block 380, the updated carbon credit data to update the sustainability action plan and/or to update the sustainability target data, at block 382. For example, as operations of an enterprise develop over time (e.g., by implementing a sustainability action plans 90), the pricing of carbon credits may increase or decrease, which may change the conditions upon which the sustainability model was generated. Additionally or alternatively, sustainability target data may be updated, such as to compensate for more or less carbon credit availability. For example, if the price of carbon credits (e.g., on the open market) increases or is forecast to increase over time, the sustainability model may be updated to reflect a reduced number of purchased carbon credits or less resource (e.g., CapEx) availability to implement one or more abatement technologies, such as based on economic constraints (e.g., economic target data) of the sustainability model. Similarly, if less carbon credits are available based on the sustainability model (e.g., updated sustainability model), the sustainability target data may be updated to recognize the increased amounts of emission reduction. As should be appreciated, the updated carbon credit data may be used to update the sustainability model and/or to update the sustainability target data, and a particular implementation of carbon credits may be considered as part of the sustainability model or as part of the sustainability action plans 90 determined by the sustainability platform system 72 to implement.

At block 384, the sustainability platform system 72 may simulate expected economic data for each currently implemented sustainability action plan 90 based on the received carbon credit forecast data. That is, the sustainability platform system 72 may project the economic costs for implementing each sustainability action plan 90. In some embodiments, the sustainability platform system 72 may determine the delta or change between the previously expected costs and the updated expected costs to implement the action plans 90 based on the carbon forecast data. The carbon forecast data may project expected carbon credit prices over time, which may correspond to different phases or portions of the action plans 90. As such, the sustainability platform system 72 may identify different times in which the enterprise may seek to supplement its current sustainability efforts to offsets any costs due to carbon credit costs fluctuations.

At block 384, the sustainability platform system 72 may simulate the current sustainability action plan(s) 90 based on the updated carbon credit data (e.g., updated sustainability model and updated sustainability target data), such as described with regard to block 236 of the method 220, to determine the simulated sustainability parameters for the enterprise operations. In some embodiments, simulating the current sustainability action plan(s) may also include simulating economic data, such as costs (e.g., current costs, future costs, costs over time, etc.) associated with implementing the one or more abatement technologies of the action plan(s) 90 and/or purchasing of carbon credits. As such, the financial viability of the action plan(s) 90 may be considered along with the sustainability parameters, and optimization thereof may be determined for determining a particular implementation of the sustainability action plan(s) 90. As should be appreciated, although discussed herein as simulating the effects of the current sustainability action plan(s) 90 based on the updated carbon credit data, additional action plans 90 may also be simulated for comparison with the currently implemented action plan(s) 90. For example, the additional action plans 90 (e.g., alternate sustainability action plan(s) 90) may be simulated in parallel, in series, or as part of a loop within the method 370, such as returning from block 390 to block 384.

At block 386, the sustainability platform system 72 may determine whether the simulated sustainability parameters are acceptable, such as by comparison to the updated sustainability target data. As should be appreciated, such acceptability may also be based on the economic data in comparison to economic target data (e.g., expenditure constraints) of the sustainability model. If the sustainability parameters are acceptable, the sustainability platform system 72 may, at block 388, send commands to one or more enterprise devices to maintain operations of the currently implemented sustainability action plan 90 and return to block 376 to await a determination that newly updated carbon credit data is available.

If the sustainability parameters are not acceptable, the sustainability platform system 72 may proceed to block 390 and generate an alternate action plan based on the updated carbon credit data. For example, the alternate action plan may be based on the updated sustainability model and updated sustainability target data and generated in the manner of blocks 200, 202, and 204 described above with reference to FIG. 5. That is, the sustainability platform system 72 may determine a suitable alternate action plan 90 to cause the enterprise operations to achieve or move towards achieving the sustainability parameters associated with the updated sustainability target data (e.g., based on the updated carbon credit data). Additionally or alternatively, in some embodiments, the sustainability platform system 72 may generate alternate sustainability action plans 90 and return to block 384 to simulate the alternate sustainability action plans 90 based on the updated carbon credit data and/or updated sustainability model, such as for comparison to the simulated sustainability parameters of the currently implemented action plan 90. At block 392, the sustainability platform system 72 may send commands to the enterprise devices to implement the alternate sustainability action plan 90. Furthermore, in some embodiments, at block 394, the simulated sustainability parameters and/or simulated economic data may be provided, such as to a user device, and the sustainability platform system 72 may, at block 396, receive a user selection to proceed with (e.g., maintain) the currently implemented sustainability action plan(s) 90, at block 388, or to generate one or more alternate action plans 90, at block 390. As discussed above, in some embodiments, the alternate action plan(s) 90 may have been simulated already, such as with the currently implemented action plan(s) 90, and be available, and the user selection may provide instructions to proceed to block 392 and send commands to the enterprise devices to implement the alternate sustainability action plan 90.

As discussed above, updated data (e.g., third-party data, regulation data, carbon credit data) may be utilized in updating the sustainability action plans 90 of an enterprise. In some embodiments, the updated data may be received or otherwise obtained via the marketplace data source 104, corporate data sources 110, manual data sources 112, or other suitable input data source 74. In some scenarios, the updated data may be associated with a particular geographical area, an organization that manages a particular industry, an abatement technology, or the like. As such, the sustainability platform system 72 may also monitor data sources that track the data published by these sources. In some embodiments, the sustainability platform system 72 may subscribe to a publication service that provides the updated data or a location to access the updated data after a respective data source determines that the data has been updated. Indeed, different categories of data (e.g., third-party data, regulation data, carbon credit data, etc.) and/or types of data (e.g., current, estimated, forecast, etc.) may have different input data sources 74. For example, the current regulatory landscape may vary based on geography or government, and certain financial organizations (e.g., IFRS and SEC) may help in defining the landscape to have a more definitive shape for the global arena. As such, the sustainability platform system 72 may retrieve a portion of the regulation data from a unified platform to provide appropriate reporting formats across multiple geographies based on their areas of operation. Similarly, carbon credit data may be obtained in part from marketplace data sources 104 such as trading platforms, and third-party data may be obtained from other third-party data sources 106 such as equipment manufacturer catalogs.

Furthermore, the sustainability platform system 72 may perform or utilize one or more third-party systems to query and/or scrape websites, electronic messages, catalogs, databases, or other digital media to detect changes in and/or obtain data (e.g., third-party data, regulation data, carbon credit data) that may affect the sustainability model, one or more action plans 90, or the like of the enterprise. For example, updated regulation data, updated abatement technology data, and/or updated carbon credit data may be obtained to verify the acceptability of and/or update one or more sustainability action plans 90, such as discussed with reference to FIGS. 11-13. To help illustrate, FIG. 14 is a flow chart of a method 400 for performing a search for input data associated with the sustainability of an enterprise and maintaining a database thereof, according to one or more embodiments of this disclosure. Although the following description of the method 400 is described as being performed by the sustainability platform system 72 and in a particular order, it should be understood that any suitable computing system with access to the appropriate data sources may perform the method 400 in any suitable order.

At block 402, a data search trigger may be received to initiate the search for new input data. For example, a user request may trigger the data search, the search may be implemented periodically (e.g., daily, weekly, etc.), and/or one or more conditions associated with the enterprise (e.g., sustainability parameter changes) or input data sources (e.g., sentiment regarding potential changes in the input data based on publicly available information) may trigger the data search. At block 404, the sustainability platform system 72 may define search parameters for the input data. In other words, the sustainability platform system 72 may define what input data is desired, which may include a type of input data, a currency (e.g., whether the information is relevant today or for some time in the future), and/or an uncertainty in the input data. For example, if current regulation data or forecast carbon credit data is desired, the search parameters may be directed towards current regulatory requirements or the future price of carbon credits in a geographic or geopolitical region of operations of the enterprise. Moreover, in some embodiments, the search parameters may include artificial intelligence (e.g., machine learning algorithm) prompts, which may be used via a large language model to filter and/or return relevant information.

Additionally, at block 406, the sustainability platform system 72 may query and/or scrape one or more input data sources 74 for the input data. For example, the sustainability platform system 72 may query governmental and/or commercial databases and/or scrape data from online news articles, social media posts, and/or other websites for information relevant to the sustainability of the enterprise based on the search parameters. In some embodiments, the sustainability platform system 72 may identify the input data sources 74 prior to, or make note of along with, the obtaining of the input data. For example, in some embodiments, the search parameters may define certain types (e.g., government related, social related, equipment provider related, and/or market related websites or databases) of input data sources 74 from which the input data is to be pulled, and the sustainability platform system 72 may identify corresponding sources that are available upon which to perform the search. Moreover, in some embodiments, the sustainability platform system 72 may identify and correlate an input data source 74 with the data obtained therefrom, such as to analyze a relevance of or confidence in the input data.

As should be appreciated, obtaining information from the input data sources 74 may be performed in any suitable manner such as by referencing tables of an indexed database or by large-language-model-based reading comprehension of text. For example, a large language model machine learning algorithm (e.g., a retrieval augmented generation (RAG) model) of the sustainability platform system 72 or a third-party meta engine communicating therewith may search real-time data sources such as news articles, regulatory websites, supplier catalogs, electronic messages, social media posts, etc. to extract information regarding updates to regulations, carbon credit forecast data, or other input data. In some embodiments, the machine learning algorithm may be pre-programmed with relevant sustainability data sources from which to extract such input data, or targeted prompts may be generated to broaden the search, for example, to a portion of or the entirety of the world wide web. Additionally or alternatively, in some embodiments, the large language model may search for key words regarding sustainability, which may be defined in the search parameters. Moreover, the sustainability platform system 72 may search in one or multiple languages, such as based on geographical region. For example, input data regarding carbon emissions in the United States may be search for "carbon dioxide" in English, while input data regarding methane emissions in Japan may search for "methane" in Japanese. Additionally, in some scenarios, such as for real-time data bases (e.g., relational databases, web application programming interfaces (APIs), etc.) the sustainability platform system 72 may access the input data efficiently through a middle-ware layer that translates between the model retrieval queries and the database query language using SQL or specific APIs.

At block 410, the sustainability platform system 72 may assign confidence parameters to the input data based the input data itself (e.g., the context of the input data, values of the input data, etc.) and/or the input data source 74. For example, the reputability of a government website may be higher than a third-party commercial website, or a social media post from an environmental specialist may have higher reputability or seriousness than that of a comedian. Additionally, the confidence parameters may include uncertainty (e.g., ranges based on confidence) in values.

In some scenarios, at block 412, the input data and confidence parameters may be provided for review. For example, a user may review the gathered input data to review for relevance, accuracy, etc. Moreover, at block 414, the sustainability platform system 72 may receive user feedback regarding the acceptance of the input data and confidence parameters. In some embodiments, such as if a machine learning algorithm is used for the search, the user acceptance of the input data may indicate that the query and/or scrape was successful and the machine learning algorithm may be updated based thereon. Further, the user feedback may indicate a rejection or manual update to the input data and/or the confidence parameters, and the machine learning algorithm may be updated based thereon to improve the search functionality. Moreover, if the search is at least partially unsuccessful, the updated machine learning algorithm may perform the search again.

At block 416, the input data, such as regulation data, carbon credit data, etc., may be separately or categorically maintained within a database (e.g., sustainability database 94 and/or workflow database 140) of the sustainability platform system 72, such as to improve action plan simulation efficiency. For example, instead of receiving data in blocks 292-302 in the method 290, receiving updated regulation data at block 348 of the method 340, receiving updated carbon credit data at block 378 of the method 370 from input data sources 74, and/or querying third-party data sources at block 326 of the method 320, the sustainability platform system 72 may run searches periodically or based on another trigger and maintain a database of the input data for expedited and more efficient execution of the methods 290, 320, 340, and 370. Indeed, at block 418, one or more sustainability action plans 90 may be updated, or verified, based on the input data and corresponding confidence parameters within the database (e.g., sustainability database 94 and/or workflow database 140). As should be appreciated, the embodiments, of FIGS. 14-16 may be utilized for any suitable aspect of the sustainability platform system 72, such as input data for updating abatement technologies, updating technology parameters thereof, updating regulation data, updating carbon credit data, and/or other aspects of the enterprise.

Figure 15:
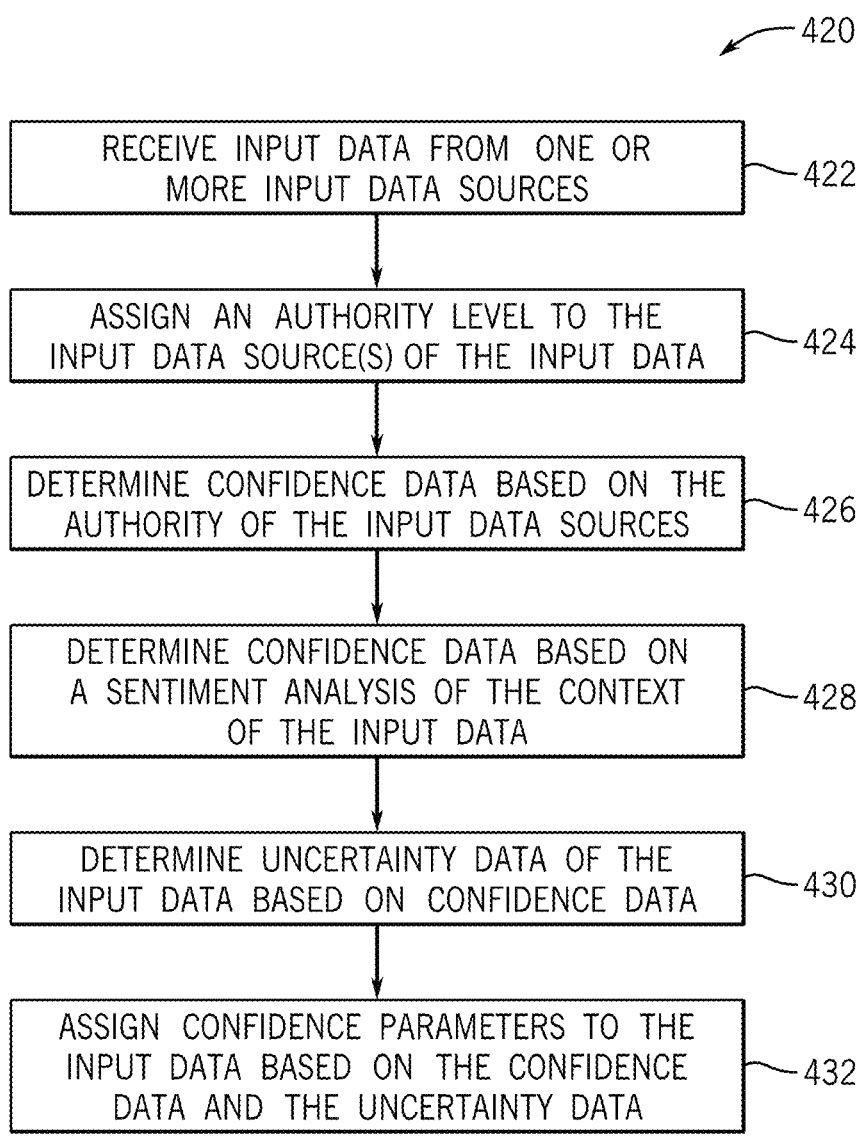
FIG. 15 is a flow chart of a method for determining confidence parameters for input data obtained via the input data sources, according to one or more embodiments of this disclosure.

As discussed above, in some embodiments, the sustainability platform system 72 may assign confidence parameters to the input data, such as related to uncertainty in a data value or forecast. To help illustrate, FIG. 15 is a flow chart of a method 420 for performing a search for determining confidence parameters in input data obtained via the input data sources 74, according to one or more embodiments of this disclosure. Although the following description of the method 420 is described as being performed by the sustainability platform system 72 and in a particular order, it should be understood that any suitable computing system with access to the appropriate data sources may perform the method 420 in any suitable order.

At block 422, the sustainability platform system 72 may receive the input data from one or more input data sources 74. As noted above, the sustainability platform system 72 may identify and correlate the input data sources 74 with the input data. Moreover, the sustainability platform system 72 may, at block 424 assign an authority level to the input data source(s) 74, such as based on the source itself. For example, government information websites or databases may be given a relatively higher authority level, while social media posts may be given a relatively lower authority level. Moreover, scientific journal publications may be given a relatively higher authority level, while general news publications may be given a relatively lower authority level. However, within particular categories, such as social media posts, further differentiation may be made. For example, a government official stating, on social media, that future regulations (e.g., with a given timeline or not) will adopt stricter emission standards may be determined to have a higher authority than a product line influencer on social media stating the same. Additionally, in some embodiments, at block 428, confidence data may be determined based on a sentiment analysis of the context of the input data. For example, if the sentiment of the input data is in the context of sarcasm or is uncorroborated, the input data may be associated with a reduced confidence. Moreover, correlating data, such as the same input data received from multiple input data sources 74 of various authority levels may increase the confidence parameters for the input data. As should be appreciated, the authority level and sentiment analysis of the context of the input data may be determined via natural language processing of a large language model (e.g., a RAG model).

Based on the confidence data and the input data itself, at block 430, the sustainability platform system 72 may determine uncertainties (e.g., ranges of values and/or associated confidence intervals) in the input data. For example, the sustainability platform system 72 may determine that current regulations for a particular emission are allowed at a certain rate, X, and that for a particular confidence interval (e.g., 90%, 95%, etc.) the rate is expect to decrease to within a projected range, 0.5x-0.8x within a projected time period (e.g., 5 years). Moreover, the input data itself may include uncertainties, such as a scientific paper stating that a particular process produces emissions within a certain range (e.g., an average value with an uncertainty). In some instances, the confidence data (e.g., based on the authority level and/or sentiment analysis) and input data may be evaluated separately and combined, such as via simple multiplication of percentages or statistical analyses. For example, different weights may be given to particular authority levels and sentiments and/or based on whether the input data is regarding current or future data during analysis of (e.g., generation of) the confidence parameters based on the confidence data. As such, at block 432, the confidence parameters may be assigned to the input data based on the confidence data and the uncertainty data. As discussed above, such confidence parameters may be provided to a user for review, stored within a database along with the input data, and/or used in updating an action plan 90. Moreover, amounts of uncertainty of the confidence parameters may be folded into an analysis of an action plan 90, such as to yield projected ranges of sustainability parameters.

Figure 16:
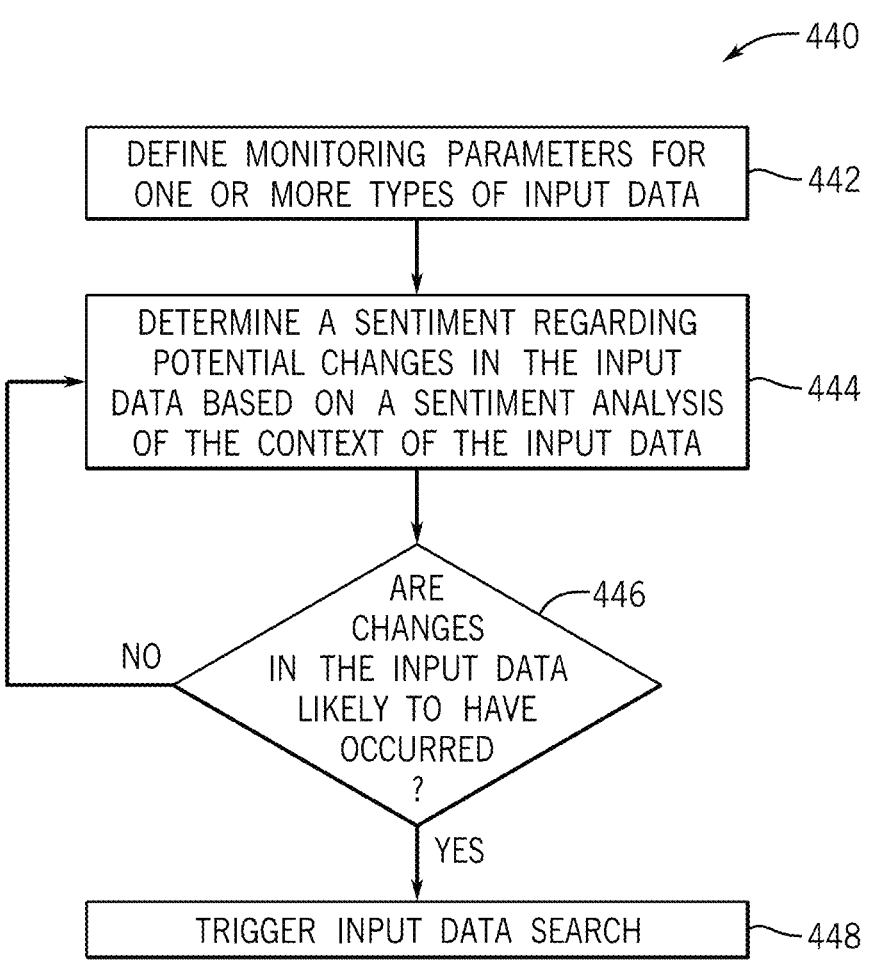
FIG. 16 is a flow chart of a method for triggering a search for input data based on perceived sentiment, according to one or more embodiments of this disclosure.

As discussed above, the sustainability platform system 72 may initiate the search for input data based on one or more triggers. In some embodiments, the sustainability platform system 72 may utilize perceived changes in at least a portion of the input data to trigger a larger search for the input data. For example, in some embodiments, the sustainability platform system 72 may monitor a portion of the input data sources 74 to determine a sentiment (e.g., an industry sentiment, global sentiment, regional sentiment, etc.) regarding an aspect of the enterprise relevant to sustainability, and trigger a search based on the sentiment. To help illustrate, FIG. 16 is a flow chart of a method 440 for triggering a search for input data (e.g., the method 400) based on perceived sentiment (e.g., perceived public sentiment, perceived sentiment in the industry, etc.), according to one or more embodiments of this disclosure. Although the following description of the method 440 is described as being performed by the sustainability platform system 72 and in a particular order, it should be understood that any suitable computing system with access to the appropriate data sources may perform the method 440 in any suitable order.

At block 442, the sustainability platform system 72 may define monitoring parameters for one or more types of input data. In some instances, the monitoring parameters may be similar to or the same as the search parameters (e.g., of block 404 of the method 400). For example, the monitoring parameters may include types of input data sources 74, types of input data, specific aspects of input data (e.g., related to a particular technology, sustainability parameter, and/or sustainability target), etc. Furthermore, the monitoring parameters may broader, or narrower, reach in terms of types or reliability of input data sources than the search, but focus sentiment surrounding the input data instead of determining the input data itself. In some embodiments, the computing resources of monitoring the input data sources 74 may be less intensive than a search, as in the method 400.

At block 444, the sustainability platform system 72 may determine a sentiment regarding potential changes in the input data based on a sentiment analysis of the context of the input data. For example, the sustainability platform system 72 may determine sentiments of urgency, anger, happiness, worry, neutrality, etc. for different input data sources 74. Moreover, the overall sentiment may be determined by an aggregation of sentiments from multiple input data sources 74. For example, weights may be assigned to different types of sentiment based on a likelihood that a particular sentiment is indicative of changes in the input data (e.g., changes since a last search or changes in forecasts of the input data), and the weighted average sentiment may be determined as the sentiment as a whole for a particular aspect of the input data. Moreover, the sentiment analysis may include trend monitoring with respect to the monitoring parameters. For example, the sustainability platform system 72 may determine a spike in frequency and/or a sentiment of urgency or worry in social media posts, news publications, and/or other input data sources 74 regarding particular emission regulations or prices of carbon credits. Such analysis results may convey a sentiment that new information regarding the particular emission regulations or prices of carbon credits may be available. In response to the sentiment analysis, the sustainability platform system 72 may determine, at block 446, if changes in the input data are likely to have occurred. For example, in some embodiments, the determined sentiment may be evaluated with a characteristic value or values and compared to a threshold. As should be appreciated, sentiment correspond to a non-linear and/or multi-dimensional scale with one or multiple thresholds. If changes in the input data are determined to not be likely, the sustainability platform system 72 may return to monitoring the input data sources 74 and reevaluate the sentiment, such as periodically, in real-time, and/or in response to a user request. However, if changes to the input data are determined to have likely occurred, the sustainability platform system 72 may proceed to block 448 and trigger an input data search, such as in the method 400.

As discussed herein, the sustainability platform system 72 may perform various analysis operations to determine action plans 90 using measure, report, and verify operational workflows. In addition, the sustainability platform system 72 may provide abatement planning and modeling workflows, as well as abatement operations. The sustainability platform system 72 may also determine changes/updates to the action plans 90 based on updated data (e.g., third-party data, regulation data, carbon credit data). Moreover, the updated data may be obtained, analyzed for sentiment and/or authority, such as to adjust confidence levels associated with updated data, and stored in a database for efficient usage by the sustainability platform system 72 to update or generate new sustainability action plans 90. As such, the sustainability platform system 72 may provide for improved efficiency for aggregating and analyzing enterprise data to generate a sustainability model with action plans 90 for improving sustainability parameters.

Reference throughout this specification to "one embodiment," "an embodiment," "embodiments," "some embodiments," "certain embodiments," or similar language means that a particular feature, structure, or characteristic described in connection with the embodiment may be included in at least one embodiment of this disclosure. Thus, these phrases or similar language throughout this specification may, but do not necessarily, all refer to the same embodiment. Although this disclosure has been described with respect to specific details, it is not intended that such details should be regarded as limitations on the scope of this disclosure, except to the extent that they are included in the accompanying claims.

Additionally, the methods and processes described above may be performed by a processor. Moreover, the term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the embodiments set forth in this disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An enterprise system comprising:
one or more field devices associated with one or more abatement technologies configured to perform one or more respective operations of an enterprise, wherein the one or more respective operations of the enterprise are associated with controlling a flow of hydrocarbons from a subsurface region via one or more pumps, one or more wellheads, one or more artificial lifts, or any combination thereof; and
a sustainability platform system comprising a computer system, wherein the computer system is configured to:
obtain a sustainability model representative of a state of operations of the enterprise;
obtain a currently implemented sustainability action plan associated with improving one or more sustainability parameters of the enterprise via the one or more abatement technologies;
determine that updated data is available for the one or more abatement technologies;
receive the updated data;
simulate an effect of the currently implemented sustainability action plan on the one or more sustainability parameters over a period of time based on the updated data;
determine whether the simulated effect of the currently implemented sustainability action plan is effective to cause the one or more sustainability parameters to be within one or more threshold limits, one or more ranges, or both over the period of time;
in response to determining that the simulated effect of the currently implemented sustainability action plan is effective, send one or more commands to the one or more field devices to maintain the one or more respective operations according to the currently implemented sustainability action plan;
in response to determining that the simulated effect of the currently implemented sustainability action plan is not effective, identify one or more engineering workflow systems of a plurality of engineering workflow systems based on the one or more sustainability parameters, wherein each of the plurality of engineering workflow systems corresponds to a separate computing device relative to the computer system and is configured to independently analyze the sustainability model, and wherein the one or more engineering workflow systems are identified by:
broadcasting a request indicative of the one or more sustainability parameters to the plurality of engineering workflow systems; and
querying a database comprising a list of abatement technologies associated with each of the plurality of engineering workflow systems based on the one or more sustainability parameters, wherein each abatement technology of the list corresponds to a device associated with the one or more respective operations of the enterprise, an operational parameter for an additional device associated with the one or more respective operations of the enterprise, or both;
receive one or more responses from the one or more engineering workflow systems, wherein the one or more engineering workflow systems are configured to provide the one or more responses based on an association between a respective abatement technology of each of the one or more engineering workflow systems and the one or more sustainability parameters;
update one or more portions of the sustainability model based on the one or more responses;
obtain an alternate sustainability action plan based on the updated one or more portions of the sustainability model; and
send one or more commands to the one or more field devices to adjust the one or more respective operations according to the alternate sustainability action plan.

2. The enterprise system of claim 1, wherein the updated data comprises updated technology parameters corresponding to the one or more abatement technologies, wherein the updated technology parameters comprise respective regional availabilities of the one or more abatement technologies, respective resource costs of the one or more abatement technologies, respective emission reduction potentials of the one or more abatement technologies, respective deployment durations of the one or more abatement technologies, respective times to implement the one or more abatement technologies, or any combination thereof.

3. The enterprise system of claim 1, wherein the sustainability platform system is configured to, in response to determining that the simulated effect of the currently implemented sustainability action plan is not effective, provide an indication to supplement or supplant the one or more field devices with one or more other devices according to the alternate sustainability action plan.

4. The enterprise system of claim 1, wherein the sustainability platform system is configured to determine that the updated data is available by:

querying one or more data sources for the updated data; and determining that the updated data has changed by at least a threshold amount compared to a previous iteration of the updated data.

5. The enterprise system of claim 4, wherein the sustainability platform system is configured to query the one or more data sources by:

identifying one or more technology parameters associated with the one or more abatement technologies and compatible with the sustainability model; and querying the one or more data sources for the updated data corresponding to the one or more abatement technologies that comprise respective technology parameters that match the identified one or more technology parameters.

6. The enterprise system of claim 4, wherein the sustainability platform system is configured to query the one or more data sources by scraping, via a large language model machine learning algorithm, a catalog, a database, the Internet, or a combination thereof.

7. The enterprise system of claim 1, wherein the sustainability platform system is configured to:

generate an updated sustainability model based on the sustainability model and the updated data; and simulate the effect of the currently implemented sustainability action plan based on the updated data and the updated sustainability model.

8. The enterprise system of claim 1, wherein the one or more sustainability parameters comprise a carbon footprint of the one or more field devices, a water usage of the one or more field devices, a waste output of the one or more field devices, a greenhouse gas emission of the one or more field devices, or any combination thereof.

9. The enterprise system of claim 8, wherein simulating the effect of the currently implemented sustainability action plan comprises optimizing the one or more respective operations of the one or more field devices with respect to a reduction of the one or more sustainability parameters utilizing the one or more abatement technologies.

10. A method comprising:

obtaining, via a computing system, a sustainability model representative of a state of operations of an enterprise;

obtaining, via the computing system, a currently implemented sustainability action plan associated with improving one or more sustainability parameters of the enterprise via one or more abatement technologies;

determining, via the computing system, that updated data is available for the one or more abatement technologies;

receiving, via the computing system, the updated data;

simulating, via the computing system, an effect of the currently implemented sustainability action plan on the one or more sustainability parameters over a period of time based on the updated data;

determining, via the computing system, whether the simulated effect of the currently implemented sustainability action plan is effective to cause the one or more sustainability parameters to be within one or more threshold limits, one or more ranges, or both over the period of time;

in response to determining that the simulated effect of the currently implemented sustainability action plan is effective, sending, via the computing system, one or more commands to one or more field devices of the enterprise to maintain one or more respective operations of the one or more field devices according to the currently implemented sustainability action plan, wherein the one or more respective operations are associated with controlling a flow of hydrocarbons from a subsurface region via one or more pumps, one or more wellheads, one or more artificial lifts, or any combination thereof;

in response to determining that the simulated effect of the currently implemented sustainability action plan is not effective, identifying, via the computing system, one or more engineering workflow systems of a plurality of engineering workflow systems based on the one or more sustainability parameters, wherein each of the plurality of engineering workflow systems corresponds to a separate computing device relative to the computing system and is configured to independently analyze the sustainability model, and wherein the one or more engineering workflow systems are identified by:

broadcasting a request indicative of the one or more sustainability parameters to the plurality of engineering workflow systems; and querying a database comprising a list of abatement technologies associated with each of the plurality of engineering workflow systems based on the one or more sustainability parameters, wherein each abatement technology of the list corresponds to a device associated with the one or more respective operations of the enterprise, an operational parameter for an additional device associated with the one or more respective operations of the enterprise, or both;

receiving, via the computing system, one or more responses from the one or more engineering workflow systems, wherein the one or more engineering workflow systems are configured to provide the one or more responses based on an association between a respective abatement technology of each of the one or more engineering workflow systems and the one or more sustainability parameters;

updating, via the computing system, one or more portions of the sustainability model based on the one or more responses;

obtaining, via the computing system, an alternate sustainability action plan based on the updated one or more portions of the sustainability model; and sending, via the computing system, one or more commands to the one or more field devices to adjust the one or more respective operations according to the alternate sustainability action plan.

11. The method of claim 10, comprising, in response to determining that the simulated effect of the currently implemented sustainability action plan is not effective, provide an indication to supplement or supplant the one or more field devices with one or more other devices of one or more other abatement technologies according to the alternate sustainability action plan.

12. The method of claim 11, wherein generating the alternate sustainability action plan comprises determining, via the identified one or more engineering workflow systems, at least one implementation of the one or more abatement technologies or the one or more other abatement technologies based on an estimated improvement to at least one sustainability parameter of the one or more sustainability parameters, wherein the estimated improvement is based on the sustainability model and the updated data.

13. The method of claim 10, wherein determining that the updated data is available comprises:

querying one or more third-party data sources for the updated data; and determining that the updated data has changed by at least a threshold amount compared to a previous iteration of the updated data.

14. The method of claim 13, wherein querying the one or more third-party data sources comprises:

identifying one or more technology parameters associated with the one or more abatement technologies and compatible with the sustainability model; and querying the one or more third-party data sources for the updated data corresponding to the one or more abatement technologies that comprise respective technology parameters that match the identified one or more technology parameters.

15. The method of claim 14, wherein the one or more sustainability parameters comprise a carbon footprint of the one or more field devices, a water usage of the one or more field devices, a waste output of the one or more field devices, a greenhouse gas emission of the one or more field devices, or any combination thereof, and wherein the updated data comprises updated technology parameters corresponding to the one or more abatement technologies, wherein the updated technology parameters comprise respective regional availabilities of the one or more abatement technologies, respective resource costs of the one or more abatement technologies, respective emission reduction potentials of the one or more abatement technologies, respective deployment durations of the one or more abatement technologies, respective times to implement the one or more abatement technologies, or any combination thereof.

16. The method of claim 10, comprising generating, via the computing system, an updated sustainability model based on the sustainability model and the updated data, wherein simulating the effect of the currently implemented sustainability action plan comprises simulating the effect of the currently implemented sustainability action plan based on the updated data and the updated sustainability model.

17. A non-transitory, machine-readable medium comprising instructions that, when executed by one or more processors, cause the one or more processors to perform operations comprising:

obtaining a sustainability model representative of a state of operations of an enterprise;

obtaining a currently implemented sustainability action plan associated with improving one or more sustainability parameters of the enterprise via one or more abatement technologies;

determining that updated data is available for the one or more abatement technologies;

receiving the updated data;

simulating an effect of the currently implemented sustainability action plan on the one or more sustainability parameters over a period of time based on the updated data;

determining whether the simulated effect of the currently implemented sustainability action plan is effective to cause the one or more sustainability parameters to be within one or more threshold limits, one or more ranges, or both over the period of time;

in response to determining that the simulated effect of the currently implemented sustainability action plan is effective, sending one or more commands to one or more field devices of the enterprise to maintain one or more respective operations of the one or more field devices according to the currently implemented sustainability action plan, wherein the one or more respective operations are associated with controlling a flow of hydrocarbons from a subsurface region via one or more pumps, one or more wellheads, one or more artificial lifts, or any combination thereof;

in response to determining that the simulated effect of the currently implemented sustainability action plan is not effective, identifying one or more engineering workflow systems of a plurality of engineering workflow systems based on the one or more sustainability parameters, wherein each of the plurality of engineering workflow systems corresponds to a separate computing device relative to a computing system and is configured to independently analyze the sustainability model, and wherein the one or more engineering workflow systems are identified by:

broadcasting a request indicative of the one or more sustainability parameters to the plurality of engineering workflow systems; and querying a database comprising a list of abatement technologies associated with each of the plurality of engineering workflow systems based on the one or more sustainability parameters, wherein each abatement technology of the list corresponds to a device associated with the one or more respective operations of the enterprise, an operational parameter for an additional device associated with the one or more respective operations of the enterprise, or both;

receiving one or more responses from the one or more engineering workflow systems, wherein the one or more engineering workflow systems are configured to provide the one or more responses based on an association between a respective abatement technology of each of the one or more engineering workflow systems and the one or more sustainability parameters;

updating one or more portions of the sustainability model based on the one or more responses;

obtaining an alternate sustainability action plan based on the updated one or more portions of the sustainability model; and sending one or more commands to the one or more field devices to adjust the one or more respective operations according to the alternate sustainability action plan.

18. The non-transitory, machine-readable medium of claim 17, wherein determining that the updated data is available comprises:

querying one or more third-party data sources for the updated data; and determining that the updated data has changed by at least a threshold amount compared to a previous iteration of the updated data.

19. The non-transitory, machine-readable medium of claim 17, the operations comprise, in response to determining that the simulated effect of the currently implemented sustainability action plan is not effective, provide an indication to supplement or supplant the one or more field devices with one or more other devices of one or more other abatement technologies according to the alternate sustainability action plan.

20. The non-transitory, machine-readable medium of claim 19, wherein generating the alternate sustainability action plan comprises determining, via the identified one or more engineering workflow systems, at least one implementation of the one or more abatement technologies or the one or more other abatement technologies based on an estimated improvement to at least one sustainability parameter of the one or more sustainability parameters, wherein the estimated improvement is based on the sustainability model and the updated data.

\* \* \* \* \*